United States Patent
Stone et al.

(10) Patent No.: US 10,942,603 B2
(45) Date of Patent: Mar. 9, 2021

(54) MANAGING ACTIVITY STATES OF AN APPLICATION PROCESSOR IN RELATION TO TOUCH OR HOVER INTERACTIONS WITH A TOUCH SENSITIVE DEVICE

(71) Applicant: Qeexo, Co., Mountain View, CA (US)

(72) Inventors: Joshua Dale Stone, Pittsburgh, PA (US); Yanfei Chen, Pittsburgh, PA (US); Shyama Purnima Dorbala, Sunnyvale, CA (US); Bo Robert Xiao, Vancouver (CA)

(73) Assignee: QEEXO, CO., Mountain View, CA (US)

( * ) Notice: Subject to any disclaimer, the term of this patent is extended or adjusted under 35 U.S.C. 154(b) by 0 days.

(21) Appl. No.: 16/404,694

(22) Filed: May 6, 2019

(65) Prior Publication Data
US 2020/0356210 A1    Nov. 12, 2020

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 2203/04106* (2013.01); *G06F 2203/04108* (2013.01); *H04M 2250/22* (2013.01)

(58) Field of Classification Search
CPC ......... G06F 3/0418; G06F 2203/04106; G06F 2203/04108; H04M 2250/22
See application file for complete search history.

(56) References Cited

U.S. PATENT DOCUMENTS 2,008,028 A    7/1935    Mccortney et al.
2,430,005 A    11/1947   Denneen et al.
(Continued)

FOREIGN PATENT DOCUMENTS

CN    1797305 A    7/2006
CN    1928781 A    3/2007
(Continued)

OTHER PUBLICATIONS

U.S. Appl. No. 14/492,604, filed Sep. 22, 2014, titled: "Method and Apparatus for Improving Accuracy of Touch Screen Event Analysis By Use of Edge Classification.", 35 pages.
(Continued)

*Primary Examiner* — Kenneth B Lee, Jr.
(74) *Attorney, Agent, or Firm* — Kwan & Olynick LLP

(57) ABSTRACT

Techniques that can improve efficiency of a touch sensitive device are presented. A touch controller (TC) can comprise a hover classification engine and an application processor (AP) can comprise a touch classification engine usable to classify touch or hover interactions of an object(s) with a touch sensitive surface (TSS) of the device. In response to classifying a touch or hover interaction with TSS as unintentional, AP can reject such interaction and can transition from an active state to an inactive state. TC can continue to monitor touch or hover interactions with TSS. In response to determining there is an intentional touch interaction with TS S or no unintentional face/ear interaction with TSS, TC can transmit a notification signal to AP. In response to the notification signal, AP can transition from the inactive state to active state, and can process the intentional touch interaction or monitor the TSS.

28 Claims, 19 Drawing Sheets

(56) References Cited

U.S. PATENT DOCUMENTS

| | | | |
|---|---|---|---|
| 3,354,531 A | 11/1967 | Pryor Michael | |
| 4,561,105 A | 12/1985 | Crane et al. | |
| 4,597,932 A | 7/1986 | Kurihara et al. | |
| 4,686,332 A | 8/1987 | Greanias et al. | |
| 5,483,261 A | 1/1996 | Yasutake | |
| 5,544,265 A | 8/1996 | Bozinovic et al. | |
| 5,596,656 A | 1/1997 | Goldberg | |
| 5,615,285 A | 3/1997 | Beernink | |
| 5,625,818 A | 4/1997 | Zarmer et al. | |
| 5,666,438 A | 9/1997 | Beernink et al. | |
| 5,867,163 A | 2/1999 | Kurtenbach | |
| 5,933,514 A | 8/1999 | Ostrem et al. | |
| 6,028,593 A | 2/2000 | Rosenberg et al. | |
| 6,118,435 A | 9/2000 | Fujita et al. | |
| 6,208,330 B1 | 3/2001 | Hasegawa et al. | |
| 6,212,295 B1 | 4/2001 | Ostrem et al. | |
| 6,222,465 B1 | 4/2001 | Kumar et al. | |
| 6,246,395 B1 | 6/2001 | Goyins et al. | |
| 6,252,563 B1 | 6/2001 | Tada et al. | |
| 6,323,846 B1 | 11/2001 | Westerman et al. | |
| 6,337,698 B1 | 1/2002 | Kelly, Jr. et al. | |
| 6,492,979 B1 | 12/2002 | Kent et al. | |
| 6,504,530 B1 | 1/2003 | Wilson et al. | |
| 6,643,663 B1 | 11/2003 | Dabney et al. | |
| 6,707,451 B1 | 3/2004 | Nagaoka | |
| 6,748,425 B1 | 6/2004 | Duffy et al. | |
| 6,772,396 B1 | 8/2004 | Cronin et al. | |
| 6,933,930 B2 | 8/2005 | Devige et al. | |
| 6,943,665 B2 | 9/2005 | Chornenky | |
| 7,050,955 B1 | 5/2006 | Carmel et al. | |
| 7,084,884 B1 | 8/2006 | Nelson et al. | |
| 7,098,896 B2 | 8/2006 | Kushler et al. | |
| 7,212,197 B1 | 5/2007 | Schkolne et al. | |
| 7,443,396 B2 | 10/2008 | Ilic | |
| 7,581,194 B2 | 8/2009 | Iwema et al. | |
| 7,982,724 B2 | 7/2011 | Hill | |
| 8,086,971 B2 | 12/2011 | Radivojevic et al. | |
| 8,144,126 B2 | 3/2012 | Wright | |
| 8,154,524 B2 | 4/2012 | Wilson et al. | |
| 8,154,529 B2 | 4/2012 | Sleeman et al. | |
| 8,170,346 B2 | 5/2012 | Ludwig | |
| 8,199,126 B1 | 6/2012 | Taubman | |
| 8,253,744 B2 | 8/2012 | Macura et al. | |
| 8,269,744 B2 | 9/2012 | Agari et al. | |
| 8,327,029 B1 | 12/2012 | Purser | |
| 8,441,790 B2 | 5/2013 | Pance et al. | |
| 8,547,357 B2 | 10/2013 | Aoyagi | |
| 8,624,878 B2 | 1/2014 | Sarwar et al. | |
| 8,670,632 B2 | 3/2014 | Wilson | |
| 8,674,943 B2 | 3/2014 | Westerman et al. | |
| 8,743,091 B2 | 6/2014 | Bernstein | |
| 8,760,395 B2 | 6/2014 | Kim et al. | |
| 8,762,332 B2 | 6/2014 | Keebler et al. | |
| 8,769,524 B2 | 7/2014 | Bhullar et al. | |
| 9,013,452 B2 | 4/2015 | Harrison et al. | |
| 9,019,244 B2 | 4/2015 | Harrison | |
| 9,030,498 B2 | 5/2015 | Galor et al. | |
| 9,052,772 B2 | 6/2015 | West | |
| 9,060,007 B2 | 6/2015 | Keebler et al. | |
| 9,182,882 B2 | 11/2015 | Fowler et al. | |
| 9,329,688 B2 | 5/2016 | Harrison | |
| 9,329,715 B2 | 5/2016 | Schwarz et al. | |
| 9,377,863 B2 | 6/2016 | Bychkov et al. | |
| 9,557,852 B2 | 1/2017 | Tsai et al. | |
| 9,612,689 B2 | 4/2017 | Harrison et al. | |
| 9,696,859 B1 | 7/2017 | Heller et al. | |
| 9,864,453 B2 | 1/2018 | Munemoto et al. | |
| 10,082,935 B2 | 9/2018 | Harrison et al. | |
| 10,318,034 B1 * | 6/2019 | Hauenstein | G06F 3/04883 |
| 2002/0009227 A1 | 1/2002 | Goldberg et al. | |
| 2002/0057837 A1 | 5/2002 | Wilkinson et al. | |
| 2002/0070927 A1 | 6/2002 | Fujitsuka et al. | |
| 2002/0126161 A1 | 9/2002 | Kuzunuki et al. | |
| 2003/0048260 A1 | 3/2003 | Matusis | |
| 2003/0110085 A1 | 6/2003 | Murren et al. | |
| 2003/0132922 A1 | 7/2003 | Phillip | |
| 2003/0217873 A1 | 11/2003 | Paradiso et al. | |
| 2004/0012573 A1 | 1/2004 | Morrison et al. | |
| 2004/0021681 A1 | 2/2004 | Liao | |
| 2004/0054711 A1 | 3/2004 | Multer | |
| 2004/0141010 A1 | 7/2004 | Fitzmaurice et al. | |
| 2004/0160421 A1 | 8/2004 | Sullivan | |
| 2004/0199867 A1 | 10/2004 | Brandenborg | |
| 2004/0225730 A1 | 11/2004 | Brown et al. | |
| 2005/0083313 A1 | 4/2005 | Hardie-Bick | |
| 2005/0131778 A1 | 6/2005 | Bennett et al. | |
| 2005/0146512 A1 | 7/2005 | Hill et al. | |
| 2005/0289461 A1 | 12/2005 | Amado et al. | |
| 2006/0010400 A1 | 1/2006 | Dehlin et al. | |
| 2006/0026535 A1 | 2/2006 | Hotelling et al. | |
| 2006/0031746 A1 | 2/2006 | Toepfer et al. | |
| 2006/0152499 A1 | 7/2006 | Roberts | |
| 2006/0173985 A1 | 8/2006 | Moore | |
| 2006/0184617 A1 | 8/2006 | Nicholas et al. | |
| 2006/0217126 A1 | 9/2006 | Sohm et al. | |
| 2006/0230021 A1 | 10/2006 | Diab et al. | |
| 2006/0288329 A1 | 12/2006 | Gandhi et al. | |
| 2007/0011205 A1 | 1/2007 | Majjasie et al. | |
| 2007/0044010 A1 | 2/2007 | Sull et al. | |
| 2007/0075965 A1 | 4/2007 | Huppi et al. | |
| 2007/0085157 A1 | 4/2007 | Fadell et al. | |
| 2007/0100959 A1 | 5/2007 | Eichstaedt et al. | |
| 2007/0109279 A1 | 5/2007 | Sigona | |
| 2007/0126716 A1 | 6/2007 | Haverty | |
| 2007/0168367 A1 | 7/2007 | Dickinson et al. | |
| 2007/0186157 A1 | 8/2007 | Walker et al. | |
| 2007/0192674 A1 | 8/2007 | Bodin et al. | |
| 2007/0245020 A1 | 10/2007 | Ott, IV | |
| 2007/0257767 A1 | 11/2007 | Beeson | |
| 2007/0291297 A1 | 12/2007 | Harmon et al. | |
| 2008/0005666 A1 | 1/2008 | Sefton et al. | |
| 2008/0036743 A1 | 2/2008 | Westerman et al. | |
| 2008/0042978 A1 | 2/2008 | Perez-Noguera | |
| 2008/0082941 A1 | 4/2008 | Goldberg et al. | |
| 2008/0103906 A1 | 5/2008 | Singh | |
| 2008/0117168 A1 | 5/2008 | Liu et al. | |
| 2008/0126388 A1 | 5/2008 | Naaman | |
| 2008/0141132 A1 | 6/2008 | Tsai | |
| 2008/0155118 A1 | 6/2008 | Glaser et al. | |
| 2008/0158147 A1 | 7/2008 | Westerman et al. | |
| 2008/0158168 A1 | 7/2008 | Westerman et al. | |
| 2008/0158185 A1 | 7/2008 | Westerman | |
| 2008/0168403 A1 | 7/2008 | Westerman et al. | |
| 2008/0180406 A1 | 7/2008 | Han et al. | |
| 2008/0244468 A1 | 10/2008 | Nishihara et al. | |
| 2008/0288347 A1 | 11/2008 | Sifry | |
| 2008/0319932 A1 | 12/2008 | Yih et al. | |
| 2009/0025987 A1 | 1/2009 | Perksi et al. | |
| 2009/0073144 A1 | 3/2009 | Chen et al. | |
| 2009/0095540 A1 | 4/2009 | Zachut et al. | |
| 2009/0150373 A1 | 6/2009 | Davis et al. | |
| 2009/0157206 A1 | 6/2009 | Weinberg et al. | |
| 2009/0174679 A1 | 7/2009 | Westerman | |
| 2009/0178011 A1 | 7/2009 | Ording et al. | |
| 2009/0231275 A1 | 9/2009 | Odgers | |
| 2009/0232355 A1 | 9/2009 | Minear et al. | |
| 2009/0254869 A1 | 10/2009 | Ludwig et al. | |
| 2009/0259628 A1 | 10/2009 | Farrell | |
| 2009/0262637 A1 | 10/2009 | Badaye et al. | |
| 2009/0315835 A1 | 12/2009 | De Goes et al. | |
| 2009/0318192 A1 | 12/2009 | Leblanc et al. | |
| 2010/0036967 A1 | 2/2010 | Caine et al. | |
| 2010/0060602 A1 | 3/2010 | Agari et al. | |
| 2010/0085216 A1 | 4/2010 | Ms | |
| 2010/0094633 A1 | 4/2010 | Kawamura et al. | |
| 2010/0123666 A1 | 5/2010 | Wickholm et al. | |
| 2010/0127997 A1 | 5/2010 | Park et al. | |
| 2010/0194703 A1 | 8/2010 | Fedor et al. | |
| 2010/0214267 A1 | 8/2010 | Radivojevic et al. | |
| 2010/0225601 A1 | 9/2010 | Homma | |
| 2010/0251112 A1 | 9/2010 | Hinckley et al. | |
| 2010/0265185 A1 | 10/2010 | Oksanen | |
| 2010/0271322 A1 | 10/2010 | Kondoh et al. | |
| 2010/0274622 A1 | 10/2010 | Kennedy et al. | |

(56) References Cited

U.S. PATENT DOCUMENTS

| | | |
|---|---|---|
| 2010/0279738 A1 | 11/2010 | Kim et al. |
| 2010/0289754 A1 | 11/2010 | Sleeman et al. |
| 2010/0302184 A1 | 12/2010 | East et al. |
| 2010/0306649 A1 | 12/2010 | Russ |
| 2010/0309158 A1 | 12/2010 | Iwayama et al. |
| 2010/0309933 A1 | 12/2010 | Stark et al. |
| 2011/0003550 A1 | 1/2011 | Klinghult et al. |
| 2011/0007000 A1 | 1/2011 | Lim |
| 2011/0018825 A1 | 1/2011 | Kondo et al. |
| 2011/0057670 A1 | 3/2011 | Jordan |
| 2011/0057885 A1 | 3/2011 | Lehtovirta |
| 2011/0074544 A1 | 3/2011 | D'ouza |
| 2011/0074701 A1 | 3/2011 | Dickinson et al. |
| 2011/0080349 A1 | 4/2011 | Holbein et al. |
| 2011/0133934 A1 | 6/2011 | Tan et al. |
| 2011/0134063 A1 | 6/2011 | Norieda |
| 2011/0134083 A1 | 6/2011 | Norieda |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0167391 A1 | 7/2011 | Momeyer et al. |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse et al. |
| 2011/0238613 A1 | 9/2011 | Shehory et al. |
| 2011/0246463 A1 | 10/2011 | Carson, Jr. et al. |
| 2011/0246503 A1 | 10/2011 | Bender et al. |
| 2011/0248927 A1 | 10/2011 | Michaelis et al. |
| 2011/0248948 A1 | 10/2011 | Griffin et al. |
| 2011/0261083 A1 | 10/2011 | Wilson |
| 2011/0298798 A1 | 12/2011 | Krah |
| 2011/0310040 A1 | 12/2011 | Ben-Shalom et al. |
| 2012/0001875 A1 | 1/2012 | Li et al. |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0051596 A1 | 3/2012 | Darnell et al. |
| 2012/0056846 A1 | 3/2012 | Zaliva |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski |
| 2012/0206330 A1 | 8/2012 | Cao et al. |
| 2012/0262407 A1 | 10/2012 | Hinckley et al. |
| 2012/0274583 A1 | 11/2012 | Haggerty |
| 2012/0280827 A1 | 11/2012 | Kashiwagi et al. |
| 2012/0280927 A1 | 11/2012 | Ludwig |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0027404 A1 | 1/2013 | Sarnoff |
| 2013/0038554 A1 | 2/2013 | West |
| 2013/0091123 A1 | 4/2013 | Chen et al. |
| 2013/0100071 A1 | 4/2013 | Wright et al. |
| 2013/0141382 A1* | 6/2013 | Simmons ............ G06F 3/044 345/174 |
| 2013/0176264 A1 | 7/2013 | Alameh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller et al. |
| 2013/0316813 A1 | 11/2013 | Derome et al. |
| 2013/0328813 A1 | 12/2013 | Kuo et al. |
| 2013/0335333 A1 | 12/2013 | Kukulski et al. |
| 2014/0007002 A1 | 1/2014 | Chang et al. |
| 2014/0009401 A1 | 1/2014 | Bajaj et al. |
| 2014/0022189 A1 | 1/2014 | Sheng et al. |
| 2014/0032880 A1 | 1/2014 | Ka |
| 2014/0037951 A1 | 2/2014 | Shigetomi et al. |
| 2014/0071095 A1 | 3/2014 | Godsill |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0192023 A1* | 7/2014 | Hoffman ............ G06F 3/0421 345/175 |
| 2014/0208275 A1 | 7/2014 | Mongia et al. |
| 2014/0210788 A1 | 7/2014 | Harrsion et al. |
| 2014/0210791 A1 | 7/2014 | Hanauer et al. |
| 2014/0240271 A1 | 8/2014 | Land et al. |
| 2014/0240295 A1 | 8/2014 | Harrison |
| 2014/0253477 A1 | 9/2014 | Shim et al. |
| 2014/0267065 A1 | 9/2014 | Levesque |
| 2014/0267085 A1 | 9/2014 | Li et al. |
| 2014/0289659 A1 | 9/2014 | Harrison et al. |
| 2014/0300559 A1 | 10/2014 | Tanimoto et al. |
| 2014/0327626 A1 | 11/2014 | Harrison et al. |
| 2014/0331313 A1 | 11/2014 | Kim et al. |
| 2014/0368436 A1 | 12/2014 | Abzarian et al. |
| 2015/0002405 A1 | 1/2015 | Kuan et al. |
| 2015/0035759 A1 | 2/2015 | Harrison et al. |
| 2015/0077378 A1 | 3/2015 | Duffield |
| 2015/0145820 A1 | 5/2015 | Huang et al. |
| 2015/0242009 A1 | 8/2015 | Xiao et al. |
| 2015/0253858 A1 | 9/2015 | Koukoumidis et al. |
| 2015/0293592 A1 | 10/2015 | Cheong et al. |
| 2016/0012348 A1 | 1/2016 | Johnson et al. |
| 2016/0018942 A1 | 1/2016 | Kang et al. |
| 2016/0062545 A1 | 3/2016 | Lai |
| 2016/0077615 A1 | 3/2016 | Schwarz et al. |
| 2016/0077650 A1 | 3/2016 | Durojaiye et al. |
| 2016/0077664 A1 | 3/2016 | Harrison et al. |
| 2016/0085324 A1 | 3/2016 | Schwarz et al. |
| 2016/0085333 A1 | 3/2016 | Christopher |
| 2016/0085372 A1 | 3/2016 | Munemoto et al. |
| 2016/0098185 A1 | 4/2016 | Xiao et al. |
| 2016/0117015 A1 | 4/2016 | Veneri et al. |
| 2016/0156837 A1 | 6/2016 | Rodzevski et al. |
| 2016/0171192 A1 | 6/2016 | Holz et al. |
| 2016/0224145 A1 | 8/2016 | Harrison et al. |
| 2016/0231865 A1 | 8/2016 | Harrison et al. |
| 2016/0299615 A1 | 10/2016 | Schwarz et al. |
| 2017/0024892 A1 | 1/2017 | Harrison et al. |
| 2017/0060279 A1 | 3/2017 | Harrison |
| 2017/0153705 A1 | 6/2017 | Kim et al. |

FOREIGN PATENT DOCUMENTS

| | | |
|---|---|---|
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |

(56) References Cited

FOREIGN PATENT DOCUMENTS

| | | |
|---|---|---|
| CN | 102362249 A | 2/2012 |
| CN | 102789332 A | 11/2012 |
| CN | 103150019 A | 6/2013 |
| CN | 104020878 A | 9/2014 |
| EP | 0 938 039 A2 | 8/1999 |
| EP | 1 659 481 A2 | 5/2006 |
| EP | 1 762 926 A2 | 3/2007 |
| EP | 2 136 358 A1 | 12/2009 |
| EP | 2 280 337 A2 | 2/2011 |
| GB | 2 344 894 A | 6/2000 |
| GB | 2 468 742 A | 9/2010 |
| JP | H09-69137 A | 3/1997 |
| JP | 2004-213312 A | 7/2004 |
| JP | 2005-018611 A | 1/2005 |
| JP | 2007-524970 A | 8/2007 |
| JP | 2009-543246 A | 12/2009 |
| JP | 2011-028555 A | 2/2011 |
| JP | 2013-519132 A | 5/2013 |
| JP | 2013-532495 A | 8/2013 |
| KR | 10-2002-0075283 A | 10/2002 |
| KR | 10-2011-0061227 A | 6/2011 |
| KR | 10-2012-0100351 A | 9/2012 |
| WO | 94/004992 A1 | 3/1994 |
| WO | 2006/070044 A1 | 7/2006 |
| WO | 2008/126347 A1 | 10/2008 |
| WO | 2009/071919 A1 | 6/2009 |
| WO | 2011/096694 A2 | 8/2011 |
| WO | 2012/064034 A1 | 5/2012 |
| WO | 2012166277 A1 | 12/2012 |
| WO | 2013/059488 A1 | 4/2013 |
| WO | 2013/061998 A1 | 5/2013 |
| WO | 2014/037951 A1 | 3/2014 |
| WO | 2014/182435 A1 | 11/2014 |

OTHER PUBLICATIONS

U.S. Appl. No. 14/495,041, filed Sep. 24, 2014, titled: "Method for Improving Accuracy of Touch Screen Event Analysis By Use of Spatiotemporal Touch Patterns.", 34 pages.

U.S. Appl. No. 14/483,150, filed Sep. 11, 2014, titled: "Method and Apparatus for Differentiating Touch Screen Users Based On Touch Event Analysis.", 38 pages.

U.S. Appl. No. 14/242,127, filed Apr. 1, 2014, titled: Method and Apparatus for Classifying Dtouch Events on a Touch Sensitive Surface, 36 pages.

U.S. Appl. No. 13/849,698, filed Mar. 23, 2013, titled: "Method and System for Activating Different Interactive Functions Using Different Types of Finger Contacts.", 52 pages.

U.S. Appl. No. 13/780,494, filed Feb. 28, 2013, titled: "Input Tools Having Viobro-Acoustically Distinct Regions and Computing Device for Use With the Same.", 34 pages.

Final Office Action dated Jul. 12, 2017 in U.S. Appl. No. 14/495,041, 14 pages.

Final Office Action dated Jul. 18, 2017 in U.S. Appl. No. 14/191,329, 17 pages.

Final Office Action dated Jun. 8, 2016 in U.S. Appl. No. 14/495,041, 16 pages.

Final Office Action dated Jun. 30, 2017 in U.S. Appl. No. 13/958,427, 15 pages.

Final Office Action dated Mar. 7, 2018 in U.S. Appl. No. 14/219,919, 21 pages.

Final Office Action dated Mar. 28, 2016 in U.S. Appl. No. 13/958,427, 16 pages.

Final Office Action dated May 6, 2016 in U.S. Appl. No. 14/191,329, 17 pages.

Final Office Action dated May 13, 2016 in U.S. Appl. No. 14/390,831, 6 pages.

Final Office Action dated May 20, 2016 in U.S. Appl. No. 14/503,894, 17 pages.

Final Office Action dated Nov. 9, 2016 in U.S. Appl. No. 14/612,089, 11 pages.

Final Office Action dated Nov. 23, 2015 in U.S. Appl. No. 14/668,870, 14 pages.

Final Office Action dated Sep. 6, 2017 in U.S. Appl. No. 14/486,800, 17 pages.

International Search Report and Written Opinion dated Jul. 8, 2013 in International Application No. PCT/CA2013/000292, 9 pages.

International Search Report and Written Opinion dated Jun. 6, 2012 in International Patent Application No. PCT/CA2012/050127, 10 pages.

"Making it Easier to Share With Who You Want," Facebook, Aug. 23, 2011, last updated on Dec. 12, 2012 retrieved from https://www.facebook.com/notes/facebooklmaking-it-easier -to-share-with-who-you-want/10150251867797131l, retrieved on Jun. 1, 2018, 14 pages.

Cheng, B. et al., "SilentSense: Silent User Identification via Dynamics of Touch and Movement Behavioral Biometrics," Cryptography and Security (cs CR); Human-Computer Interaction, pp. 9, Aug. 31, 2013.

S. Furui, "Digital Speech Processing, synthesis, and recognition" Marcel Dekker, Inc. 2001. 40 pages.

English Translation of Chinese Office Action dated Nov. 3, 2017 in Chinese Application No. 201480002856.0, 12 pages.

English Translation of Final Rejection dated Apr. 27, 2015 in Korean Patent Application No. 10-14-0027979, 3 pages.

English Translation of Final Rejection dated Dec. 12, 2014 in Korean Patent Application No. 10-2014-0027979, 3 pages.

English Translation of First Office Action dated Feb. 27, 2017 in Chinese Application No. 201480002879.1, 13 pages.

English Translation of First Office Action dated May 2, 2017 in Chinese Patent Application No. 201580000833.0, 9 pages.

English Translation of First Office Action dated Oct. 11, 2017 in Chinese Patent Application No. 20150209998.0, 10 pages.

English Translation of Notification of Reason for Refusal dated Jul. 10, 2014 in Korean patent application No. 10-2014-0027979, 3 pages.

Final Office Action dated Jan. 5, 2018 in U.S. Appl. No. 14/503,894, 16 pages.

English Translation of Second Office Action dated Jul. 6, 2017 in Chinese Application No. 201480002879.1, 14 pages.

English Translation of Third Office Action dated Oct. 16, 2017 in Chinese Application No. 201480002879.1, 4 pages.

Communication pursuant to Article 94(3) EPC dated Feb. 26, 2018 for European Patent Application No. 14785422.8, 7 pages.

Communication pursuant to Article 94(3) EPC dated Mar. 5, 2018 for European Patent Application No. 14794212.2, 5 pages.

Extended European Search Report dated Apr. 16, 2018 in European Application No. 15845310.0, 7 pages.

Extended European Search Report dated Aug. 11, 2016 in European Patent Application No. 14785422.8, 8 pages.

Extended European Search Report dated Aug. 25, 2017 in European Patent Application No. 157 48667.1, 10 pages.

Extended European Search Report dated Jul. 22, 2014 in European Patent Application No. 12755563.9, 5 pages.

Extended European Search Report dated Mar. 16, 2018 in European Patent Application No. 15842839.1, 7 pages.

Extended European Search Report dated Mar. 19, 2018 in European Patent Application No. 15840819.5, 9 pages.

Extended European Search Report dated Mar. 19, 2018 in European Patent Application No. 15843933.1, 8 pages.

Extended European Search Report dated Mar. 27, 2018 in European Patent Application No. 15843989.3, 8 pages.

Extended European Search Report dated May 14, 2018 in European Patent Application No. 15847469.2, 11 pages.

Weidong, S. et al., "SenGuard: Passive user identification on smartphones using multiple sensors," IEEE 7th International Conference on Wireless and Mobile Computing, Networking and Communications {WiMob), pp. 141-148, 2011.

Final Office Action dated Feb. 9, 2016 in U.S. Appl. No. 14/486,800, 14 pages.

Final Office Action dated Feb. 26, 2016 in U.S. Appl. No. 14/492,604, 16 pages.

Non-Final Office Action dated Sep. 9, 2016 in U.S. Appl. No. 13/887,711, 24 pages.

(56) References Cited

OTHER PUBLICATIONS

Non-Final Office Action dated Sep. 29, 2016 in U.S. Appl. No. 14/834,434, 12 pages.
Pedro, L et al., "Augmenting touch interaction through acoustic sensing", Proceedings of the ACM International Conference on Interactive Tabletops and Surfaces, pp. 53-56, Nov. 13-16, 2011.
Final Office Action received for U.S. Appl. No. 14/684,407 dated Jan. 18, 2017, 20 pages.
Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated May 31, 2017, 21 pages.
Final Office Action received for U.S. Appl. No. 15/073,407, dated Dec. 20, 2016, 49 pages.
Non-Final Office Action received for U.S. Appl. No. 13/958,427, dated Nov. 10, 2016, 22 pages.
Final Office Action received for U.S. Appl. No. 14/219,919, dated Aug. 26, 2016, 24 pages.
Non-Final Office Action received for U.S. Appl. No. 14/191,329, dated on Feb. 2, 2017, 20 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Non-Final Office Action received for U.S. Appl. No. 14/486,800, dated Dec. 1, 2016, 29 pages.
Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Non-Final Office Action received for U.S. Appl. No. 14/684,407, dated Sep. 14, 2018, 24 pages.
Final Office Action received for U.S. Appl. No. 14/834,434, dated May 1, 2017, 18 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan. 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
Non-Final Office Action received for U.S. Appl. No. 13/958,427, dated Mar. 13, 2015, 50 pages.
Final Office Action received for U.S. Appl. No. 13/958,427, dated Jun. 19, 2015, 17 pages.
Non-Final Office Action received for U.S. Appl. No. 13/887,711, dated Apr. 6, 2015, 36 pages.
Final Office Action received for U.S. Appl. No. 14/191,329, dated Aug. 7, 2015, 29 pages.
Non-Final Office Action received for U.S. Appl. No. 14/492,604, dated Oct. 1, 2015, 16 pages.
International Search Report and Written Opinion received for PCT Application No. PCT/US2014/049485 dated Nov. 17, 2014, 9 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
Non-Final Office Action received for U.S. Appl. No. 14/483,150 dated Dec. 18, 2015, 7 pages.
Non-Final Office Action—dated Oct. 2, 2015 U.S. Appl. No. 14/486,800, filed Sep. 15, 2014, 21 pages.
Non-Final Office Action received for U.S. Appl. No. 14/503,894, dated Dec. 30, 2015, 18 pages.
Non-Final Office Action—dated Jan. 29, 2016 U.S. Appl. No. 14/219,919, 11 pages.
Non-Final Office Action dated Nov. 5, 2015 U.S. Appl. No. 13/887,711, 19 pages.
Final Office Action dated Feb. 24, 2016 U.S. Appl. No. 13/887,711, 23 pages.
International Search Report and Written Opinion for PCT/US2015/051355; dated Dec. 15, 2015, 9 pages.
International Search Report and Written Opinion for PCT/US2015/047428; dated Nov. 27, 2015, 6 pages.
International Search Report and Written Opinion for PCT/US2015/050570; dated Dec. 17, 2015, 8 pages.
International Search Report and Written Opinion for PCT/US2015/014581; dated May 14, 2015, 7 pages.
Non-Final Office Action—dated Oct. 7, 2015 U.S. Appl. No. 14/495,041, 14 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
U.S. Appl. No. 13/958,427, filed Aug. 2, 2013, titled: "Capture of Vibro-Acoustic Data Used to Determine Touch Types.".
U.S. Appl. No. 14/191,329, filed Feb. 26, 2014, titled: "Using Capacitive Images for Touch Type Classification.".
U.S. Appl. No. 13/887,711, filed May 6, 2013, titled: "Using Finger Touch Types to Interact with Electronic Devices.".
Sarah, M. K. et al., "A Personal Touch—Recognizing Users Based on Touch Screen Behavior," PhoneSense'12, Nov. 6, 2012, Toronto, ON, Canada, Nov. 6, 2012, pp. 5.
Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.
"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Kherallah, Metal., "On-line handwritten digit recognition based on trajectory and velocity modeling," Pattern Recognition Letters, vol. 29, Issue 5, pp. 580-594, Apr. 1, 2008.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 19, 2017 in U.S. Appl. No. 14/869,998, 7 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.

(56) References Cited

OTHER PUBLICATIONS

Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18,2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl. No. 14/751,589, 27 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
Non-Final Office Action dated Jun. 26, 2018 in U.S. Appl. No. 14/486,800, 25 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages.
Chinese Office Action for Chinese Patent Application No. 201280062500.7, dated Apr. 27, 2018, 19 pages.
Chinese Office Action for Chinese Patent Application No. 201280062500.7, dated Oct. 10, 2018, 14 pages.
Office Action dated Mar. 30, 2018 for U.S. Appl. No. 15/886,562, 44 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 11 pages (including English translation).
Office Action dated Jan. 28, 2019 for U.S. Appl. No. 15/836,798, 30 pages.
Non-Final Office Action received for U.S. Appl. No. 14/242,127 dated Jun. 2, 2015, 33 pages.
Final Office Action received for U.S. Appl. No. 14/242,127 dated Sep. 18, 2015, 28 pages.
Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Asano et al., "Real-Time Sound Source Localization and Separation System and Its Application to Automatic Speech Recognition", Proceedings of Eurospeech, 2001; p. 1013-1016; 2001.
Benko et al., "Sphere: Multi-Touch Interactions on a Spherical Display", Proceedings of UIST, 2008; pp. 77-86.
Burges, Christopher J.C., "A Tutorial on Support Vector Machines for Pattern Recognition", Data Mining and Knowledge Discovery, 2, 1998 pp. 121-167.
Cao et al., "ShapeTouch: Leveraging Contact Shape on Interactive Surfaces", IEEE International Workshop on Horizontal Interactive Human Computer System (Tabletop), 2008, pp. 139-146.
Deyle et al., "Hambone: A Bio-Acoustic Gesture Interface", Proceedings of ISWC, 2007, pp. 1-8.
Dietz et al., DT Controls: Adding Identity to Physical Interfaces, ACM Symposium on User Interface Software & Technology (UIST), 2005, pp. 245-252.
Dietz et al., "DiamondTouch: A Multi-User Touch Technology" ACM Symposium on User Interface Software & Technology (UIST), 2001, pp. 219-226.
Gutwin et al., "Supporting Informal Collaboration in Shared-Workspace Groupware", Journal of Universal Computer Science, vol. 14, No. 9, 2008, pp. 1411-1434.
Hall et al., "The WEKA Data Mining Software: An Update", SIGKDD Explorations,vol. 11, No. 1, 2009, pp. 10-18.
Harrison et al., Skinput: Appropriating the Body as an Input Surface, Proceedings of CHI, Apr. 10-15, 2010, pp. 453-462.
Harrison et al., "Scratch Input: Creating Large, Inexpensive, Unpowered and Mobile Finger Input Surfaces", Proceedings of UIST, 2008, pp. 205-208.
Hartmann et al., "Augmenting Interactive Tables with Mice & Keyboards", Proceedings of UIST, 2009, pp. 149-152.
Hinckley et al., "Sensor Synaesthesia: Touch in Motion, and Motion in Touch", Proceedings of CHI, 2011, pp. 801-810.
Hinckley et al., "Pen+ Touch=New Tools", Proceedings of UIST, 2010, pp. 27-36.
Hinkley et al., "Manual Deskterity: An Exploration of Simultaneous Pen+ Touch Direct Input", Proceedings of CHI, 2010, pp. 2793-2802.
Holz et al., "The Generalized Perceived Input Point Model and How to Double Touch Accuracy by Extracting Fingerprints" Proceedings of CHI, 2010, pp. 581-590.
Kaltenbrunner., "reacTIVision: A Computer-Vision Framework for Table-Based Tangible Interaction", Proceedings ofTEI, 2007, pp. 69-74.
Matsushita et al., "HoloWall: Designing a Finger, Hand, Body, and Object Sensitive Wall", Proceedings of UIST, 1997, pp. 209-210.
"Mimio", http://www.mimio.com, retrieved Jul. 8, 2019, 8 pages.
Olwal et al., "SurfaceFusion: Unobtrusive Tracking of Everyday Objects in Tangible User Interfaces", Proceedings of GI, 2008, pp. 235-242.

(56) References Cited

OTHER PUBLICATIONS

Paradiso et al., "Tracking and Characterizing Knocks Atop Large Interactive Displays", Sensor Review, vol. 25, No. 2, 2005, pp. 134-143.
Paradiso et al., "Sensor Systems for Interactive Surfaces", IBM Systems Journal, vol. 39 No. 3&4, 2000, pp. 892-914.
Patten, James, Mcmichael., "Sensetable: A Wireless Object Tracking Platform for Tangible User Interfaces", Proceedings of CHI, 2001, pp. 253-260.
Rekimoto et al., "Augmented Surfaces: A Spatially Continuous Work Space for Hybrid Computing Environments", Proceedings of CHI, 1999, pp. 378-385.
Rekimoto et al., "ToolStone: Effective use of the Physical Manipulation Vocabularies of Input Devices", Proceedings of UIST, 2000, pp. 109-117.
Rekimoto et al., "SmartSkin: An Infrastructure for Freehand Manipulation on Interactive Surfaces", Proceedings of CHI, 2002, pp. 113-120.
Vandoren et al., "DIP-IT: Digital Infrared Painting on an Interactive Table", Proceedings of CHI, 2008, pp. 2901-2906.
Wang et al., "Empirical Evaluation for Finger Input Properties in Multi-Touch Interaction", Proceedings of CHI, 2009, pp. 1063-1072.
International Search Report and Written Opinion received for International Patent Application No. PCT/US2012/060865 dated Mar. 29, 2013, 10 pages.
Non-Final Office Action received for U.S. Appl. No. 15/206,554 dated Sep. 21, 2016, 36 pages.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Chinese Office Action for Chinese Patent Application No. 201280062500.7 dated Apr. 17, 2017, 15 pages.
Japanese Office Action for Japanese Patent Application No. 2014-537253 dated May 16, 2017, 5 pages.
Seo et al.., "Audio Fingerprinting Based on Normalized Spectral Subband Centroids," Proc. ICASSP, {U.S.A.), 2005, vol. 3, p. 213-216. Retrieved on May 29, 2017, 4 pages.
Kunio, "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
European Search Report dated Jul. 24, 2015 for European Application No. 12842495.9, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Japanese Office Action for Japanese Patent Application No. 2017-049566 dated Jun. 5, 2018, 7 pages.
Non-Final Office Action received for U.S. Appl. No. 14/684,407 dated Jul. 8, 2016, 11 pages.
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Chinese Office Action dated Apr. 21, 2017 for Chinese Patent Application No. 201480022056.5, 23 pages (with Translation).
Chinese Office Action dated Feb. 9, 2018 for Chinese Patent Application No. 201480022056.5, 19 pages (with Translation).

Non-Final Office Action received for U.S. Appl. No. 16/126,175 dated Nov. 1, 2018, 86 pages.
Third Chinese Office Action received for Chinese Patent Application No. 201480022056.5 dated Jul. 19, 2018, 6 pages (with English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Chinese First Office Action received for Chinese Patent Application No. 201510240372.6 dated Sep. 27, 2018, 18 pages.
Chinese Second Office Action received for Chinese Patent Application No. 201510240372.6 dated May 15, 2019, 16 pages.
Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 pages.
European Search Report received for European Patent Application No. 16839786.7, dated Feb. 12, 2019, 8 pages.
Communication pursuant to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 8 pages.
Communication pursuant to Rules 70(2) and 70a(2) EPC received for European Patent Application No. 16818725.0 dated Jan. 8, 2019, 1 page.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
European Search Report dated Apr. 8, 2019 for European Application No. 18195588.1, 7 pages.
Non-Final Office Action received for U.S. Appl. No. 15/836,798 dated Jul. 5, 2019, 95 pages.
Final Office Action received for U.S. Appl. No. 14/684,407 dated Jun. 10, 2019, 26 pages.
Non-Final Office Action received for U.S. Appl. No. 14/191,329 dated Jul. 16, 2019, 30 pages.
Chinese First Office Action received for Chinese Patent Application Serial No. 201580051873.8 dated Jun. 21, 2019, 15 pages (Including English Translation).
Final Office Action received for U.S. Appl. No. 13/887,711 dated Jul. 25, 2019, 24 pages.
Final Office Action received for U.S. Appl. No. 14/684,407 dated Sep. 20, 2019, 26 pages.
Final Office Action received for U.S. Appl. No. 14/495,041 dated Aug. 9, 2019, 26 pages.
Non-Final Office Action received for U.S. Appl. No. 14/834,434 dated Aug. 5, 2019, 19 pages.
Final Office Action received for U.S. Appl. No. 16/126,175 dated Aug. 2, 2019, 161 pages.

* cited by examiner

MANAGING ACTIVITY STATES OF AN APPLICATION PROCESSOR IN RELATION TO TOUCH OR HOVER INTERACTIONS WITH A TOUCH SENSITIVE DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to touch surface technology, e.g., managing activity states of an application processor in relation to touch or hover interactions with a touch sensitive device.

BACKGROUND

Various electronic devices today typically can be operated by a user interacting with a touch screen or other type of touch sensitive surface. This feature is particularly a characteristic of the recent generation of smart phones. Typically, touch display screens can respond to finger contact to activate the touch display screen for further processes. Contact also can be made with the touch display screen using tools such as a stylus, other parts of the hand such as the palm and various parts of the finger.

The above-described description is merely intended to provide a contextual overview relating to touch sensitive devices, and is not intended to be exhaustive.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with a non-limiting, example implementation, a method can comprise monitoring, by a system comprising a processor, a touch sensitive surface of a device for a touch interaction or a hover interaction by an object with the touch sensitive surface. The method also can comprise controlling, by the system, activity states of an application processor of the device based at least in part on the touch interaction or the hover interaction by the object with the touch sensitive surface.

In accordance with another non-limiting, example implementation, a system can comprise an application processor that monitors a touch sensitive surface of a device for a touch interaction by an object with the touch sensitive surface. The system also can include a touch controller component that monitors the touch sensitive surface for a hover interaction by the object with the touch sensitive surface, wherein activity states of the application processor are controlled based at least in part on the touch interaction or the hover interaction by the object with the touch sensitive surface.

In accordance with still another non-limiting, example implementation, a machine-readable medium can comprise executable instructions that, when executed by a processor, facilitate performance of operations. The operations can comprise, in connection with an electronic device being used with a phone application for a phone call or a non-data application that does not utilize an application processor of the electronic device, determining whether there is a touch interaction or a hover interaction by an object with a touch sensitive surface of the electronic device. The operations also can include managing activity modes of the application processor based at least in part on a result of the determining of whether there is the touch interaction or the hover interaction by the object with the touch sensitive surface, wherein the activity modes comprise at least an awake mode and a sleep mode.

The following description and the annexed drawings set forth certain illustrative aspects of the specification. These aspects are indicative, however, of but a few of the various ways in which the principles of the specification may be employed. Other advantages and enhanced features of the specification will become apparent from the following detailed description of the specification when considered in conjunction with the drawings.

BRIEF DESCRIPTION OF THE DRAWINGS

Numerous aspects, implementations, objects, and advantages of the disclosed subject matter will be apparent upon consideration of the following detailed description, taken in conjunction with the accompanying drawings, in which like reference characters can refer to like parts throughout, and in which.

DETAILED DESCRIPTION

Figure 1:
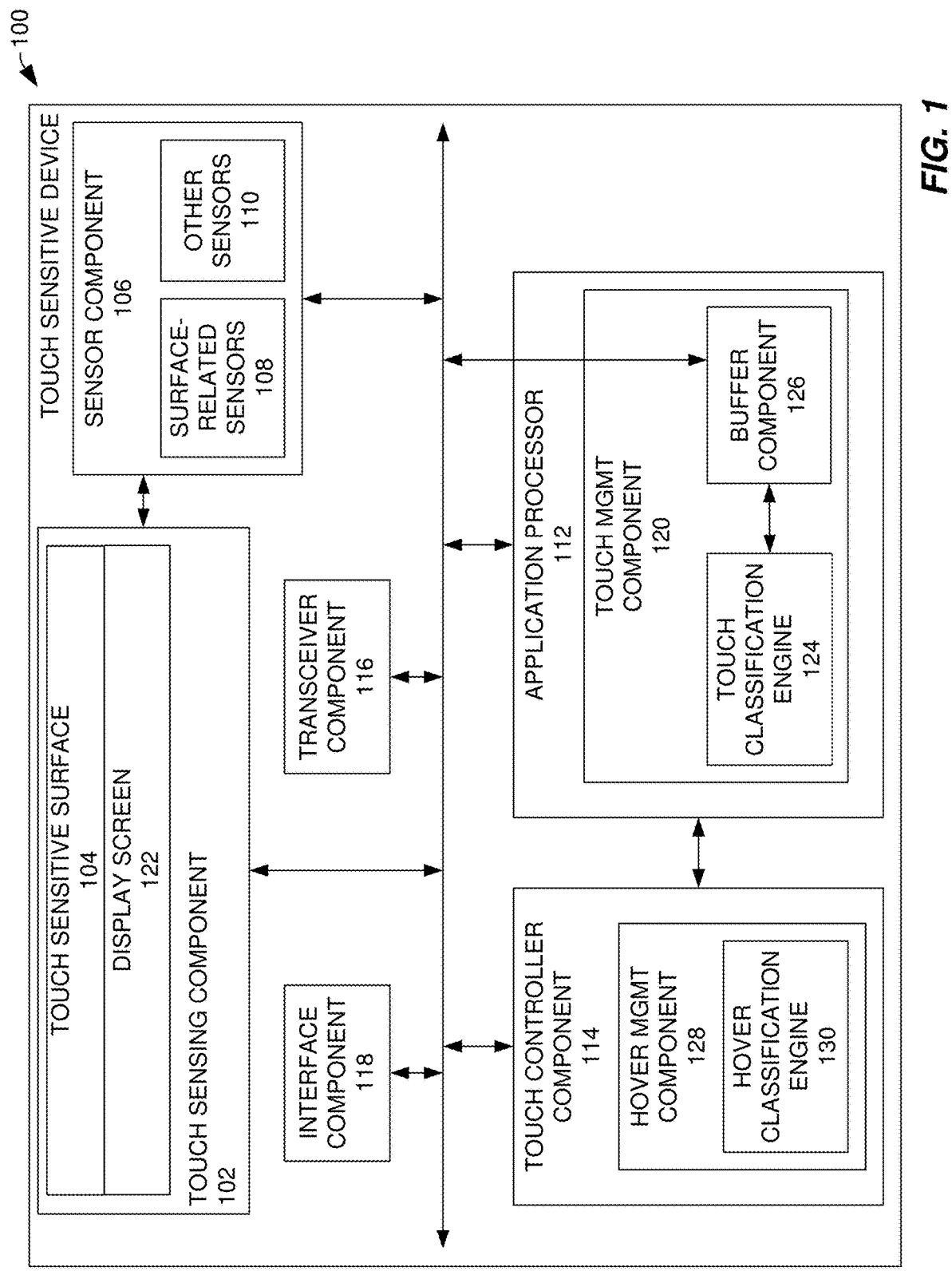
FIG. 1 illustrates a block diagram of an example touch sensitive device that can manage the use of an application processor in connection with classifications of interactions of objects with a touch sensitive surface of the touch sensitive device, in accordance with various aspects and embodiments of the disclosed subject matter.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure might be practiced without these specific details, or with other methods, components, materials, etc. In other instances, well-known structures and devices are shown in block diagram form to facilitate describing one or more aspects.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The figures in the following description relate to preferred embodiments by way of illustration only. The figures are not necessarily to scale. It should be noted that from the following discussion, alternative embodiments of the structures and methods disclosed herein will be readily recognized as viable alternatives that may be employed without departing from the principles of what is claimed.

Various electronic devices today typically can be operated by a user interacting with a touch screen. This feature is particularly a characteristic of the recent generation of smart phones, electronic pads or tablets, electronic or smart watches, and certain computers. Typically, a touch display screen can comprise a touch sensitive surface that can respond to finger contact to activate and/or utilize the touch display screen for further processes. Contact also can be made with the touch display screen using tools, such as a stylus, or other parts of the hand, such as the palm and/or various parts of the finger.

There can be instances where a user of an electronic device (e.g., smart or mobile phone) can unintentionally and undesirably touch the touch display screen to activate the touch display screen and/or cause unintentional and undesirable operations to be performed by the electronic device based on the unintentional and undesirable touching of the touch display screen. For example, the user can be using the electronic device to make a phone call, and the user's ear, part of the user's face (e.g., cheek), finger(s) (e.g., finger(s) wrapped around the electronic device) can come into contact with, or can come within sufficient proximity to, the touch display screen to unintentionally activate the touch display screen and/or cause an unintentional operation(s) (e.g., unintentional pressing of a button or control on the touch display screen) to be performed by the electronic device, in response to the unintentional touch or hover event by the ear, face, one or more fingers, or other body part with the touch display screen. As another example, the user can be gripping the electronic device in the user's hand, and one or more fingers of the user can be wrapped around the electronic device such that the one or more fingers can unintentionally come in contact with or sufficient proximity to the touch display screen, or the palm or other body part of the user can unintentionally come in contact with or sufficient proximity to the touch display screen, to unintentionally activate the touch display screen and/or cause an unintentional operation(s) to be performed by the electronic device, in response to the unintentional touch event by the one or more fingers, palm, or other body part with the touch display screen.

Also, an application processor typically can be utilized to perform various operations and handle the monitoring, analyzing, classifying, etc., of all touch and hover events associated with the touch display screen, as well as perform various other functions and operations for the electronic device. The application processor also can be utilized for various applications, including, for example, applications involving data where the mobile data network is utilized (e.g., data is transferred to or from the electronic device via the mobile data network). However, when a user is making a phone call, or utilizing an application that does not involve data transfers using the mobile data network, the application processor is not used, or does not have to be used, to process the phone call or perform operations in connection with the phone call or other application that does not involve data transfers using the mobile data network. For instance, when the electronic device is utilized for a phone call, a transceiver component, which can comprise, for example, a modem component and certain other components (e.g., radio frequency (RF) components), can be utilized to perform the functions and operations associated with the phone call, and the application processor does not have to perform functions or operations associated with the phone call. Also, when the user is holding the electronic device up to or near the user's ear during the phone call or during use of certain non-data applications on the electronic device, the user typically is not interacting with, or at least is not intentionally interacting with, the touch display screen, for example, to press buttons or use controls on the touch display screen, wherein the certain non-data applications can be applications where the mobile data network is not being used and where an application processor of the electronic device does not have to be used.

In such instances, during a phone call or during use of certain non-data applications on the electronic device, when the user is holding the electronic device up to or near the user's ear and/or when the user is holding (e.g., gripping) the electronic device while engaging in the phone call on speaker phone or while using earbuds, where the application processor is not being used, or when it is not desirable or necessary for the application processor to be used, for the phone call or with regard to such certain non-data type of application, the application processor can still be utilizing a significant amount of power to monitor the touch display screen for any touches or hovers of the ear, face, finger, or other body part of the user on or in proximity to the touch display screen, even though the user is engaging in a phone call or using such certain non-data application, and the user is not intending to interact with the touch display screen to press buttons or use controls on the touch display screen during that time. It can be desirable to reduce the amount of power utilized by the electronic device, and in particular, reduce, minimize, or eliminate the undesired (e.g., unnecessary) use of power by the application processor, in such instances.

To that end, techniques that can improve efficiency (e.g., reduce power usage) of an electronic device (e.g., a touch sensitive device) are presented. The electronic device can comprise a touch sensitive surface associated with a display screen. The electronic device also can comprise an application processor and a touch controller component, wherein the application processor can be associated with (e.g., communicatively connected to) the touch controller component, and wherein the application processor and the touch controller component can be associated with the touch sensitive surface. The touch controller component can comprise a hover classification engine that can detect and classify (e.g., determine classifications for) touch or hover interactions with the touch sensitive surface. The application processor can comprise a touch classification engine that can detect and classify (e.g., determine classifications for) touch interactions with the touch sensitive surface.

There can be instances where the electronic device is using a phone application for a phone call by a user or using a non-data application that does not utilize the application processor (e.g., a non-data application that can operate using processing components of the electronic device other than the application processor). The touch controller component and application processor can operate and coordinate with each other to allow the application processor to transition from an active state (e.g., awake state or mode) to an inactive state (e.g., sleep state or mode) when the electronic device is using the phone application or other non-data application and no intentional touch interaction of an object(s) (e.g., finger(s) of the user) with the touch sensitive surface is detected or identified by the application processor or touch controller component. This can save a significant amount of power and resources of the electronic device, as the touch controller component can utilize significantly less power than the application processor.

For instance, the application processor and/or touch controller component can monitor the touch sensitive surface to detect touch or hover interactions by an object(s) with the touch sensitive surface. The application processor can comprise a touch classification engine and the touch controller component can comprise a hover classification engine. The application processor and/or touch controller component can receive sensor data from sensors associated with the touch sensitive surface or other sensors (e.g., accelerometer, gyroscope, or inertial measurement unit (IMU), . . . ) of the electronic device, wherein the sensor data can comprise touch surface data obtained from the sensors associated with the touch sensitive device and motion-related data obtained from the other sensor(s). The application processor and/or touch controller component can detect a hover or touch interaction of an object(s) with the touch sensitive surface. The hover classification engine or touch classification engine can analyze the sensor data. Based at least in part on the results of such analysis, the hover classification engine or the touch classification engine can classify the hover or touch interaction as an intentional touch interaction (e.g., an intentional touch event or touch down event, such as a user pressing on the touch sensitive surface to press or manipulate a button or control of the electronic device), an unintentional touch interaction (e.g., an ear or cheek of the user inadvertently coming into contact with the touch sensitive surface during a phone call), or an unintentional hover interaction (e.g., an unintentional hover of the ear or cheek of the user in proximity to the touch sensitive surface during a phone call).

In response to the hover classification engine or touch classification engine classifying a touch or hover interaction of an object(s) with the touch sensitive surface as unintentional (e.g., an unintentional ear or face touch or hover interaction with the touch sensitive surface), the application processor can reject touch or hover interaction and can prevent an operation or function being performed based on the unintentional touch or hover interaction. The application processor also can transition from an active state to an inactive state and/or can transition the display screen of the electronic device from an on state to an off state.

The touch controller component can continue to monitor touch or hover interactions by an object(s) with the touch sensitive surface. If the touch controller component detects a hover or touch interaction by an object(s) with the touch sensitive surface, the hover classification engine can determine whether the hover or touch interaction is to be classified as an intentional touch interaction, an unintentional touch interaction, or an unintentional hover interaction, based at least in part on the results of analyzing sensor data associated with the touch sensitive surface.

In response to the hover classification engine classifying the hover or touch interaction as unintentional, the touch controller component can reject the unintentional hover or touch interaction. In some embodiments, the application processor can remain in the inactive state and/or the display screen can remain in the off state. For example, if the hover classification engine determines that the hover or touch interaction comprises an unintentional hover or touch interaction of the face or ear of the user with the touch sensitive surface, the touch controller component can reject the unintentional hover or touch interaction, and the application processor can remain in the inactive state and/or the display screen can remain in the off state.

In certain embodiments, if the hover classification engine determines that the hover or touch interaction comprises an unintentional hover or touch interaction (e.g., unintentional finger hover or touch interaction) with the touch sensitive surface that does not include the ear or face of the user, the touch controller component can reject the unintentional hover or touch interaction, and can generate a notification signal that can indicate that an unintentional touch interaction, which does not involve the ear or face of the user, has occurred, wherein such notification signal can facilitate transitioning the application processor from the inactive state to the active state. The touch controller component can communicate such notification signal to the application processor. In response to receiving such notification signal, the application processor can transition from the inactive state to the active state, and/or the application processor can transition the display screen from the off state to the on state (or the display screen can remain in the off state (e.g., until an intentional touch interaction is detected and classified)).

In response to the hover classification engine classifying a touch interaction of an object(s) with the touch sensitive surface as an intentional touch interaction, the touch controller component can generate a notification signal that can indicate that an intentional touch interaction has occurred. The touch controller component can communicate the notification signal to the application processor. In response to receiving the notification signal, the application processor can transition from the inactive state to the active state, transition the display screen from the off state to the on state, and process the intentional touch interaction to perform an operation based at least in part on the intentional touch interaction.

In some embodiments, while the application processor is in the inactive state, if the touch controller component determines that there is no touch or hover interaction of an object(s) with the touch sensitive surface, the touch controller component can generate and communicate a notification signal, which can indicate that there is no touch or hover interaction, to facilitate transitioning the application processor from the inactive state to the active state. For instance, initially, the ear or face of the user can be touching or hovering in proximity to the touch sensitive surface, wherein, in response to such unintentional touch or hover of the ear or face of the user, the application processor can reject such unintentional touch or hover interaction and can transition from the active state to inactive state and/or can transition the display screen from the on state to the off state. Subsequently, the user can move the touch sensitive device away from the ear and face of the user, wherein there is no object touching or hovering in proximity to the touch sensitive surface. The touch controller component can detect or determine that there is no touch or hover interaction occurring with the touch sensitive surface, and can generate the notification signal that can indicate that there is no touch or hover interaction. The touch controller component can communicate such notification signal to the application processor. In response to receiving such notification signal, the application processor can transition from the inactive state to the active state and/or can transition the display screen from the off state to the on state.

These and other aspects and embodiments of the disclosed subject matter are described with regard to the figures.

FIG. 1 illustrates a block diagram of an example touch sensitive device 100 that can manage the use of an application processor in connection with classifications of interactions of objects with a touch sensitive surface of the touch sensitive device, in accordance with various aspects and embodiments of the disclosed subject matter. Managing the use of the application processor in connection with classifications of interactions of objects with the touch sensitive surface of the touch sensitive device 100 can enable efficient classification of touch and hover interactions associated with the touch sensitive device 100, including reducing the amount of power used by the touch sensitive device 100 to monitor interactions of objects with the touch sensitive surface and perform touch and hover classifications.

The touch sensitive device 100 can be or can comprise, for example, a mobile phone (e.g., a cellular phone and/or smart phone), an electronic tablet or notebook (e.g., a touch sensitive graphic tablet or notebook), a personal digital assistant (PDA), a web pad, an electronic gaming device, a computer, a display table, an electronic workstation, a television, an Internet protocol (IP) television (IPTV), a set-top box, a device (e.g., touch sensitive device) in or integrated with a vehicle, a touch pad, a track pad, or other type of device. Various aspects and embodiments of the disclosed subject matter can relate to, for example, the use of touch sensitive device 100 (e.g., mobile phone) for a phone call or for certain non-data applications on the touch sensitive device 100 where the mobile data network is not being used and where an application processor of the touch sensitive device 100 does not have to be used. Accordingly, the disclosed subject matter often can refer to the use of a touch sensitive device 100 that can be a mobile phone; however, it is to be appreciated and understood that the disclosed techniques, aspects, and embodiments can be utilized in other types of touch sensitive devices (e.g., an electronic tablet, a PDA, an electronic gaming device, . . . ), such as described herein.

The touch sensitive device 100 can comprise a touch sensing component 102 that can comprise or be associated with a touch sensitive surface 104 that can sense when an object(s) (e.g., finger(s) of a user, an ear of the user, a cheek of the user, palm of the user, other body part of the user, or stylus) has been brought into contact with the touch sensitive surface 104 or is in proximity to (e.g., is hovering over and/or in proximity to) the touch sensitive surface 104. The touch sensitive surface 104 can have a size and shape that can be coextensive with or can correspond to, or at least can be substantially coextensive with or can substantially correspond to, the size and shape of a presentation area of a display screen of the touch sensitive device 100.

The touch sensitive device 100 also can comprise a sensor component 106 that can comprise a set of sensors, wherein respective sensors of the set of sensors can sense respective conditions (e.g., contact or hover conditions, pressure conditions, motion conditions associated with the device 100, . . . ) of or associated with the touch sensitive device 100. The set of sensors of the sensor component 106 can comprise surface-related sensors 108 that can be part of or associated with the touch sensing component 102 and the touch sensitive surface 104. The surface-related sensors 108 can be configured to sense when an object(s) is in contact with the touch sensitive surface 104 or is in proximity to (e.g., is hovering over and/or in proximity to) the touch sensitive surface 104 and generate sensor data, such as touch surface data (e.g., touch surface or touch screen data), relating to contact with or proximity to the touch sensitive surface 104 by the object(s), as more fully described herein. The sensor data can be employed to facilitate determining a classification (e.g., touch event classification) relating to a contact or an association (e.g., hover) of an object(s) with respect to the touch sensitive surface 104 and/or a contact state of the object(s) in relation to the touch sensitive surface 104, as more fully described herein.

The set of sensors of the sensor component 106 also can include other sensors 110 that can be configured to sense various conditions of or associated with the device 100. For example, the other sensors can sense or detect motion and/or orientation of the device 100 or an object in contact with or in proximity to the device 100, a distance of an object from the device 100 (e.g., a distance of an object from the touch sensitive surface 104), and/or other conditions of or associated with the device 100. The other sensors 110 can comprise, for example, an accelerometer, a gyroscope, an ultrasonic sensor, an inertial measurement unit (IMU), and/or another desired type of sensor. The other sensor data can be employed to facilitate determining a classification (e.g., a touch event classification) relating to a contact or an association (e.g., hover) of an object(s) with respect to the touch sensitive surface 104 and/or a contact state of the object(s) in relation to the touch sensitive surface 104, as more fully described herein.

The touch sensitive device 100 can comprise an application processor 112 that can process data and perform various functions and operations of the touch sensitive device 100, including classifying touch interactions associated with touches (e.g., contacts) of an object(s) that are detected on the touch sensitive surface 104, as more fully described herein. The application processor 112 can comprise one or more processors, microprocessors, controllers, and/or microcontrollers, etc., that can be utilized to process data and perform various functions and operations of the touch sensitive device 100. The application processor 112 can be associated with the touch sensing component 102, including the touch sensitive surface 104, and the sensor component 106.

The touch sensitive device 100 also can include a touch controller component 114 that can be associated with (e.g., communicatively connected to) the application processor 112, the touch sensing component 102, including the touch sensitive surface 104, and the sensor component 106. The touch controller component 114 can process data and perform various functions and operations of the touch sensitive device 100, including classifying hover or touch interactions associated with hovers or touches of an object(s) that are detected in proximity to or on the touch sensitive surface 104, as more fully described herein. The touch controller component 114 can comprise one or more processors, microprocessors, controllers, and/or microcontrollers, etc., that can be utilized to process data and perform various functions and operations of the touch sensitive device 100.

The touch sensitive device 100 further can comprise a transceiver component 116 that can be utilized to transmit or receive (e.g., wirelessly transmit or receive) information (e.g., voice information or data (e.g., non-voice data)). The transceiver component 116 can include, for example, a modem component and other components (e.g., antennas, RF components, . . . ) (not shown in FIG. 1) that can be utilized to enable the touch sensitive device 100 to wirelessly communicate with a communication network and other communication devices. The transceiver component 116 can be utilized, for example, to make phone calls (e.g., wireless or cellular phone calls) to other communication devices (e.g., mobile or smart phones, landline phones) associated with the communication network. The transceiver component 116 can be associated with (e.g., communicatively connected to) the application processor 112 and touch controller component 114.

The touch sensitive device 100 also can include an interface component 118 that can comprise various interfaces that can be utilized by the user to input information (e.g., voice information or data) or receive information. The interface component 118 can include, for example, one or more microphones that can be utilized to input information (e.g., voice or other audio information), one or more speakers that can be utilized to present information (e.g., voice or other audio information), one or more input jacks that can be used to connect other devices (e.g., earbuds, microphone, or external speakers, . . . ) to the touch sensitive device 100, and/or a wireless interface that can be used to wirelessly connect other devices (e.g., wireless earbuds, microphone, or external speakers, . . . ) to the touch sensitive device 100. The interface component 118 can enable the user to input or receive information in connection with making phone calls or using other applications of the touch sensitive device 100. For instance, the interface component 118 can enable the user to use a speakerphone function or earbuds (e.g., earbuds with a microphone) to receive or input information in connection with the user participating in a phone call. The interface component 118 can be associated with (e.g., communicatively connected to) the application processor 112, touch controller component 114, and transceiver component 116.

In some embodiments, the application processor 112 can comprise a touch management component 120 (TOUCH MGMT COMPONENT) that can manage (e.g., control) the classification of touch interactions (e.g., contacts) of objects with the touch sensitive surface 104 to facilitate determining whether and/or how to process the touch interactions of objects with the touch sensitive surface 104, in accordance with defined classification criteria. The touch management component 120 can employ a touch model that can be utilized to facilitate desirable classification of touch interactions of objects with the touch sensitive surface 104 as intentional touch interactions or unintentional touch interactions. An intentional touch interaction can be, for example, a touch on the touch sensitive surface 104 by a finger(s) of the user or a stylus that was intended by the user, or at least was determined to be intended by the user, to interact (e.g., intentionally interact) with the touch sensitive surface 104 to press or manipulate a button, control, or other function associated with the touch sensitive surface 104 and/or associated display screen 122. An unintentional touch interaction can be, for example, a touch on the touch sensitive surface 104 by an ear, a face (e.g., cheek), a palm, a finger(s), or other body part of the user, or a stylus or other object, that was not intended by the user, or at least was determined to not be intended by the user, that can undesirably interact (e.g., unintentionally or unwantedly interact) with the touch sensitive surface 104 to press or manipulate (or at least attempt to press or manipulate) a button, control, or other function associated with the touch sensitive surface 104 and/or associated display screen 122.

The touch management component 120 can manage (e.g., control) the classification of touch interactions (e.g., contacts) of objects with the touch sensitive surface 104 to facilitate determining whether a touch interaction of an object(s) with the touch sensitive surface 104 is an intentional touch interaction that is to be implemented by the touch sensitive device 100 (e.g., implemented to press or manipulate a button or control of the touch sensitive device 100) or an unintentional (e.g., inadvertent, undesired, or unwanted) touch interaction that is to be disregarded and/or prevented by the touch sensitive device 100, determining how to process an intentional touch interaction of the object(s) with the touch sensitive surface 104 (e.g., process a pressing or manipulation of a button or control of the touch sensitive device 100, perform a function or operation based at least in part on the intentional touch, . . . ), rejecting a touch interaction of the object(s) with the touch sensitive surface 104 that is determined to be an unintentional touch interaction, switching the display screen 122 on or off (e.g., switch or keep the display screen 122 on in response to an intentional touch interaction, or switch or keep the display screen 122 off in response to an unintentional touch interaction), in accordance with the defined classification criteria.

The touch management component 120 can include a touch classification engine 124 that can analyze sensor data, such as, for example, touch surface data associated with the touch sensitive surface 104 (e.g., touch sensitive surface of or associated with the display screen 122 or a track pad, . . . ) obtained from the surface-related sensors 108, other sensor data (e.g., motion data) obtained from the other sensors 110 (e.g., motion-related sensors), and/or metadata associated with the device 100. Based at least in part on the results of such analysis of the sensor data, the touch classification engine 124 can classify a touch interaction of the touch sensitive surface 104 by an object(s) as an intentional touch interaction or an unintentional touch interaction, in accordance with the defined classification criteria. The touch classification engine 124 can be a trained classification engine, wherein the touch classification engine 124 can be initially trained to desirably (e.g., accurately) distinguish between and classify intentional touch interactions and unintentional touch interactions of objects with the touch sensitive surface 104, and wherein, after the touch classification engine 124 is implemented in the touch sensitive device 100, the touch classification engine 124 can continue to be trained and refined to improve its ability to desirably (e.g., accurately) distinguish between and classify intentional touch interactions and unintentional touch interactions of objects with the touch sensitive surface 104, as more fully described herein.

In some embodiments, the touch management component 120 also can include a buffer component 126 that can be associated with (e.g., communicatively connected to) the touch classification engine 124. The buffer component 126 can be utilized to store or buffer data, such as, for example, motion data obtained from certain other sensors 110 (e.g., motion-related sensors, such as an accelerometer, a gyroscope, or), touch surface data, or metadata. For example, the touch management component 120 typically can be receiving motion data from the other sensors 110 at a faster rate than the sampling or polling rate for receiving touch surface data from the surface-related sensors 108, as more fully described herein. The touch management component 120 can store or buffer the motion data in the buffer component 126, and the touch classification engine 124 can access and retrieve the motion data from the buffer component 126 at a desired time (e.g., when the touch classification engine 124 is preparing to analyze touch surface data, the motion data, and/or metadata) to analyze the motion data and other sensor data (e.g., touch surface data or metadata). The buffer component 126 can comprise volatile memory and/or non-volatile memory, as more fully described herein.

With further regard to the touch controller component 114, the touch controller component 114 can comprise a hover management component 128 (HOVER MGMT COMPONENT) that can manage (e.g., control) the classification of hover or touch interactions of objects with the touch sensitive surface 104 to facilitate determining whether and/or how to process the hover or touch interactions of objects with the touch sensitive surface 104, in accordance with defined classification criteria. The hover management component 128 can employ a hover model that can be utilized to facilitate desirable classification of hover or touch interactions of objects with the touch sensitive surface 104 as intentional touch interactions, unintentional touch interactions, or unintentional hover interactions. An intentional touch interaction and an unintentional touch interaction can be as more fully described herein. An unintentional hover interaction can be, for example, a hover of an ear, a face (e.g., cheek), a palm, a finger(s), or other body part of the user, or a stylus or other object, in proximity to (e.g., detectable by sensors 108 associated with and/or within a defined distance of) the touch sensitive surface 104 that was not intended by the user, or at least was determined (e.g., by the hover management component 128) to not be intended by the user, that can undesirably interact (e.g., unintentionally or unwantedly interact) with the touch sensitive surface 104 to press or manipulate (or at least attempt to press or manipulate) a button, control, or other function associated with the touch sensitive surface 104 and/or associated display screen 122.

The hover management component 128 can manage (e.g., control) the classification of hover or touch interactions of objects with the touch sensitive surface 104 to facilitate determining whether a hover or touch interaction of an object(s) with the touch sensitive surface 104 is an intentional touch interaction that is to be implemented by the touch sensitive device 100 (e.g., implemented to press or manipulate a button or control of the touch sensitive device 100), an unintentional (e.g., inadvertent, undesired, or unwanted) touch interaction that is to be disregarded and/or prevented by the touch sensitive device 100, or an unintentional hover interaction that is to be disregarded by the touch sensitive device 100. The hover management component 128 also can communicate information (e.g., touch or hover classification information) to the application processor 112, wherein the application processor 112 can take appropriate action (e.g., implement an intentional touch interaction, or disregard or prevent an unintentional touch or hover interaction, . . . ) in response to receiving such information from the hover management component 128.

The hover management component 128 can include a hover classification engine 130 that can analyze sensor data, such as, for example, touch surface data associated with the touch sensitive surface 104 (e.g., touch sensitive surface of or associated with the display screen 122 or a track pad, . . . ) obtained from the surface-related sensors 108. In some embodiments and/or under certain circumstances (e.g., when the application processor 112 is in an active state), the hover classification engine 130 also can have access to, and can analyze, other sensor data (e.g., motion data) obtained from the other sensors 110 (e.g., motion-related sensors) and/or metadata associated with the device 100. Based at least in part on the results of such analysis of the sensor data, the hover classification engine 130 can classify a hover interaction or touch interaction of an object(s) with the touch sensitive surface 104 as an intentional touch interaction, an unintentional touch interaction, or an unintentional hover interaction, in accordance with the defined classification criteria. The hover classification engine 130 can be a trained classification engine, wherein the hover classification engine 130 can be initially trained to desirably (e.g., accurately) distinguish between and classify intentional touch interactions, unintentional touch interactions, and unintentional hover interactions of objects with the touch sensitive surface 104, and wherein, after the hover classification engine 130 is implemented in the touch sensitive device 100, the hover classification engine 130 can continue to be trained and refined to improve its ability to desirably (e.g., accurately) distinguish between and classify intentional touch interactions, unintentional touch interactions, and unintentional hover interactions of objects with the touch sensitive surface 104, as more fully described herein.

In accordance with various embodiments, the touch sensitive device 100 can enable efficient classification of touch and hover interactions associated with the touch sensitive device 100. For instance, the touch sensitive device 100 can be configured to reduce the amount of power used by the touch sensitive device 100 to monitor interactions of objects with the touch sensitive surface and perform touch and hover classifications. There can be instances where the touch sensitive device 100 (e.g., mobile phone) is being used (e.g., by a user) for a phone call or for certain non-data applications on the touch sensitive device 100 where the mobile data network is not being used and/or where application processor 112 does not have to be used. The touch controller component 114 and the application processor 112 can operate and coordinate with each other to enable the application processor 112 to transition to an inactive state when the phone application or certain non-data application is being used, wherein the application processor 112 does not have to be used. This can significantly reduce the amount of power used by the touch sensitive device 100.

The touch controller component 114 and application processor 112 can monitor the touch sensitive surface 104 for hover or touch interactions by an object(s) (e.g., finger(s), ear, face, palm, or other body part of a user, a stylus, or other object) with the touch sensitive surface 104. For instance, the touch controller component 114 and/or application processor 112 can receive sensor data (e.g., touch surface data and/or motion data, . . . ) associated with the touch sensitive surface 104 or the touch sensitive device 100, more generally, to facilitate monitoring the touch sensitive surface 104 for hover or touch interactions. In instances where the application processor 112 is in an inactive state, the touch controller component 114 can monitor the touch sensitive surface 104 for hover or touch interactions by an object(s) with the touch sensitive surface 104.

The touch controller component 114 and application processor 112 can respectively operate, coordinate with each other, and communicate with each other to control (e.g., manage) the activity states of the application processor 112 (e.g., control transitioning of the application processor 112 between the activity states) based at least in part on the hover or touch interactions by an object(s) with the touch sensitive surface 104. The activity states of the application processor 112 can comprise at least an active state (e.g., awake state or mode) and an inactive state (e.g., sleep state or mode). In some embodiments, the activity states of the application processor 112 can include one or more other activity states, in addition to the active state and inactive state. For example, the one or more other activity states can comprise one or more lower active states that can enable the device 100 to utilize less power, and can result in the device 100 having less functionality (while in such lower active state), than the active state, and/or one or more types of inactive states (e.g., sleep state, deep sleep state), wherein a deep sleep state can enable the device 100 to utilize less power than the sleep state.

In accordance with various embodiments, in instances when the application processor 112 is in the active state, from the monitoring of the touch sensitive surface 104 for hover or touch interactions, the touch controller component 114 and/or application processor 112 can detect a hover or touch interaction of an object(s) (e.g., finger(s), ear, face, palm, or other body part of a user, a stylus, or other object) with the touch sensitive surface 104 based at least in part on the results of analyzing the sensor data associated with the touch sensitive surface 104 or device 100, more generally. The touch controller component 114, employing the hover classification engine 130, and/or the application processor 112, employing the touch classification engine 124, can analyze the sensor data to facilitate determining a classification for the hover or touch interaction. Based at least in part on such analysis results (e.g., classification analysis results), the hover classification engine 130 or the touch classification engine 124 can determine the classification (e.g., intentional touch interaction, unintentional touch interaction, or unintentional hover interaction) for the hover or touch interaction.

If the hover classification engine 130 or the touch classification engine 124 determine that a detected interaction is a touch interaction of an object(s) with the touch sensitive surface 104, and the touch interaction is an intentional touch interaction, the touch management component 120 of the application processor 112 can accept (e.g., approve) and process the intentional touch interaction to facilitate performing an operation or function based at least in part on (e.g., corresponding or responsive to) the intentional touch interaction. For example, if the intentional touch interaction relates to pressing or button or control associated with the touch sensitive surface 104 or associated display screen 122, the touch management component 120 can process the intentional touch interaction to press or facilitate (e.g., enable) the pressing of the button or control. At this point, the touch controller component 114 and/or application processor 112 can continue to monitor the touch sensitive surface 104 for further hover or touch interactions by an object(s) with the touch sensitive surface 104.

If the hover classification engine 130 or the touch classification engine 124 determine that the hover or touch interaction is an unintentional hover interaction or unintentional touch interaction, the application processor 112 or touch controller component 114 can reject the hover or touch interaction, and can prevent the hover or touch action from being processed on the touch sensitive device 100. For instance, if the hover classification engine 130 determines that the hover or touch interaction is an unintentional hover or touch interaction, the touch controller component 114 can communicate classification information, which can indicate that the interaction is classified as an unintentional hover or touch interaction, to the application processor 112 (e.g., the touch management component 120 of the application processor 112), and the application processor 112 can reject the hover or touch interaction, and can prevent the hover or touch action from being processed on the touch sensitive device 100.

For example, the user can be making a phone call using the device 100, and the user can move the phone towards his or her ear such that the user's ear and/or face (e.g., cheek) can be touching or in proximity to the touch sensitive surface 104 of the device 100, wherein the user is not intending for the user's ear or face to interact with the touch sensitive surface 104 to press or manipulate any buttons or controls associated with the touch sensitive surface 104 to perform any operations during the phone call. As another example, the user can be making a phone call using the device 100, wherein the user can be using a speakerphone function or can be using earbuds (e.g., wireless or wireline earbuds and/or associated microphone), wherein the user can be gripping the device 100 with his or her hand such that one or more of the user's fingers and/or part of the user's palm is touching the touch sensitive surface 104, and wherein the user is not intending for the user's finger(s) or palm to interact (e.g., touch or hover) with the touch sensitive surface 104 to press or manipulate any buttons or controls associated with the touch sensitive surface 104 to perform any operations during the phone call. In such example instances, the hover classification engine 130 or the touch classification engine 124 can analyze sensor data relating to the ear and/or face touch or hover interaction with the touch sensitive surface 104 (of the former example), or the finger(s) or palm touch or hover interaction with the touch sensitive surface 104 (of the latter example), and, based at least in part on the analysis results and the classifier training of the hover classification engine 130 or the touch classification engine 124, the hover classification engine 130 or the touch classification engine 124 can distinguish these touch or hover interactions with the touch sensitive surface 104 from other types of touch interactions that are determined to be intentional touch interactions, and can classify these example touch or hover interactions as unintentional touch or hover interactions.

In some embodiments, in response to the hover or touch interaction being determined to be an unintentional hover or touch interaction (e.g., an unintentional ear or face touch or hover interaction with the touch sensitive surface), in addition to, and subsequent to, rejecting the unintentional hover or touch interaction and preventing the unintentional hover or touch action from being processed on the touch sensitive device 100, the application processor 112 can transition from the active state to the inactive state (or another desired reduced power and/or reduced activity state). In certain embodiments, prior to the application processor 112 transitioning from the active state to the inactive state, the application processor 112 can transition (e.g., switch) the display screen 122 from an on state to an off state to further reduce power consumption and the use (e.g., unnecessary use) of resources (e.g., resources, such as liquid crystal display (LCD), light-emitting diode (LED), or organic LED (OLED) resources of the display screen 122).

At this point the application processor 112 can be in the inactive state (or other reduced power and/or reduced activity state), the touch controller component 114 (e.g., the hover management component 128 of the touch controller component 114) can continue to monitor the touch sensitive surface 104 for hover or touch interactions by an object(s) (e.g., finger(s), ear, face, palm, or other body part of a user, a stylus, or other object) with the touch sensitive surface 104. For instance, the touch controller component 114 can receive sensor data (e.g., touch surface data) associated with the touch sensitive surface 104, to facilitate monitoring the touch sensitive surface 104 for hover or touch interactions. The touch controller component 114 (e.g., the hover management component 128) can analyze the sensor data, wherein the sensor data can indicate that a hover or touch interaction of an object(s) with the touch sensitive surface 104 has occurred, or can indicate that no hover or touch interaction with the touch sensitive surface 104 has been detected. Based at least in part on the results of the analysis of the sensor data, the touch controller component 114 can detect that there is a hover or touch interaction of an object(s) with the touch sensitive surface 104 or can determine that no hover or touch interaction with the touch sensitive surface 104 has been detected, accordingly (e.g., in accordance with the sensor data).

The hover management component 128 of the touch controller component 114, employing the hover classification engine 130, can analyze the sensor data to facilitate determining a classification for the hover or touch interaction, or determining a no touch or hover interaction classification. Based at least in part on the analysis results (e.g., classification analysis results), the hover classification engine 130 can determine the classification (e.g., intentional touch interaction, unintentional touch interaction, unintentional hover interaction) for the detected hover or touch interaction, or determine a no touch or hover classification if no touch or hover interaction is detected. In some embodiments, based at least in part on the analysis results (e.g., classification analysis results), the hover classification engine 130 can determine more specific or refined classifications regarding touch or hover interactions, such as, for example, an ear or face (e.g., cheek) touch or hover classification when the ear or face (or hair on the head) of the user comes into contact with or hovers in proximity to the touch sensitive surface 104, a finger(s) touch or hover classification when one or more fingers of the user come into contact with or hover in proximity to the touch sensitive surface 104, and/or a stylus touch or hover classification when a stylus is utilized to make contact with or hover in proximity to the touch sensitive surface 104. The classifications determined by the hover classification engine 130 can be further refined or detailed to distinguish between whether the particular interaction is a touching of the particular object(s) with the touch sensitive surface 104, a hovering of the particular object(s) in proximity to the touch sensitive surface 104, or a combination of both a touching and a hovering of the particular object on or in proximity to the touch sensitive surface 104 (e.g., one finger of the user touching, and another finger of the user hovering in proximity to, the touch sensitive surface 104; a user's ear, or part of the ear, touching, and the user's cheek hovering in proximity to, the touch sensitive surface 104).

In response to determining that the hover or touch interaction is unintentional (e.g., unintentional ear or face hover or touch interaction), the hover management component 128 can reject the hover or touch interaction and/or can prevent the unintentional hover or touch interaction from being processed (e.g., can send no signal, such as a notification signal, to the application processor 112, which can prevent an operation or function from being performed by the touch sensitive device 100 based on the unintentional hover or touch interaction). In some embodiments, since the hover or touch interaction was determined to be unintentional, the application processor 112 can remain in the inactive state, and/or the display screen 122 can remain in the off state. At this point, the touch controller component 114 can continue to monitor the touch sensitive surface 104 for hover or touch interactions by an object(s) with the touch sensitive surface 104.

Alternatively, in certain embodiments, if the hover management component 128, employing the hover classification engine 130, determines that the hover or touch interaction is an unintentional hover or touch interaction (e.g., unintentional finger hover or touch interaction) with the touch sensitive surface 104 that does not include the ear or face of the user, the touch controller component 114 can reject such unintentional hover or touch interaction, and can generate a notification signal that can indicate that an unintentional touch or hover interaction, which does not involve the ear or face of the user, has occurred, wherein such notification signal can facilitate transitioning the application processor 112 from the inactive state to the active state. The touch controller component 114 (e.g., the hover management component 128 of the touch controller component 114) can communicate such notification signal to the application processor 112. In response to receiving such notification signal, the application processor 112 can transition from the inactive state to the active state, and/or the application processor 112 can transition the display screen 122 from the off state to the on state (or the display screen 122 can remain in the off state (e.g., until an intentional touch interaction is detected and classified)). With the application processor 112 in the active state, the touch controller component 114 and/or the application processor 112 can monitor the touch sensitive surface 104 for hover or touch interactions by an object(s) with the touch sensitive surface 104.

In other embodiments, as desired, if the hover management component 128, employing the hover classification engine 130, determines that the hover or touch interaction is an unintentional hover or touch interaction with the touch sensitive surface 104 that does not include the ear or face of the user, the touch controller component 114, the hover management component 128 can reject the hover or touch interaction and can send no notification signal to the application processor 112, and the application processor 112 can remain in the inactive state (e.g., until a notification signal regarding an intentional touch interaction is received by the application processor 112). With the application processor 112 in the inactive state, the touch controller component 114 can continue to monitor the touch sensitive surface 104 for hover or touch interactions by an object(s) with the touch sensitive surface 104.

In still other embodiments, while the application processor 112 is in the inactive state, if the hover management component 128, employing the hover classification engine 130, determines that there is no touch or hover interaction of an object(s) with the touch sensitive surface 104 detected, the hover management component 128 can generate and communicate a notification signal, which can indicate that there is no touch or hover interaction detected, to facilitate transitioning the application processor 112 from the inactive state to the active state. For example, initially, the ear or face of the user can be touching or hovering in proximity to the touch sensitive surface 104, wherein, in response to such unintentional touch or hover of the ear or face of the user with the touch sensitive surface 104, the application processor 112 can reject such unintentional touch or hover interaction and can transition from the active state to inactive state and/or can transition the display screen 122 from the on state to the off state. Subsequently, the user can move the touch sensitive device 100 away from the ear and face of the user, wherein there is no object touching or hovering in proximity to the touch sensitive surface 104. The hover management component 128 can detect or determine that there is no touch or hover interaction by an object with the touch sensitive surface 104. In response to determining that there is no touch or hover interaction, the hover management component 128 can generate a notification signal that can indicate that there is no touch or hover interaction. The hover management component 128 can communicate such notification signal to the application processor 112.

In response to receiving such notification signal, the application processor 112 (e.g., the touch management component 120 of the application processor 112) can determine that the application processor 112 is to transition from the inactive state to the active state, and accordingly, the application processor 112 can transition from the inactive state to the active state and/or can transition the display screen 122 from the off state to the on state. With the application processor 112 in the active state, the touch controller component 114 and/or the application processor 112 can monitor the touch sensitive surface 104 for hover or touch interactions by an object(s) with the touch sensitive surface 104.

In yet other embodiments, if, while the application processor 112 is in the inactive state, a hover or touch interaction is detected by the hover management component 128, and the hover classification engine 130 determines that the classification of the detected hover or touch interaction is an intentional touch interaction of an object(s) (e.g., intentional finger(s) touch) with the touch sensitive surface 104, the hover management component 128 can generate a notification signal (e.g., a control signal, such as an application processor (AP) control signal), wherein the notification signal can indicate that an intentional touch interaction of an object(s) with the touch sensitive surface 104 has occurred (e.g., can indicate that an interaction with the touch sensitive surface 104 has been classified as an intentional touch interaction) and/or can indicate specific interaction-related information regarding the intentional touch interaction (e.g., where on the touch sensitive surface 104 the intentional touch interaction occurred, a button or control being pressed or manipulated by the intentional touch interaction, . . . ). For example, the hover classification engine 130 can determine, based at least in part on the results of analyzing the sensor data and the training of the hover classification engine 130, that the user is using one or more fingers to touch or manipulate a button or control associated with the touch sensitive surface 104 in a way that indicates the touch interaction is intentional, and, accordingly, the hover classification engine 130 can classify the interaction as an intentional touch interaction. In response to determining the interaction with the touch sensitive surface 104 is an intentional touch interaction, the hover classification engine 130 can generate the notification signal.

The touch controller component 114 (e.g., the hover management component 128 of the touch controller component 114) can communicate the notification signal to the application processor 112 to facilitate notifying the application processor 112 that an intentional touch interaction has been detected. In response to receiving the notification signal, the application processor 112 (e.g., the touch management component 120 of the application processor 112) can determine that the application processor 112 is to transition from the inactive state (or other reduced power or reduced activity state) to the active state to process the intentional touch interaction, and, accordingly, the application processor 112 can transition (e.g., switch) from the inactive state (or other reduced power or reduced activity state) to the active state. The touch management component 120 also can transition the display screen 122 from the off state to the on state. At this point, with the application processor 112 in the active state, the touch controller component 114 and/or the application processor 112 can monitor the touch sensitive surface 104 for hover or touch interactions by an object(s) with the touch sensitive surface 104.

Figure 2:
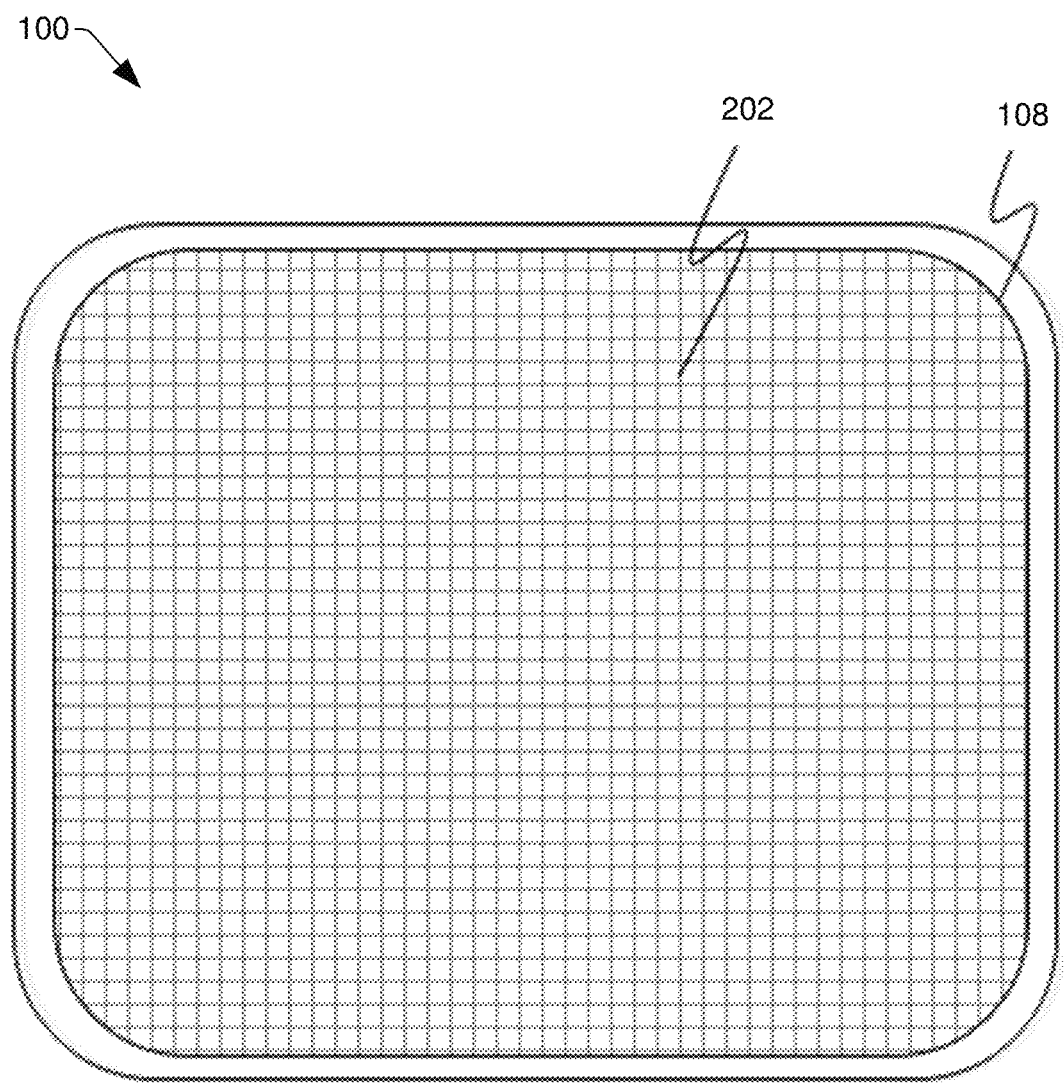
FIG. 2 depicts a diagram of a top view of the example touch sensitive device, including the touch sensitive surface, in accordance with various aspects and embodiments of the disclosed subject matter.

With further regard to the touch sensitive surface 104, referring to FIG. 2 (along with FIG. 1), FIG. 2 depicts a diagram of a top view of the example touch sensitive device 100, including the touch sensitive surface 104, in accordance with various aspects and embodiments of the disclosed subject matter. The touch sensitive surface 104 can comprise or be associated with the surface-related sensors 108. In some embodiments, the surface-related sensors 108 can be distributed in various locations associated with the touch sensitive surface 104 to form a sensor array 202, wherein respective surface-related sensors 108 can be associated with respective portions of the touch sensitive surface 104. For example, the surface-related sensors 108 can be distributed to in various locations associated with the touch sensitive surface 104 to form a grid (e.g., an x, y grid). It is to be appreciated and understood that such a grid formation is merely one example formation that can be employed for distributing the surface-related sensors 108 of the sensor array 202 at various locations associated with the touch sensitive surface 104, and, in accordance with other embodiments of the disclosed subject matter, the surface-related sensors 108 can be distributed in other formations (e.g., uniform or non-uniform formations) with respect to the touch sensitive surface 104.

When an object(s) is brought into contact with, or is in sufficiently close proximity to, a location(s) on the touch sensitive surface 104, one or more surface-related sensors 108 of the sensor array 202 that are associated with that location on the touch sensitive surface 104 can sense such contact of the object(s) with the that location(s) on the touch sensitive surface 104 or sense such proximity of the object(s) to that location(s) on the touch sensitive surface 104. In response to the one or more surface-related sensors 108 sensing or detecting the object(s) in contact with or in proximity to that location(s) on the touch sensitive surface 104, the one or more surface-related sensors 108 can generate signals (e.g., sensor data) and can communicate the signals to a classification engine (e.g., hover classification engine 130 and/or touch classification engine 124) or associated management component (e.g., hover management component 128 and/or touch management component 120) for analysis and evaluation (e.g., to facilitate determining which of the surface-related sensors 108 is in contact with the object(s) or in proximity to the object(s)).

In some implementations, the touch sensing component 102 or an associated management component (e.g., hover management component 128 and/or touch management component 120) can sweep the surface-related sensors 108 of the sensor array 202 or can otherwise poll the surface-related sensors 108 of the sensor array 202 to facilitate obtaining respective sensor data (e.g., respective touch surface data) from respective surface-related sensors 108 of the sensor array 202, to facilitate enabling the associated management component (e.g., hover management component 128 and/or touch management component 120) to determine which portion(s) of the touch sensitive surface 104 is in contact with or in proximity to the object(s) at a given time (e.g., a given moment or period of time). For example, the touch sensing component 102 or the associated management component (e.g., hover management component 128 and/or touch management component 120) can sweep the surface-related sensors 108 of the sensor array 202 or can otherwise poll the surface-related sensors 108 of the sensor array 202 every $1/15^{th}$ of a second (every 67 milliseconds), $1/30^{th}$ of a second, every $1/60^{th}$ of a second, every $1/100^{th}$ of a second, or at another desired rate or periodicity. A desired management component (e.g., hover management component 128 and/or touch management component 120) (or touch sensing component 102) can process and/or organize (e.g., arrange) the sensor data obtained from the surface-related sensors 108 of the sensor array 202 to generate frame data in the form of x, y dimensional data that can represent (e.g., correspond to) respective touch events (e.g., touch screen contacts or associations) associated with respective surface-related sensors 108 at the given time, wherein respective frame data associated with the respective surface-related sensors 108 can be or can comprise the respective sensor data of the respective surface-related sensors 108 or the respective frame data can be determined based at least in part on the respective sensor data.

Figure 3:
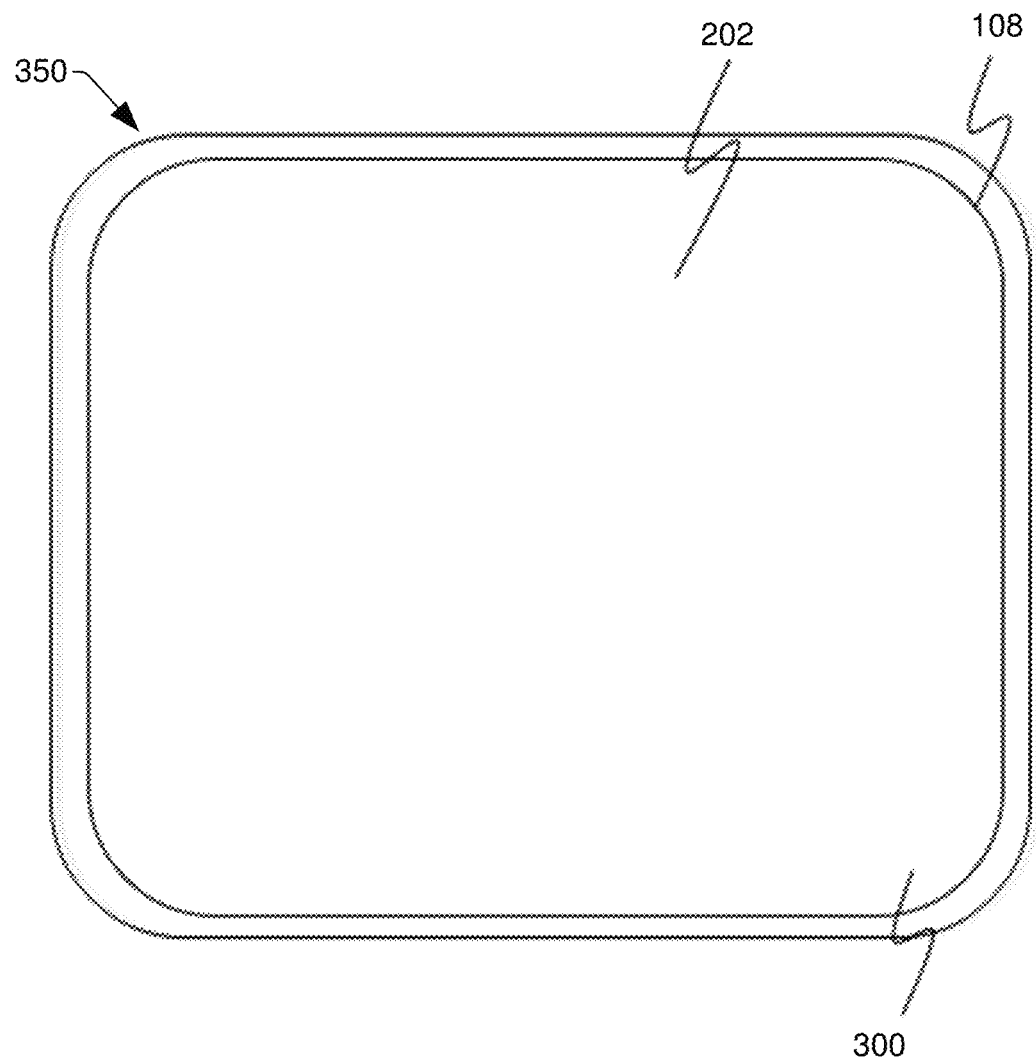
FIG. 3 presents a diagram of an example frame image as part of a visual representation of a top view of an example touch sensitive device, the frame image comprising or representing frame data associated with the touch sensitive surface, in accordance with various aspects and embodiments of the disclosed subject matter.

Frame data can be conceptually understood as providing an image or frame image that can have higher-density portions representing areas of the touch sensitive surface 104 that are in contact with (or in proximity to) an object(s) and other lower-density portions representing areas of the touch sensitive surface 104 that are not in contact with (or in proximity to) an object(s). Turning briefly to FIG. 3 (along with FIGS. 1 and 2), FIG. 3 presents a diagram of an example frame image 300 as part of a visual representation 350 of a top view of an example touch sensitive device 100, the frame image 300 comprising or representing frame data associated with the touch sensitive surface 104, in accordance with various aspects and embodiments of the disclosed subject matter. With respect to the example frame image 300, the surface-related sensors 108 of the sensor array 202 have not detected an object in contact with or in proximity to the surface-related sensors 108 and have correspondingly generated signals (e.g., sensor data) indicating that no object has been detected in contact with or in proximity to the surface-related sensors 108. In this example frame image 300, as no objects are detected in contact with or in proximity to the touch sensitive surface 104, the frame image 300 can have the appearance illustrated in FIG. 3 with no higher-density portions (e.g., no darker colored regions) being shown in the frame image 300.

However, when objects are brought into contact with or in proximity to the touch sensitive surface 104, a portion of the surface-related sensors 108 of the sensor array 202 that are located in the portion(s) of the touch sensitive surface 104 that is in contact with or proximity to the objects can detect such objects, and can generate sensor data representing such detection in response. The portion of the surface-related sensors 108 can communicate the sensor data to report that the objects are in contact with or proximity to the portion(s) of the touch sensitive surface 104 associated with the portion of the surface-related sensors 108, and a contrast pattern can emerge in a frame image representative of such a state of contact.

Figure 4:
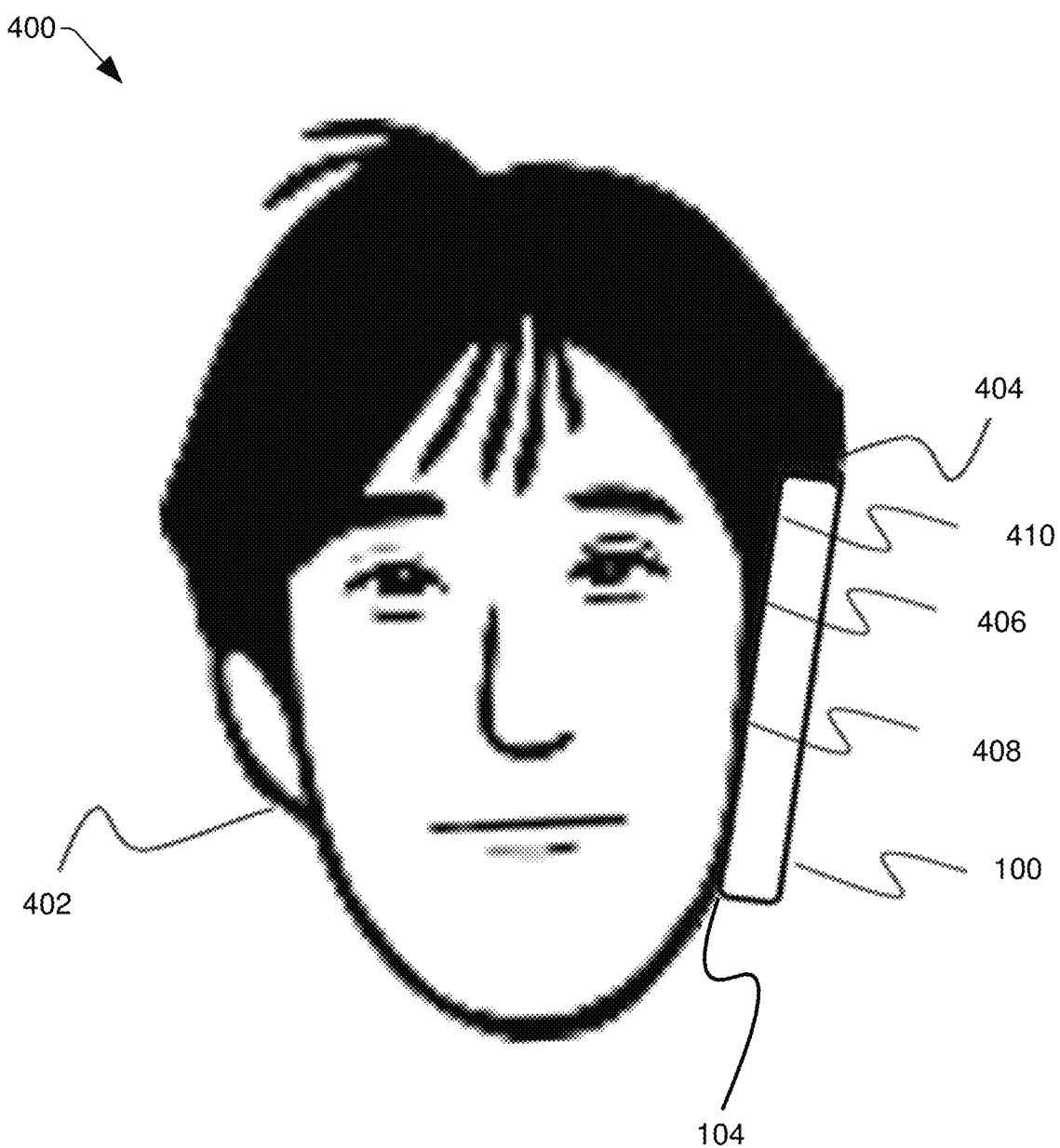
FIG. 4 illustrates a diagram of an example scenario of a user having the touch sensitive device against the side of the user's head.

It will be appreciated that there can be a variety of different touch or hover classifications and that more than one classification may be found in sensor data or frame data associated with the touch sensitive surface 104, wherein frame data can be generated or determined by a classification engine (e.g., hover classification engine 130 or touch classification engine 124) based at least in part on the sensor data. Consider, for example, the scenario illustrated in FIGS. 4 and 5. FIG. 4 illustrates a diagram of an example scenario 400 of a user having the touch sensitive device 100 against the side of the user's head. As is shown in the image of the example scenario 400 of FIG. 4, it is not uncommon for a user 402 to hold a touch sensitive device 100 (e.g., a cellular or smart phone) against the user's head 404, such that contact between the touch sensitive surface 104 and the head 404 can exist in more than one place. As shown in the image of the example scenario 400, there can be several different contacts between the user's head 404 and the touch sensitive surface 104, including an ear interaction 406, a cheek interaction 408, and possibly a hair and/or head interaction 410.

Figure 5:
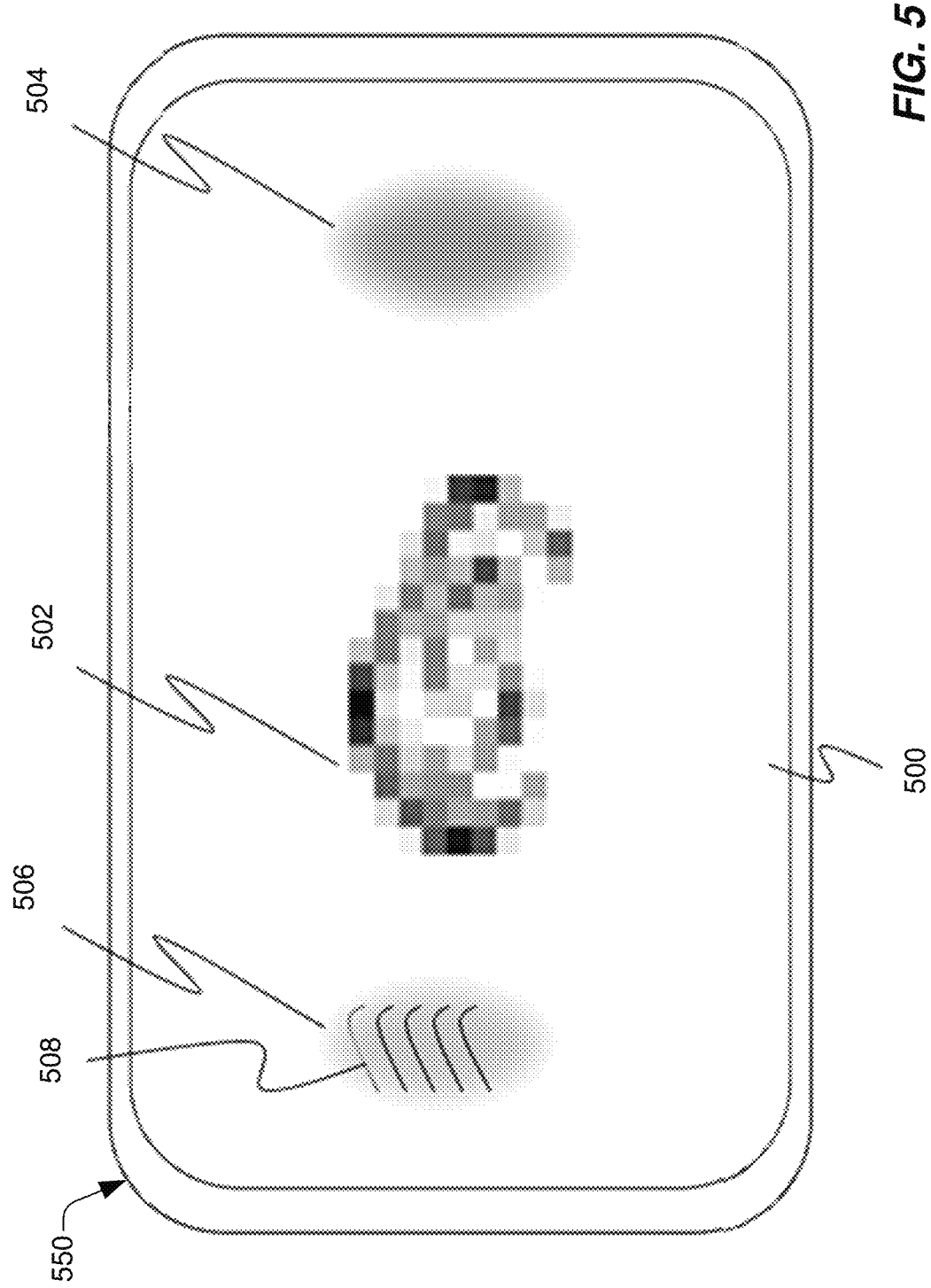
FIG. 5 illustrates a diagram of an example frame image as part of a visual representation of a top view of the touch sensitive device, wherein the example frame image can comprise or represent frame data that can be determined during a time period when sensor data for a frame is acquired by the touch sensing system and associated sensor component in connection with a user having the device near the user's ear, in accordance with various aspects and embodiments of the disclosed subject matter.

FIG. 5 illustrates a diagram of an example frame image 500 as part of a visual representation 550 of a top view of the touch sensitive device 100, wherein the example frame image 500 can comprise or represent frame data that can be determined during a time period when sensor data for a frame is acquired by the touch sensing component 102 and associated sensor component 106 in connection with a user having the device 100 near the user's ear, in accordance with various aspects and embodiments of the disclosed subject matter. During the time period, the surface-related sensors 108 can respectively sense no contact, relative states of intensity of contact with the touch sensitive surface 104, and/or relative proximity of an object (e.g., finger(s) of the user hovering with respect) to the touch sensitive surface 104 without touching the touch sensitive surface, and, accordingly, can generate sensor data (e.g., capacitance data) based at least in part on the respective sensing of the respective sensors 108. The sensor data (e.g., capacitance data) can correspond to the respective touch-related levels (e.g., respective amounts of capacitance) associated with respective portions of the touch sensitive surface 104 and can indicate respective levels of contact (e.g., no contact or respective states of intensity of contact) of an object(s) (e.g., ear, cheek, etc., of the user) with the touch sensitive surface 104 or respective proximity of the object, or portion thereof, to the touch sensitive surface 104.

The classification engine (e.g., hover classification engine 130 or touch classification engine 124) can receive the sensor data from the surface-related sensors 108. In some embodiments and under certain circumstances (as more fully described herein), the classification engine also can receive other sensor data (e.g., accelerometer data, gyroscope data, ultrasound data, and/or IMU data) from other sensors 110 of the sensor component 106. Based at least in part on the results of analyzing the respective sensor data from respective surface-related sensors of the surface-related sensors 108 and/or the other sensor data from the other sensors 110, the classification engine can generate the frame image 500 that can comprise interaction pattern 502 (e.g., a particular grayscale colored region), interaction pattern 504, and interaction pattern 506. With regard to the frame image 500 of FIG. 5, the ear interaction 406 of FIG. 4 can yield the interaction pattern 502, which can correspond to the ear interaction 406, the cheek interaction 408 of FIG. 4 can provide the relatively uniform interaction pattern 504, which can have an ovular shape and can correspond to the cheek interaction 408, and the hair or head interaction 410 of FIG. 4 can yield the interaction pattern 506, which can have some uniformity, but potentially can be influenced by the presence of elongated striations 508 due to contact with hair of the user.

The classification engine (e.g., hover classification engine 130 or touch classification engine 124) can determine or identify that the touch or hover interactions comprise the ear interaction (e.g., 406), the cheek interaction (e.g., 408), and the hair or head interaction (e.g., 410) with respective regions of the touch sensitive surface 104 and can further determine (e.g., classify) that such touch or hover interactions are unintentional touch or hover interactions, based at least in part on the results of analyzing the sensor data and/or the other sensor data, and/or the results of analyzing the frame image 500 generated from the sensor data and/or the other sensor data, and the training of the classification engine, in accordance with the defined classification criteria. It will be appreciated that each of interaction patterns 502, 504, and 506 can provide a signature that viewed collectively or individually can be capable of being classified (e.g., by the hover classification engine 130 or touch classification engine 124) or that can be capable of being used (e.g., by the hover classification engine 130 or touch classification engine 124) to corroborate a classification of the hover or touch interaction(s) with the touch sensitive surface 104.

It also is to be appreciated and understood that there can be many different variations of this. For example, a user may wear glasses that wrap around the rear of the ear and therefore are supported by the ear in ways that potentially can adjust the contact pattern sensed by the sensors (e.g., surface-related sensors 108) of or associated with the touch sensitive surface 104 when the touch sensitive device 100 (e.g., phone) is held up against an ear of the user. Similarly, the user may wear headgear that at least potentially can be sensed (e.g., by the surface-related sensors 108) or piercings and/or jewelry that can be sensed (e.g., by the surface-related sensors 108) and can create particular touch (e.g., contact) or hover patterns with the touch sensitive surface 104, wherein such touch or hover interactions can be, or at least potentially can be, particularly useful in determining (e.g., by the hover classification engine 130 or touch classification engine 124) when a head of a user is held against the touch sensitive surface 104 of the touch sensitive device 100.

In response to the touch or hover interaction(s) being classified as unintentional, the application processor 112 and/or touch controller component 114 can take appropriate action. For example, if the application processor 112 is in the active state, the application processor 112 (e.g., touch management component 120 of the application processor 112) can reject the unintentional touch or hover interaction, prevent an operation from being performed by the device 100 in response to the unintentional touch or hover interaction, transition the display screen 122 from an on state to an off state, and/or transition the application processor 112 from the active state to an inactive state. As another example, if the application processor 112 is in the inactive state, the touch controller component 114 (e.g., hover management component 128 of the touch controller component 114) can reject the unintentional touch or hover interaction, and the touch controller component 114 will not send a notification signal to the application processor 112, and, as a result, the application processor 112 can remain in the inactive state, and no operation will be performed in response to the unintentional touch or hover interaction.

With regard to FIGS. 6-11 (along with FIGS. 1 and 2), the hover classification engine 130 or touch classification engine 124 can receive the sensor data (e.g., touch surface data) from surface-related sensors 108. The touch sensitive surface 104 can comprise or be associated with a sensor array 202 that can include the surface-related sensors 108, which can comprise certain surface-related sensors 108, such as capacitive sensors, that can sense capacitance levels associated with the touch sensitive surface 104. The surface-related sensors 108 can sense no contact (e.g., no touch) with the touch sensitive surface 104, relative states of intensity of contact of an object(s) (e.g., finger(s), ear, cheek, or palm of the user) with the touch sensitive surface 104, and/or relative proximity of an object(s) (e.g., finger(s), ear, cheek, or palm of the user) to the touch sensitive surface 104 without touching the touch sensitive surface. For instance, in some implementations, the sensor array 202 of surface-related sensors 108 can be capable of detecting or determining a level of intensity of contact of an object with the touch sensitive surface 104, wherein the level of intensity of contact can relate to, for example an amount of pressure applied by an object on the touch sensitive surface 104, an intensity of a resistance experienced at the point of contact of the object with the touch sensitive surface 104, an intensity of a capacitance experienced at the point of contact of the object with the touch sensitive surface 104, and/or another type(s) of intensity relating to contact of an object with one or more surface-related sensors 108 of the sensor array 202. As a result of the sensing, the certain surface-related sensors 108 (and/or other sensors 108) can generate sensor data, such as capacitance data (e.g., mutual capacitance data), that can correspond to the respective amounts of capacitance associated with respective portions of the touch sensitive surface 104 and can indicate respective levels of contact (e.g., no contact or respective states of intensity of contact) of an object(s) (e.g., finger(s), ear, cheek, or palm of the user) with the touch sensitive surface 104 or respective proximity of the object(s) (e.g., respective hover interaction of the object(s)), or portion thereof, to the touch sensitive surface 104.

In some embodiments, the touch sensitive device 100 also can comprise other sensors 110 of the sensor component 106, wherein the other sensors can include, for example, an accelerometer, a gyroscope, an ultrasound component, an IMU, and/or another type of sensor. The hover classification engine 130 or touch classification engine 124 can receive other sensor data, such as, for example, accelerometer data from the accelerometer, gyroscope data from the gyroscope, ultrasound data from the ultrasound component, IMU data from the IMU, and/or other types of sensor data from one or more other types of sensors. In some embodiments, the hover classification engine 130 can have access to such other sensor data when the application processor 112 is in the active state and can communicate such other sensor data to the hover classification engine 130 of the touch controller component 114.

Based at least in part on the results of analyzing the respective sensor data (e.g., mutual capacitance data) from respective surface-related sensors of the certain surface-related sensors 108 and/or the other sensor data, the hover classification engine 130 or touch classification engine 124 can generate a frame image comprising one or more grayscale colored regions that can present grayscale information (e.g., corresponding to respective higher-density portions of the frame image) illustrating respective intensities of contact of an object(s) (e.g., finger(s), ear, cheek, palm, or stylus, . . . ) of or associated with the user with the respective portions of the touch sensitive surface 104 and/or respective proximities of respective portions of the object(s) to the touch sensitive surface 104.

The hover classification engine 130 or touch classification engine 124 can determine or identify that the type of touch or hover interaction(s) of the object(s) with respect to the touch sensitive surface 104 and can further determine whether (e.g., can classify whether) the touch or hover interaction(s) is an intentional touch interaction, an unintentional touch interaction, or an unintentional hover interaction, based at least in part on the results of analyzing the sensor data and/or other sensor data (e.g., raw sensor data and/or other raw sensor data) and/or analyzing the frame image generated from the sensor data and/or the other sensor data. Based at least in part on the classification of the touch or hover interaction(s) as being an intentional touch interaction, unintentional touch interaction, an unintentional hover interaction, and/or the type of touch or hover interaction(s) of an object(s) with the touch sensitive surface 104, accordingly, the application processor 112 and/or touch controller component 114 (e.g., coordinating with the application processor 112) can control the operation of the touch sensitive device 100 to perform an operation (e.g., selection of a button, control, or application, . . . ) that can correspond to the touch interaction of the touch sensitive surface 104, in response to determining that such touch interaction is an intentional touch interaction, or to reject the touch or hover interaction(s) and not perform a particular operation and/or disable the touch sensitive surface 104 and/or turn off the touch sensitive surface 104 or associated display screen 122, in response to determining that a particular touch or hover interaction(s) is an unintentional touch or hover interaction(s), as more fully described herein.

Figure 6:
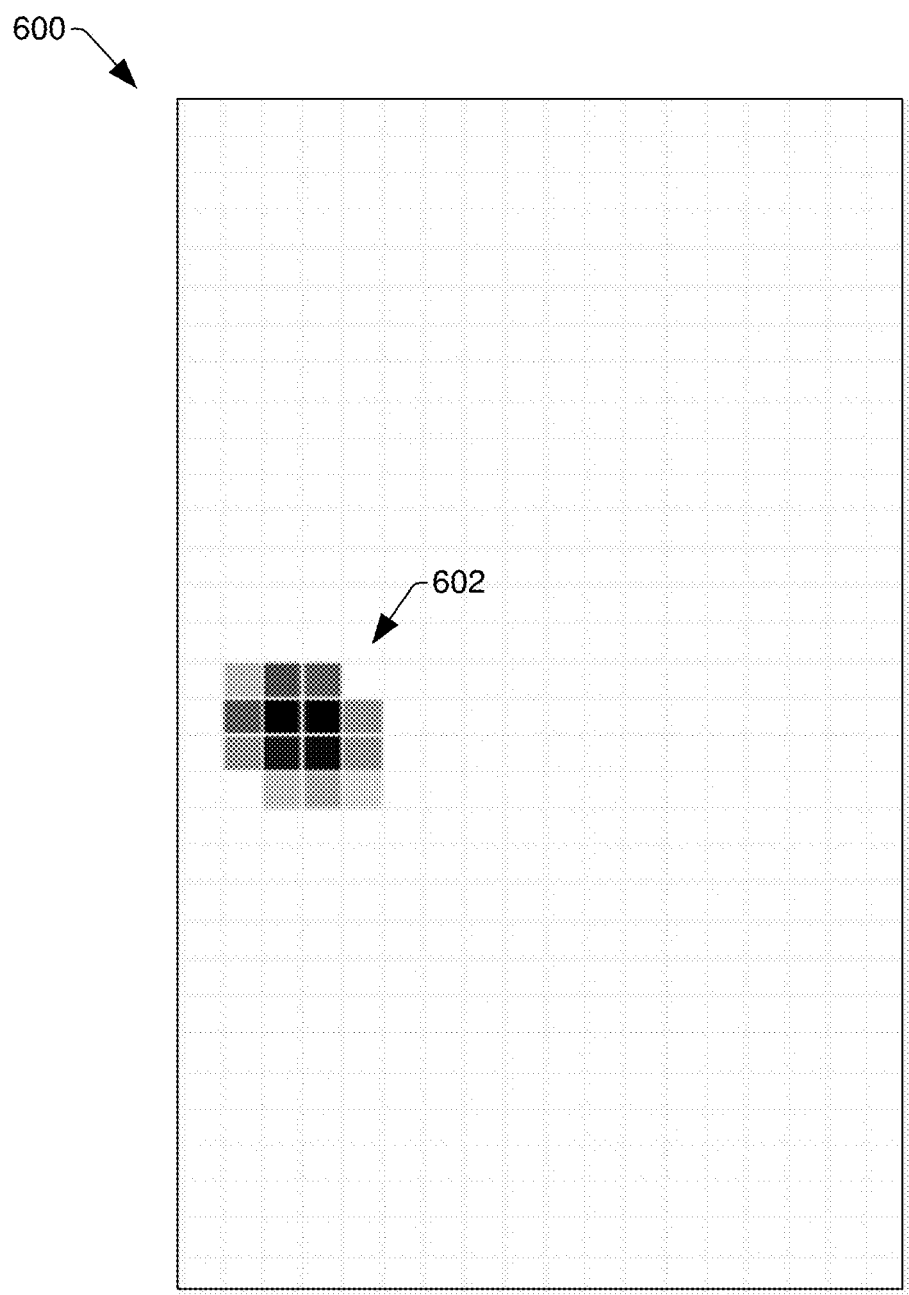
FIG. 6 illustrates a diagram of an example frame image that can be generated based at least in part on sensor data when certain surface-related sensors of the sensor array detect contact of a finger of the user with a portion of the touch sensitive surface, in accordance with various aspects and embodiments of the disclosed subject matter.

Turning briefly to FIG. 6 (along with FIGS. 1 and 2), FIG. 6 illustrates a diagram of an example frame image 600 that can be generated based at least in part on sensor data (e.g., capacitance data, such as mutual capacitance data) when certain surface-related sensors 108 (e.g., capacitive sensors) of the sensor array 202 detect contact (e.g., relative intensities of contact) of a finger of the user with a portion (e.g., a center-left portion) of the touch sensitive surface 104, in accordance with various aspects and embodiments of the disclosed subject matter. The frame image 600 can represent a frame associated with the touch sensitive surface 104 at a time during which a finger of the user is in contact with a particular portion (e.g., a center-left portion) of the touch sensitive surface 104. The surface-related sensors 108 can respectively sense no contact, relative states of intensity of contact with the touch sensitive surface 104, and/or relative proximity of an object (e.g., finger(s) of the user hovering with respect) to the touch sensitive surface 104 without touching the touch sensitive surface, and, accordingly, can generate sensor data (e.g., capacitance data) based at least in part on the respective sensing of the respective sensors 108. The sensor data (e.g., capacitance data) can correspond to the respective touch-related levels (e.g., respective amounts of capacitance) associated with respective portions of the touch sensitive surface 104 and can indicate respective levels of contact (e.g., no contact or respective states of intensity of contact) of an object (e.g., finger(s) of the user) with the touch sensitive surface 104 or respective proximity of the object, or portion thereof, to the touch sensitive surface 104.

The classification engine (e.g., hover classification engine 130 or touch classification engine 124) can receive the sensor data from the certain surface-related sensors 108. In some embodiments and under certain circumstances (as more fully described herein), the classification engine also can receive other sensor data (e.g., accelerometer data, gyroscope data, ultrasound data, and/or IMU data) from other sensors 110 of the sensor component 106. Based at least in part on the results of analyzing the respective sensor data from respective surface-related sensors of the certain surface-related sensors 108 and/or the other sensor data from the other sensors 110, the classification engine can generate the frame image 600 comprising the grayscale colored region 602 that can present grayscale information (e.g., corresponding to respective higher-density portions of the frame image 600) illustrating respective intensities of contact of respective portions of the finger of the user with the respective portions of the touch sensitive surface 104 and/or respective proximities of respective portions of the finger of the user to the touch sensitive surface 104. For instance, the grayscale colored region 602 can indicate that an object, which correspond to (e.g., be in the shape of) a finger (e.g., a tip, knuckle, or other portion of the finger), is in contact with the portion (e.g., a center-left portion) of the touch sensitive surface 104 that can correspond to the location of the grayscale colored region 602 depicted in the frame image 600. The classification engine (e.g., hover classification engine 130 or touch classification engine 124) can determine or identify that the touch interaction is a finger touch of the user on such portion of the touch sensitive surface 104 and can further determine that such finger touch is an intentional touch interaction, based at least in part on the results of analyzing the sensor data and/or other sensor data (e.g., raw sensor data and/or other raw sensor data) and/or analyzing the frame image 600 generated from the sensor data and/or the other sensor data.

Based at least in part on the classification of the touch interaction being an intentional touch interaction and being a finger touch of the portion (e.g., a center-left portion) of the touch sensitive surface 104 that can correspond to the location of the grayscale colored region 602, the application processor 112 (e.g., the touch management component 120 of the application processor 112) can control the operation of the touch sensitive device 100 to perform an operation (e.g., selection of a button, control, or application, . . . ) that can correspond to such touching of the touch sensitive surface 104. As more fully described herein, if the application processor 112 was in an inactive state at the time of the touch interaction, and the hover classification engine 130 performed the classification and classified the touch interaction as an intentional touch interaction, the hover management component 128 can communicate a notification signal to the application processor 112. In response, the application processor 112 can transition to the active state and can process the intentional touch interaction accordingly.

Figure 7:
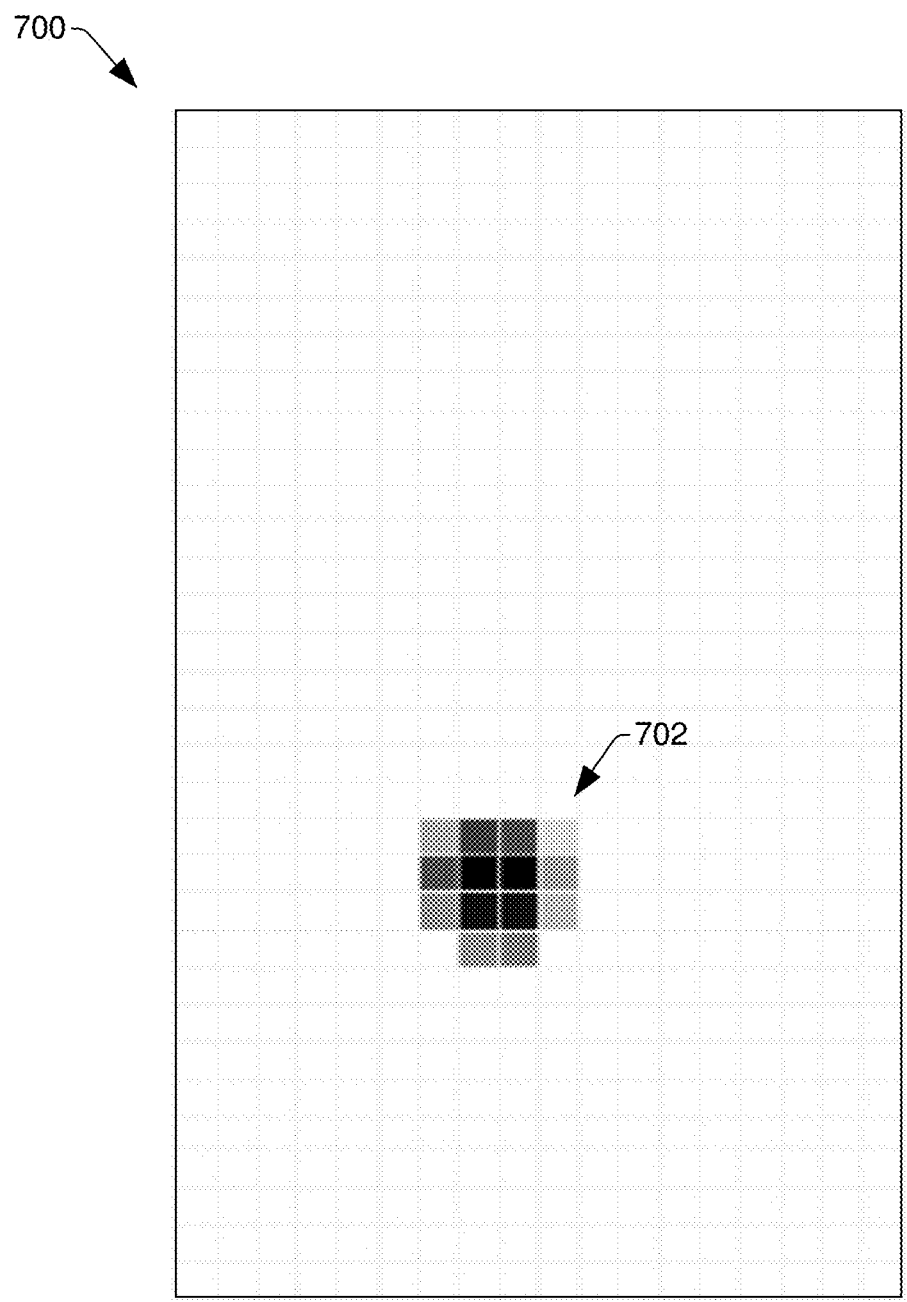
FIG. 7 illustrates a diagram of another example frame image that can be generated based at least in part on sensor data when certain surface-related sensors of the sensor array detect contact of a finger of the user with a certain portion of the touch sensitive surface, in accordance with various aspects and embodiments of the disclosed subject matter.

Referring briefly to FIG. 7 (along with FIGS. 1 and 2), FIG. 7 illustrates a diagram of an example frame image 700 that can be generated based at least in part on sensor data when certain surface-related sensors 108 of the sensor array 202 detect contact (e.g., relative intensities of contact) of a finger of the user with a certain portion (e.g., center portion) of the touch sensitive surface 104, in accordance with various aspects and embodiments of the disclosed subject matter. The frame image 700 can represent a frame associated with the touch sensitive surface 104 at a time during which a finger of the user is in contact with a particular portion (e.g., center portion) of the touch sensitive surface 104. The analysis of the sensor data and the classification process performed by the hover classification engine 130 or touch classification engine 124 can be substantially the same as performed with regard to the frame image 600 of FIG. 6, or as otherwise described herein, except that the hover classification engine 130 or touch classification engine 124 can determine that the intentional touch interaction is with a center portion of the touch sensitive surface 104 instead of the center-left portion of the touch sensitive surface 104, as was determined in the frame image 600 of FIG. 6. The classification engine (e.g., the hover classification engine 130 or touch classification engine 124) can generate the frame image 700 comprising the grayscale colored region 702 that can present grayscale information (e.g., corresponding to respective higher-density portions of the frame image 700) illustrating respective intensities of contact of respective portions of the finger of the user with the respective portions of the touch sensitive surface 104 and/or respective proximities of respective portions of the finger of the user to the touch sensitive surface 104.

Based at least in part on the classification of the touch interaction being an intentional touch interaction and being a finger touch of the center portion of the touch sensitive surface 104 that can correspond to the location of the grayscale colored region 702, the application processor 112 (e.g., the touch management component 120 of the application processor 112) can control the operation of the touch sensitive device 100 to perform an operation (e.g., selection of a button, control, or application, . . . ) that can correspond to such finger touching of the touch sensitive surface 104. As more fully described herein, if the application processor 112 was in an inactive state at the time of the touch interaction, and the hover classification engine 130 performed the classification and classified the touch interaction as an intentional touch interaction, the hover management component 128 can communicate a notification signal to the application processor 112. In response, the application processor 112 can transition to the active state and can process the intentional touch interaction accordingly.

Figure 8:
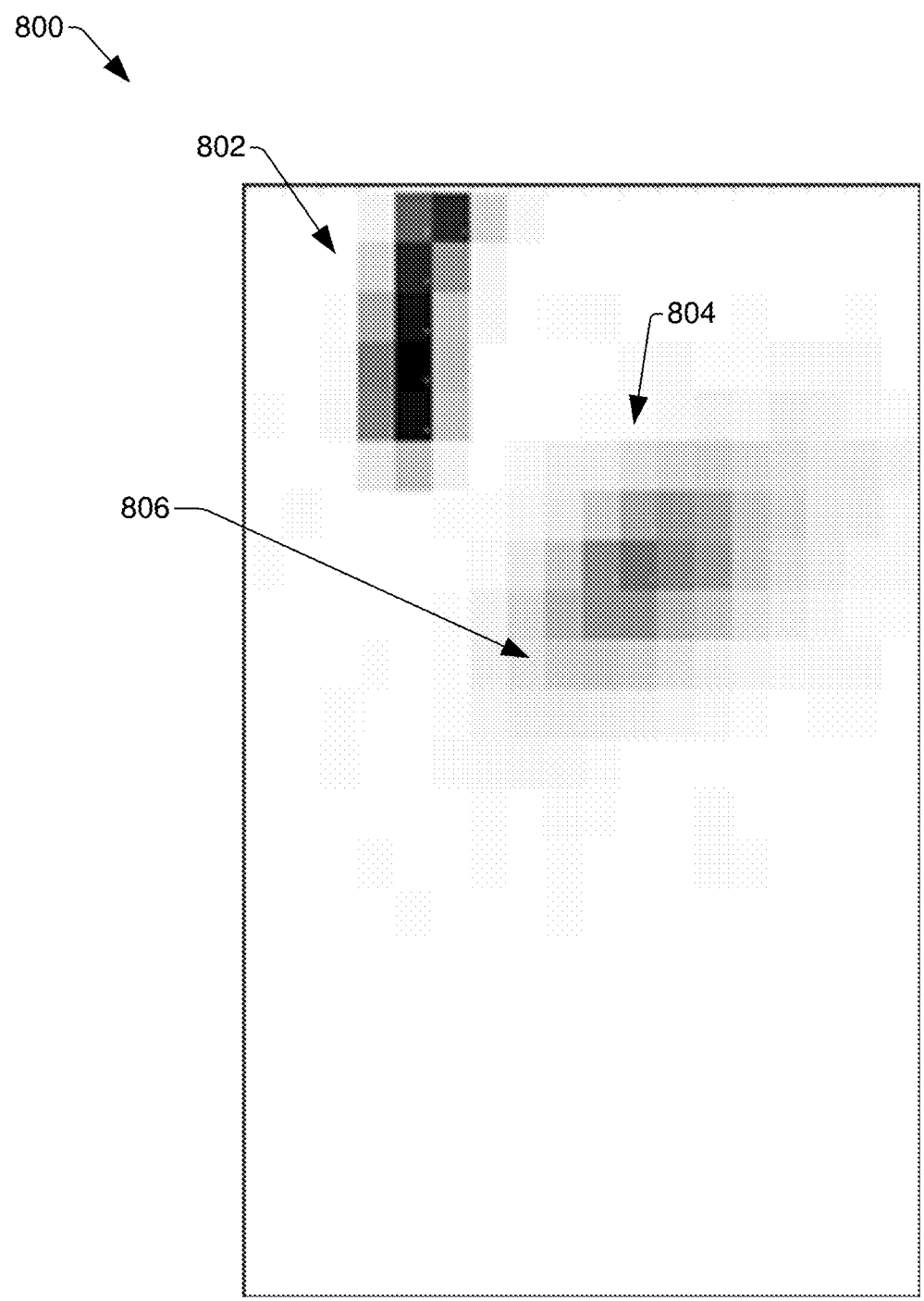
FIG. 8 presents a diagram of an example frame image that can be generated based at least in part on capacitance data when certain surface-related sensors of the sensor array detect relative intensities of touching or hovering of an ear of a user with the touch sensitive surface, in accordance with various aspects and embodiments of the disclosed subject matter.

Turning briefly to FIG. 8 (along with FIGS. 1 and 2), FIG. 8 presents a diagram of an example frame image 800 that can be generated based at least in part on capacitance data (e.g., mutual capacitance data) when certain surface-related sensors 108 (e.g., capacitive sensors) of the sensor array 202 detect relative intensities of touching or hovering of an ear of a user with the touch sensitive surface 104, in accordance with various aspects and embodiments of the disclosed subject matter. The frame image 800 can represent a frame associated with the touch sensitive surface 104 at a time during which the ear of the user is in contact with or in proximity to portions of the touch sensitive surface 104.

The analysis of the sensor data and the classification process performed by the hover classification engine 130 or touch classification engine 124 can be substantially the same as performed with regard to, for example, the frame image 500 of FIG. 5, or as otherwise described herein, except that the hover classification engine 130 or touch classification engine 124 can determine that the unintentional touch or hover interaction of the user's ear with the touch sensitive surface 104 is a different interaction of the user's ear with the touch sensitive surface 104 and the touch or hover interaction does not include a cheek interaction or hair/head interaction with the touch sensitive surface 104, as was determined in the frame image 500 of FIG. 5. Based at least in part on the results of analyzing sensor data, the classification engine (e.g., the hover classification engine 130 or touch classification engine 124) can generate the frame image 800 comprising grayscale colored region 802 that can indicate the upper part of the user's ear is in contact with the portion of the touch sensitive surface 104 that can correspond to the location of the grayscale colored region 802 depicted in the frame image 800. The frame image 800 also can include grayscale colored region 804, which can indicate the ear lobe of the user's ear is in contact with or at least in proximity to another portion of the touch sensitive surface 104 that can correspond to the location of the grayscale colored region 804 depicted in the frame image 800. For instance, the portion 806 of the grayscale colored region 804 can indicate that the portion (e.g., a portion of the ear lobe) of the user's ear is in proximity to, but is not in physical contact with, the touch sensitive surface 104.

In response to the touch or hover interaction(s) being classified as unintentional (e.g., unintentional ear interaction with the touch sensitive surface 104), the application processor 112 and/or touch controller component 114 can take appropriate action. For example, if the application processor 112 is in the active state, the touch management component 120 of the application processor 112 can reject the unintentional touch or hover interaction, prevent an operation from being performed by the device 100 in response to the unintentional touch or hover interaction, transition the display screen 122 from an on state to an off state, and/or transition the application processor 112 from the active state to an inactive state. As another example, if the application processor 112 is in the inactive state, the hover management component 128 of the touch controller component 114 can reject the unintentional touch or hover interaction, and the touch controller component 114 will not send a notification signal to the application processor 112. As a result, the application processor 112 can remain in the inactive state, and no operation will be performed in response to the unintentional touch or hover interaction.

Figure 9:
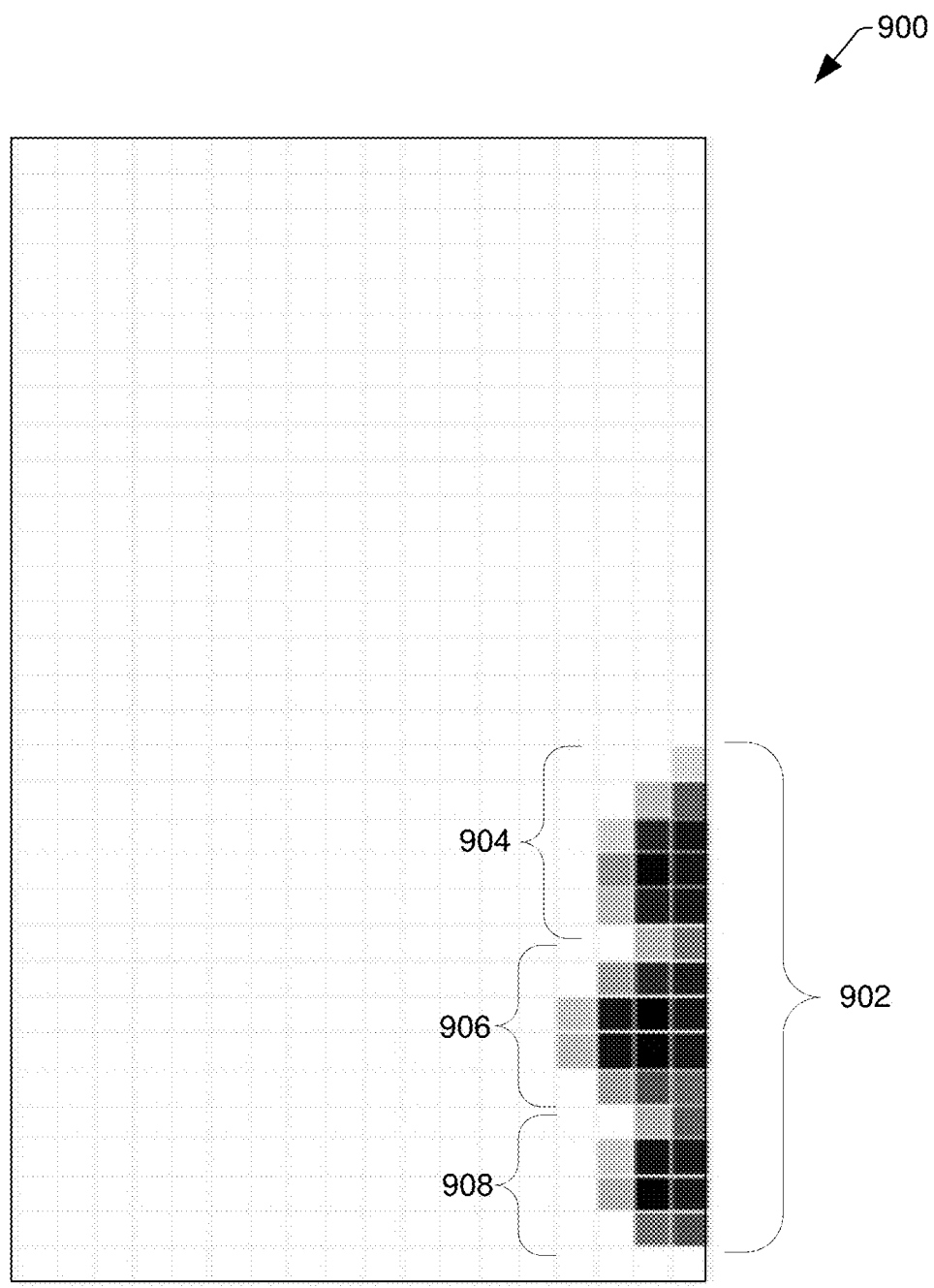
FIG. 9 depicts a diagram of an example frame image that can be generated based at least in part on sensor data when certain surface-related sensors of the sensor array detect touching or hovering of fingers of a user with a certain portion of the touch sensitive surface due to a grip of the user on the device, in accordance with various aspects and embodiments of the disclosed subject matter.

With regard to FIG. 9 (along with FIGS. 1 and 2), FIG. 9 depicts a diagram of an example frame image 900 that can be generated based at least in part on sensor data when certain surface-related sensors 108 of the sensor array 202 detect touching or hovering (e.g., relative intensities of contact or hovering) of fingers of a user with a certain portion of the touch sensitive surface 104 due to a grip of the user on the device 100, in accordance with various aspects and embodiments of the disclosed subject matter. In this example, the touch or hover interaction can relate to an instance where the user is gripping the device 100 such that three of the user's fingers are wrapped around the casing of the device 100 and are partly touching or in sufficiently close proximity to the bottom-right portion of the touch sensitive surface 104.

The analysis of the sensor data and the classification process performed by the hover classification engine 130 or touch classification engine 124 can be substantially the same as performed with regard to the frame image 600 of FIG. 6, or as otherwise described herein, except that the hover classification engine 130 or touch classification engine 124 can determine that the interaction involves three fingers on the lower right side portion of the touch sensitive surface 104 and the touch or hover interaction is an unintentional touch or hover interaction, instead of the interaction being an intentional touch interaction of one finger on the center-left portion of the touch sensitive surface 104, as was determined in the frame image 600 of FIG. 6. The classification engine (e.g., the hover classification engine 130 or touch classification engine 124) can generate the frame image 900 comprising the grayscale colored region 902 that can present grayscale information (e.g., corresponding to respective higher-density portions of the frame image 900) depicting respective intensities of contact of respective portions of the respective fingers of the user with the respective portions of the touch sensitive surface 104 and/or respective proximities of respective portions of the respective fingers of the user to the touch sensitive surface 104. For instance, the grayscale colored region 902 can indicate that an object(s), which can correspond to (e.g., be in the shape of) three fingers (e.g., end portions of the fingers), is (are) in contact with the portion (e.g., lower right side portion) of the touch sensitive surface 104 that can correspond to the location of the grayscale colored region 902 depicted in the frame image 900. From the frame image 900, it can be observed that, for the grayscale colored region 902, there is a first grayscale colored portion 904 that can depict a first finger of the user touching the touch sensitive surface 104, a second grayscale colored portion 906 that can depict a second finger of the user touching the touch sensitive surface 104, and a third grayscale colored portion 908 that can depict a third finger of the user touching the touch sensitive surface 104.

The classification engine (e.g., the hover classification engine 130 or touch classification engine 124) can determine or identify that there are three respective touch or hover interactions by three fingers of the user on such portion (e.g., lower right side portion) of the touch sensitive surface 104 and can further determine that the three finger interactions with the touch sensitive surface 104 are all unintentional touch or hover interactions, based at least in part on the results of analyzing the sensor data and/or other sensor data (e.g., raw sensor data and/or other raw sensor data), and/or analyzing the frame image 900 generated from the sensor data and/or the other sensor data, and the training of the classification engine, in accordance with the defined classification criteria. For instance, based on the analysis results, which can indicate the respective locations of the respective finger touch or hover interactions, the respective touch intensity levels of the respective finger touch or hover interactions, the classification engine (e.g., the hover classification engine 130 or touch classification engine 124) can determine that the three touch or hover interactions of the three fingers are indicative of unintentional touch or hover interactions with the touch sensitive surface 104 by the three fingers of the user as a result of the user gripping the device 100 in the user's hand.

In response to the touch or hover interactions being classified as unintentional (e.g., unintentional finger interactions with the touch sensitive surface 104), the application processor 112 and/or touch controller component 114 can take appropriate action. As an example, if the user is determined to be using the device 100 to make a phone call (e.g., on speakerphone, or using earbuds) or for a non-data application, if the application processor 112 is in the active state, the touch management component 120 of the application processor 112 can reject the unintentional touch or hover interactions, prevent an operation from being performed by the device 100 in response to the unintentional touch or hover interactions, transition the display screen 122 from an on state to an off state, and/or transition the application processor 112 from the active state to an inactive state. As another example, if the application processor 112 is in the inactive state, the hover management component 128 of the touch controller component 114 can reject the unintentional touch or hover interaction, and the touch controller component 114 will not send a notification signal to the application processor 112. As a result, the application processor 112 can remain in the inactive state, and no operation will be performed in response to the unintentional touch or hover interaction.

Figure 10:
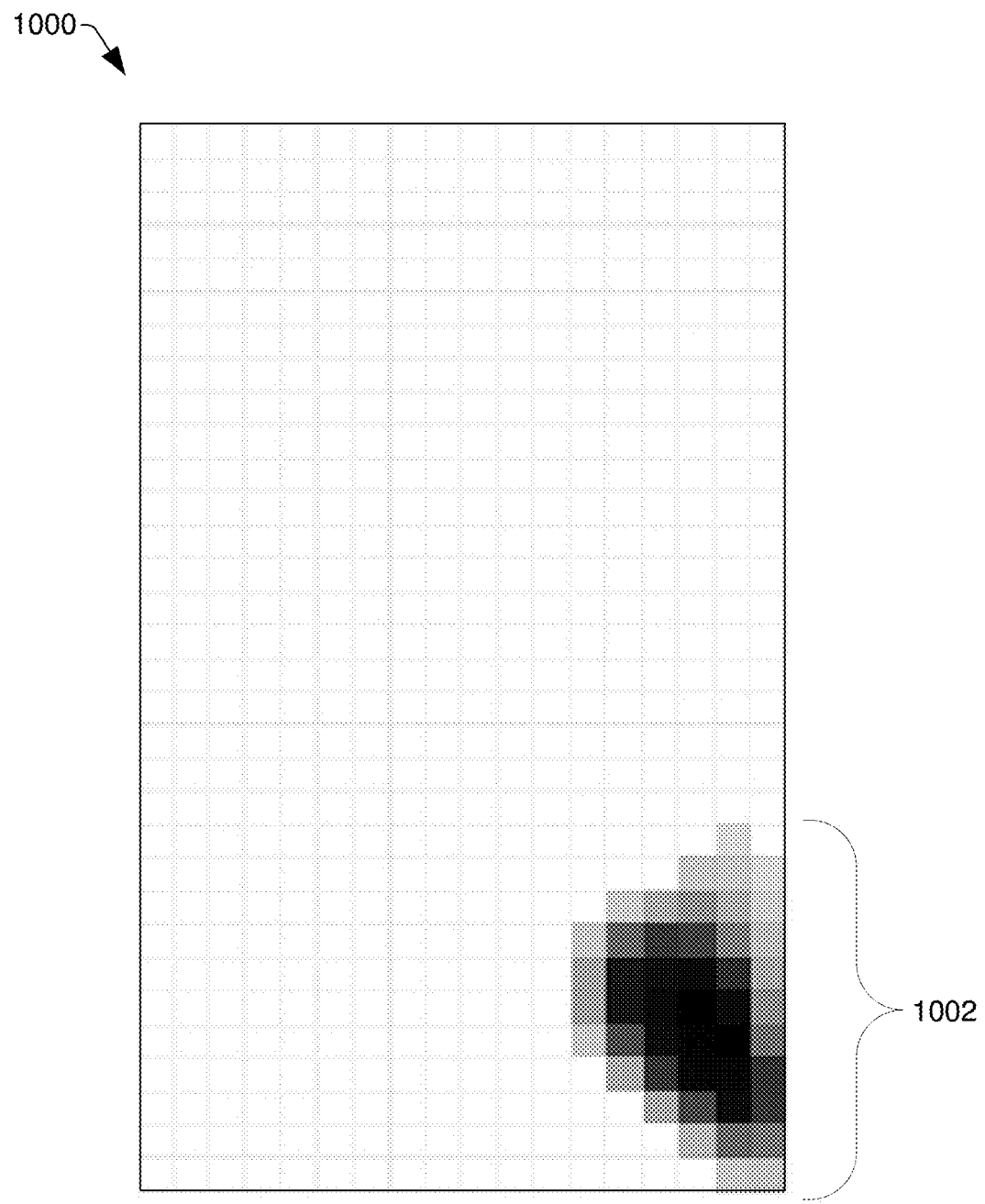
FIG. 10 depicts a diagram of an example frame image that can be generated based at least in part on sensor data when certain surface-related sensors of the sensor array detect touching or hovering of a palm of a user with a portion of the touch sensitive surface due to a grip of the user on the device, in accordance with various aspects and embodiments of the disclosed subject matter.

With regard to FIG. 10 (along with FIGS. 1 and 2), FIG. 10 depicts a diagram of an example frame image 1000 that can be generated based at least in part on sensor data when certain surface-related sensors 108 of the sensor array 202 detect touching or hovering (e.g., relative intensities of contact or hovering) of a palm of a user with a portion of the touch sensitive surface 104 due to a grip of the user on the device 100, in accordance with various aspects and embodiments of the disclosed subject matter. With regard to the frame image 1000, the touch event can relate to an instance where the user is gripping the device 100 such that the hand of the user is wrapped around the casing of the device 100 and the palm of the user is partly touching or in sufficiently close proximity to the bottom right portion of the touch sensitive surface 104.

The analysis of the sensor data and the classification process performed by the hover classification engine 130 or touch classification engine 124 can be substantially the same as performed with regard to the frame image 500 of FIG. 5, or as otherwise described herein, except that the hover classification engine 130 or touch classification engine 124 can determine that the unintentional touch or hover interaction involves a palm (e.g., portion of the palm) of the user interacting with the lower right side portion of the touch sensitive surface 104, instead of the interaction being an unintentional touch or hover interaction of the ear, cheek, and head/hair of the user with the touch sensitive surface 104, as was determined in the frame image 500 of FIG. 5. The classification engine (e.g., the hover classification engine 130 or touch classification engine 124) can generate the frame image 1000 comprising grayscale colored region 1002 that can present grayscale information (e.g., corresponding to respective higher-density portions of the frame image 1000) depicting respective intensities of contact of respective portions of the palm of the user with the respective portions of the touch sensitive surface 104 and/or respective proximities of respective portions of the palm of the user to the touch sensitive surface 104. For instance, the grayscale colored region 1002 can indicate that an object, which correspond to (e.g., be in the shape of) the palm of the user, is in contact with or proximity to the bottom right portion of the touch sensitive surface 104, which can correspond to the location of the grayscale colored region 1002 depicted in the frame image 1000.

The classification engine (e.g., the hover classification engine 130 or touch classification engine 124) can determine or identify that this touch or hover interaction is a palm touch or hover interaction of the user on the bottom right portion of the touch sensitive surface 104 and can further determine that such palm touch or hover interaction is unintentional, based at least in part on the results of analyzing the sensor data and/or other sensor data (e.g., raw sensor data and/or other raw sensor data), and/or analyzing the frame image 1000 generated from the sensor data and/or the other sensor data, and the training of the classification engine, in accordance with the defined classification criteria. For instance, based at least in part on the results of the analyses, which can indicate the location of the touch or hover interaction, and the respective touch intensity levels of the respective portions of the touch or hover interaction, the classification engine (e.g., the hover classification engine 130 or touch classification engine 124) can determine that the touch or hover interaction of the user's palm on the touch sensitive surface 104 is indicative of unintentional touch or hover interaction with the touch sensitive surface 104 by the palm of the user as a result of the user gripping the device 100 in the user's hand.

The application processor 112 and/or touch controller component 114 can take appropriate action, in response to the touch or hover interaction being classified as unintentional (e.g., an unintentional palm interaction with the touch sensitive surface 104). For example, if the user is determined to be using the device 100 to make a phone call (e.g., on speakerphone, or using earbuds) or for a non-data application, if the application processor 112 is in the active state, the touch management component 120 of the application processor 112 can reject the unintentional palm interaction, prevent an operation from being performed by the device 100 in response to the unintentional palm interaction, transition the display screen 122 from an on state to an off state, and/or transition the application processor 112 from the active state to an inactive state. As another example, if the application processor 112 is in the inactive state, the hover management component 128 of the touch controller component 114 can reject the unintentional palm interaction, and the touch controller component 114 will not send a notification signal to the application processor 112. As a result, the application processor 112 can remain in the inactive state, and no operation will be performed in response to the unintentional palm interaction.

Figure 11:
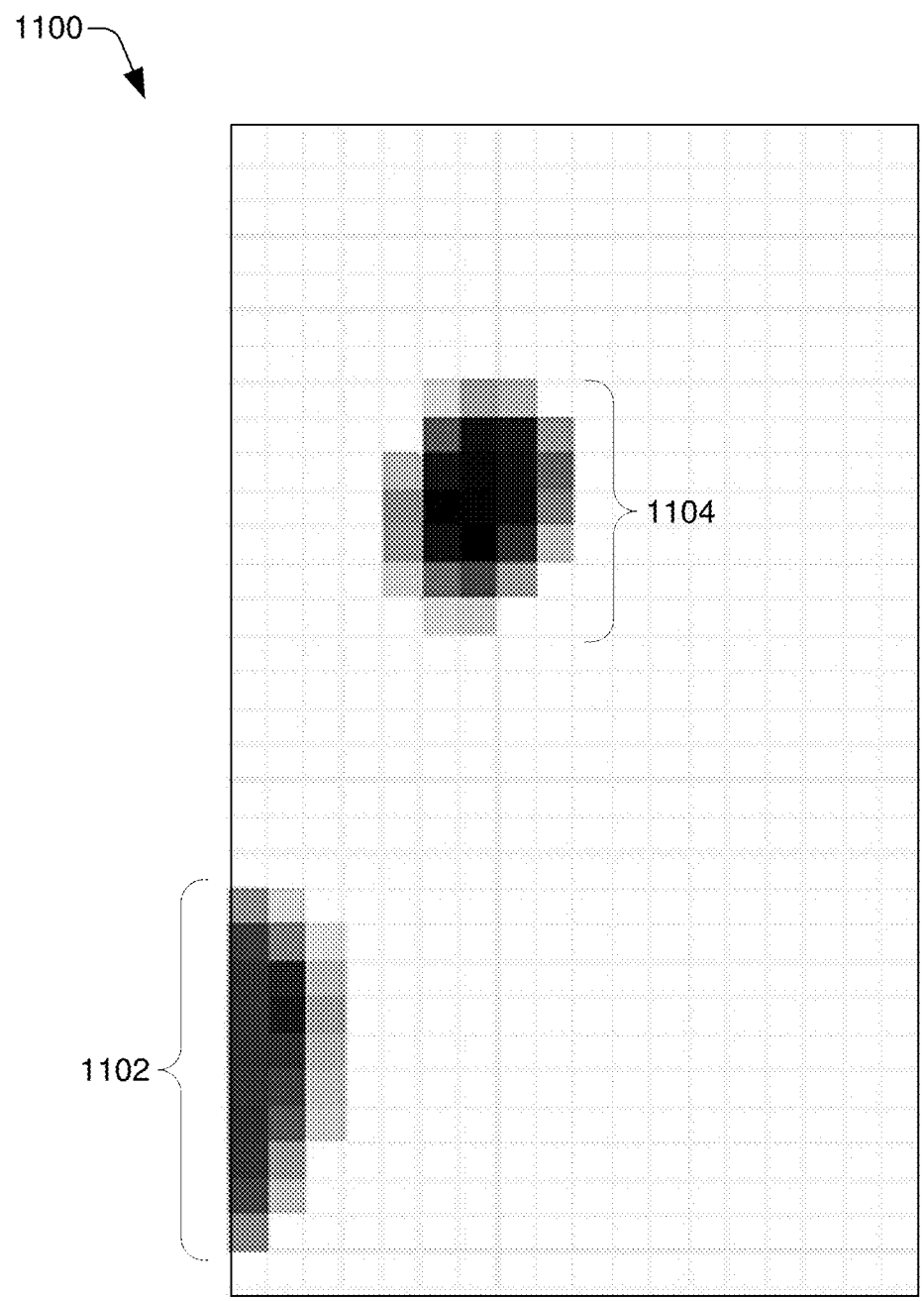
FIG. 11 depicts a diagram of respective example frame image that can be generated based at least in part on sensor data when certain surface-related sensors of the sensor array detect touching or hovering of a palm and a thumb of a user with respective portions of the touch sensitive surface due to a grip of the user on the touch sensitive device, in accordance with various aspects and embodiments of the disclosed subject matter.

Referring briefly to FIG. 11 (along with FIGS. 1 and 2), FIG. 11 depicts a diagram of respective example frame image 1100 that can be generated based at least in part on sensor data when certain surface-related sensors 108 of the sensor array 202 detect touching or hovering (e.g., relative intensities of contact or hovering) of a palm and a thumb of a user with respective portions of the touch sensitive surface 104 due to a grip of the user on the touch sensitive device 100, in accordance with various aspects and embodiments of the disclosed subject matter. In the example frame image 1100, the touch or hover interactions can relate to an instance where the user is gripping the touch sensitive device 100 such that the hand of the user is gripping the casing of the device 100 and the user's palm is partly touching or is in sufficiently close proximity to touching a first portion (e.g., bottom left side portion) of the touch sensitive surface 104 and the user's thumb is touching or is in sufficiently close proximity to touching a second portion (e.g., a center portion) of the touch sensitive surface 104.

The analysis of the sensor data and the classification process performed by the hover classification engine 130 or touch classification engine 124 can be substantially the same as performed with regard to the frame image 500 of FIG. 5, or as otherwise described herein, except that the hover classification engine 130 or touch classification engine 124 can determine that the unintentional touch or hover interaction involves a palm (e.g., portion of the palm) of the user interacting with the bottom left side portion, and a thumb of the user interacting with the center portion, of the touch sensitive surface 104, instead of the interaction being an unintentional touch or hover interaction of the ear, cheek, and head/hair of the user with the touch sensitive surface 104, as was determined in the frame image 500 of FIG. 5. The classification engine (e.g., the hover classification engine 130 or touch classification engine 124) can generate the frame image 1100 comprising grayscale colored region 1102 that can present grayscale information (e.g., corresponding to respective higher-density portions of the frame image 1100) depicting respective intensities of contact of respective portions of the palm of the user with the respective portions of the touch sensitive surface 104 and/or respective proximities of respective portions of the palm of the user to the touch sensitive surface 104. For instance, the grayscale colored region 1102 can indicate that an object, which correspond to (e.g., be in the shape of) the palm of the user, is in contact with or proximity to the bottom left portion of the touch sensitive surface 104, which can correspond to the location of the grayscale colored region 1102 depicted in the frame image 1100. The frame image 1100 also can include grayscale colored region 1104 that can present grayscale information depicting respective intensities of contact of respective portions of the thumb of the user with the respective portions of the touch sensitive surface 104 and/or respective proximities of respective portions of the thumb of the user to the touch sensitive surface 104. For example, the grayscale colored region 1104 can indicate that an object, which correspond to (e.g., be in the shape of) the thumb of the user, is in contact with or proximity to a center portion of the touch sensitive surface 104, which can correspond to the location of the grayscale colored region 1104 depicted in the frame image 1100.

The classification engine (e.g., the hover classification engine 130 or touch classification engine 124) can determine or identify that this touch or hover interaction is a palm touch or hover interaction of the user on the bottom left portion of the touch sensitive surface 104, and a thumb touch or hover interaction of the user on a center portion of the touch sensitive surface 104, and can further determine that such palm and thumb touch or hover interactions are unintentional, based at least in part on the results of analyzing the sensor data and/or other sensor data (e.g., raw sensor data and/or other raw sensor data), and/or analyzing the frame image 1100 generated from the sensor data and/or the other sensor data, and the training of the classification engine, in accordance with the defined classification criteria. For instance, based at least in part on the results of the analyses, which can indicate the respective locations of the touch or hover interactions, and the respective touch intensity levels of the respective portions of the touch or hover interactions, the classification engine (e.g., the hover classification engine 130 or touch classification engine 124) can determine that the touch or hover interactions of the user's palm and thumb on the touch sensitive surface 104 are indicative of unintentional touch or hover interactions with the touch sensitive surface 104 by the palm and thumb of the user as a result of the user gripping the device 100 in the user's hand.

In response to the touch or hover interactions being classified as unintentional (e.g., unintentional palm and thumb interactions with the touch sensitive surface 104), the application processor 112 and/or touch controller component 114 can take appropriate action. For example, if the user is determined to be using the device 100 to make a phone call (e.g., on speakerphone, or using earbuds) or for a non-data application, if the application processor 112 is in the active state, the touch management component 120 of the application processor 112 can reject the unintentional palm and thumb interactions, prevent an operation from being performed by the device 100 in response to the unintentional palm and thumb interactions, transition the display screen 122 from an on state to an off state, and/or transition the application processor 112 from the active state to an inactive state. As another example, if the application processor 112 is in the inactive state, the hover management component 128 of the touch controller component 114 can reject the unintentional palm and thumb interactions, and the touch controller component 114 will not send a notification signal to the application processor 112. As a result, the application processor 112 can remain in the inactive state, and no operation will be performed in response to the unintentional palm and thumb interactions with the touch sensitive surface 104.

Figure 12:
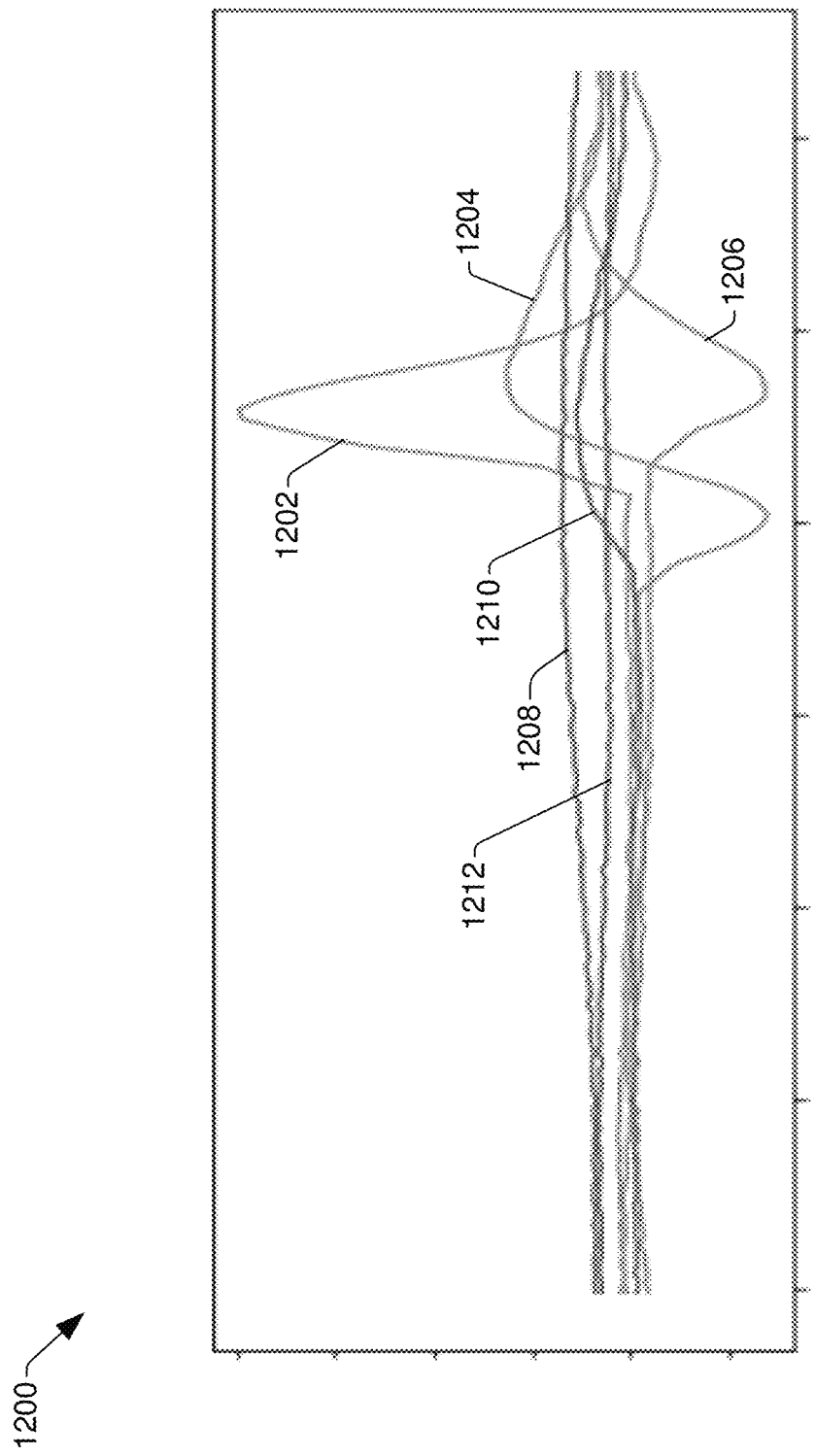
FIG. 12 illustrates a diagram of an example graph that can represent motion and/or impact data (e.g., accelerometer data and/or gyroscope data) relating to a touch or hover interaction involving the user touching or hovering in proximity to the touch sensitive surface when a certain sensor(s) of the sensor component detects certain motion of the touch sensitive device and/or impact on the touch sensitive surface of the device, in accordance with various aspects and embodiments of the disclosed subject matter.

Turning briefly to FIG. 12 (along with FIG. 1), FIG. 12 illustrates a diagram of an example graph 1200 that can represent motion and/or impact data (e.g., accelerometer data and/or gyroscope data) relating to a touch or hover interaction involving the user touching or hovering in proximity to the touch sensitive surface 104 when a certain sensor(s) (e.g., sensor(s) 110, such as an accelerometer and/or gyroscope) of the sensor component 106 detects certain motion of the touch sensitive device 100 and/or impact on the touch sensitive surface 104 of the device 100, in accordance with various aspects and embodiments of the disclosed subject matter. The motion and/or impact data presented in the example graph 1200 can comprise respective accelerometer data and gyroscope data along six respective axes associated with the touch sensitive device 100 for a defined period of time (e.g., 2.5 seconds or other desired amount of time that can be less than or greater than 2.5 seconds), as such respective accelerometer data and gyroscope data was obtained by a six-axis sensor (e.g., three-axis accelerometer and three-axis gyroscope) and stored in the buffer component 126. For instance, the motion data can comprise first accelerometer data 1202 along a first axis, second accelerometer data 1204 along a second axis, and third accelerometer data 1206 along a third axis; and the motion data also can comprise first gyroscope data 1208 along a first axis, second gyroscope data 1210 along a second axis, and third gyroscope data 1212 along a third axis, of the gyroscope.

A classification engine (e.g., the hover classification engine 130 or the touch classification engine 124) can analyze the motion and/or impact data (e.g., motion and/or impact data presented in example graph 1200). Based at least in part on the results of the analysis of the motion and/or impact data, the classification engine can determine that a touch or hover interaction with regard to the touch sensitive surface 104 occurred, or at least determine that the sensor data analysis results indicate that a touch or hover interaction with regard to the touch sensitive surface 104 occurred, for example, as indicated by the portion of the motion and/or impact data at reference numeral 1214. Also, based at least in part on the analysis results, the classification engine can determine whether the touch or hover interaction is intentional or unintentional. It is noted that, in some embodiments, the hover classification engine 130 can have access to the motion and/or impact data (e.g., stored in the buffer component 126), for instance, when the application processor 112 is in an active state. In certain embodiments, the hover classification engine 130 is not able to access motion and/or impact data stored in the buffer component 126 when the application processor 112 is in an inactive state.

As disclosed herein, the classification engine (e.g., the hover classification engine 130 or the touch classification engine 124) can utilize one or more axes of motion and/or impact data to facilitate determining whether a touch or hover interaction of an object(s) with respect to the touch sensitive surface 104 has occurred and determining a classification of a touch or hover interaction relating to a touch of an object(s) with or a proximity of an object(s) to the touch sensitive surface 104. The number of axes of motion and/or impact data utilized by the classification engine can be determined based at least in part on a number of factors, in accordance with the defined classification criteria. The factors can comprise, for example, the type(s) and/or number of sensors 110 employed by the touch sensitive device 100, the amount or resource and/or time available to the classification engine, a classification at the time the analysis of motion and/or impact data (and/or other data (e.g., touch surface data)) is being performed, a confidence level of a classification of a touch event made by the classification engine based at least in part on the touch surface data (and/or other sensor data (besides motion data)), and/or one or more other factors.

For example, if a touch sensitive device (e.g., touch sensitive device 100) employs a single-axis accelerometer and no other type of motion-related sensor, only one axis of motion and/or impact data can be available for analysis by the classification engine (e.g., the hover classification engine 130 or the touch classification engine 124); if a touch sensitive device employs a two-axis accelerometer and no other type of motion-related sensor, only up to two axes of motion and/or impact data can be available for analysis by the classification engine; and if a touch sensitive device employs a three-axis accelerometer and no other type of motion-related sensor, only up to three axes of motion and/or impact data can be available for analysis by the classification engine. As another example, if a touch sensitive device employs a three-axis accelerometer and a three-axis gyroscope, up to six axes of motion and/or impact data can be available for analysis by the classification engine, whereas if only a three-axis accelerometer is used and no three-axis gyroscope is employed (or alternatively if only a three-axis gyroscope is used and no three-axis accelerometer is employed), only up to three axes of motion and/or impact data can be available for analysis by the classification engine.

With regard to resources and time available to the classification engine (e.g., the hover classification engine 130 or the touch classification engine 124) for classification of a touch or hover interaction, when analyzing data, such as touch surface data and motion and/or impact data associated with the touch sensitive device 100, there may be some instances where the amount of available resources (e.g., processing resources) and/or time is relatively lower. In such instances, even if the classification engine has motion and/or impact data associated with a higher number (e.g., six, five, or four, . . . ) of axes available for analysis, given the relatively lower amount of resources or time available at that particular time, when desirable (e.g., when in accordance with the applicable defined classification criteria), the classification engine (e.g., the hover classification engine 130 as managed by the hover management component 128, or the touch classification engine 124 as managed by the touch management component 120) can utilize and analyze motion and/or impact data associated with a lower number (e.g., one, two, three, . . . ) of axes (or axis) in determining a classification of a touch or hover interaction of an object(s) with the touch sensitive surface 104. In instances when there are sufficient resources and time available, the classification engine can use and analyze all or a desired portion motion and/or impact data associated with all or a desired number of available axes to determine a classification of a touch or hover interaction of an object(s) with the touch sensitive surface 104, in accordance with the defined classification criteria.

With regard to confidence level as a factor, in some implementations, the classification engine (e.g., the hover classification engine 130 or the touch classification engine 124) can perform an analysis (or a relatively quicker preliminary analysis) on touch surface data from surface-related sensors 108 to determine an initial classification (or preliminary contact classification) of a touch or hover interaction for an object(s) with the touch sensitive surface 104, wherein, as part of the analysis, the classification engine also can determine a confidence level in the accuracy of the initial (or preliminary) classification. Based at least in part on the confidence level in the accuracy of the initial (or preliminary) classification, the classification engine (e.g., the hover classification engine 130 or the touch classification engine 124), the hover management component 128, or the touch management component 120 can determine the amount of motion and/or impact data (e.g., the number of axes of motion data) for the classification engine to analyze to determine (e.g., make a final determination of) a classification of a touch or hover interaction for an object(s) with the touch sensitive surface 104, in accordance with the defined classification criteria (e.g., criteria relating to confidence levels in accuracy of classifications and/or resources and time).

For example, if the classification engine (e.g., the hover classification engine 130 or the touch classification engine 124) determines that the confidence level in the accuracy of the initial (or preliminary) classification of a touch or hover interaction is relatively high (e.g., satisfies (e.g., meets or exceeds) a defined threshold confidence level in accuracy), the classification engine, the hover management component 128, or the touch management component 120 can determine that a relatively lower amount of motion and/or impact data (e.g., a lower number of axes of motion and/or impact data) is to be analyzed to determine, verify, or confirm a classification of the touch or hover interaction for the object(s) with the touch sensitive surface 104, in accordance with the defined classification criteria. In this way, the classification engine can determine the classification of the touch or hover interaction of the object(s) with the touch sensitive surface 104 with a desirably (e.g., sufficiently or suitably) high level of confidence in the accuracy of such classification without undesirably (e.g., unnecessarily) utilizing the additional resources and time to analyze all or a larger portion of the available motion and/or impact data (e.g., all or a larger number of axes of motion data) in connection with determining such classification.

If, however, the classification engine (e.g., the hover classification engine 130 or the touch classification engine 124) determines that the confidence level in the accuracy of the initial (or preliminary) classification is relatively low (e.g., does not satisfy (e.g., does not meet or exceed) the defined threshold confidence level in accuracy), the classification engine, the hover management component 128, or the touch management component 120 can determine that a relatively higher amount of motion and/or impact data (e.g., all or a relatively higher number of axes of motion data) is to be analyzed to determine, verify, or confirm a classification of the touch or hover interaction of the object(s) with the touch sensitive surface 104, in accordance with the defined classification criteria. In this way, the classification engine can analyze all or at least a relatively higher amount of the available motion and/or impact data to attempt to determine or verify a classification of the touch or hover interaction of the object(s) with the touch sensitive surface 104 to a higher level of confidence in the accuracy of the classification than the accuracy confidence level achieved through analysis of the touch surface data alone.

It is to be appreciated and understood that typically, or at least it is more likely that, the performance and determination of a classification of a touch or hover interaction of an object(s) with the touch sensitive surface 104 by the classification engine (e.g., the hover classification engine 130 or the touch classification engine 124) can be desirably enhanced (e.g., increasingly improved and/or more accurate) by using motion and/or impact data associated with a higher number of axes than by using motion and/or impact data associated with a lower number of axes or not using motion and/or impact data at all.

In accordance with various other embodiments, additionally or alternatively, the classification engine (e.g., the hover classification engine 130 or the touch classification engine 124) can utilize other information (e.g., supplemental information) to facilitate classifying and discriminating between one or more touch or hover interactions of one or more objects with the touch sensitive surface 104, as more fully described herein. For example, the classification engine (or another component of the touch sensitive device 100) can monitor and analyze vibro-acoustic data relating to movement or vibrations associated with the touch sensitive device 100, wherein the vibro-acoustic data can provide information that can facilitate classifying and distinguishing (e.g., disambiguating) between the types of touch or hover interactions that objects can have with the touch sensitive surface 104 of the touch sensitive device 100. For example, one or more sensors of the sensor component 106 can sense vibrations of the device 100 or associated with the device 100, and can generate vibro-acoustic data based at least in part on such sensing. The classification engine (e.g., the hover classification engine 130 or the touch classification engine 124) can use (e.g., analyze) the vibro-acoustic data to facilitate identifying when the touch sensitive surface 104 has been brought into contact with fingertips of a user, finger knuckles of the user, fingernails of the user, a palm of the user, another body part of the user, a stylus, and/or a wide variety of other types of things.

Additionally or alternatively, the classification engine (e.g., the hover classification engine 130 or the touch classification engine 124) can utilize orientation data relating to the orientation of the touch sensitive device 100 to facilitate determining a classification of a touch event(s) for an object(s) with respect to the touch sensitive surface 104. For instance, the sensor component 106 can comprise one or more sensors (e.g., sensors 110, such as an accelerometer, a gyroscope, and/or an IMU) that can sense, measure, determine, and/or facilitate determining an orientation of the touch sensitive device 100 with respect to the environment. The one or more sensors can provide sensor data (e.g., orientation data) relating to the orientation of the touch sensitive device 100 to the classification engine. Certain orientations of the touch sensitive device 100 and corresponding orientation data can be generally or at least often consistent with and/or can indicate that an object(s) associated with (e.g., in contact with or hovering in proximity to) the touch sensitive surface 104 is a finger(s) of a user when the user is intentionally touching the touch sensitive surface 104. Other orientations of the touch sensitive device 100 and corresponding orientation data can be generally or at least often consistent with and/or can indicate that an object(s) associated with the touch sensitive surface 104 is a palm and/or finger(s) of the user when the user is unintentionally touching the touch sensitive surface 104 (e.g., by gripping the device 100 in the user's hand). The classification engine can utilize the orientation data to facilitate identifying and distinguishing between different types of contact or other association (e.g., hover) with the touch sensitive surface 104.

The classification engine (e.g., the hover classification engine 130 or the touch classification engine 124) can analyze the orientation data and other sensor data, such as touch surface data and/or motion data (and/or other sensor data). Based at least in part on the results of analyzing the orientation data, touch surface data, and/or motion data (and/or other sensor data), the classification engine can determine a classification of the touch or hover interaction of the object(s) with the touch sensitive surface 104, in accordance with the defined classification criteria.

Additionally or alternatively, visible light sensors and/or infrared sensors also can be included in devices (e.g., digital display devices) to detect when the finger, ear, face, head, palm, or other part of a user is positioned in close proximity to the touch sensitive surface (e.g., touch screen surface) of such device. The classification engine (e.g., the hover classification engine 130 or the touch classification engine 124) can analyze sensor data produced by the visible light sensors and/or infrared sensors to facilitate discriminating between an intentional finger touch, an unintentional finger touch or hover interaction, an ear or face touch or hover interaction (e.g., unintentional ear or face touch or hover interaction), a palm touch or hover interaction (e.g., unintentional palm touch or hover interaction), or other touch or hover interaction between a body part of the user (or another object, such as a stylus) and the touch sensitive surface 104 of the device 100. It is to be appreciated and understood that the classification engine can accurately classify and discriminate between one or more touch or hover interactions of one or more objects with the touch sensitive surface 104 (e.g., accurately classify and discriminate between multi-point touch interactions) of the touch sensitive device 100 without the touch sensitive device 100 using or relying on using, for example, visible light sensors and/or infrared sensors.

Figure 13:
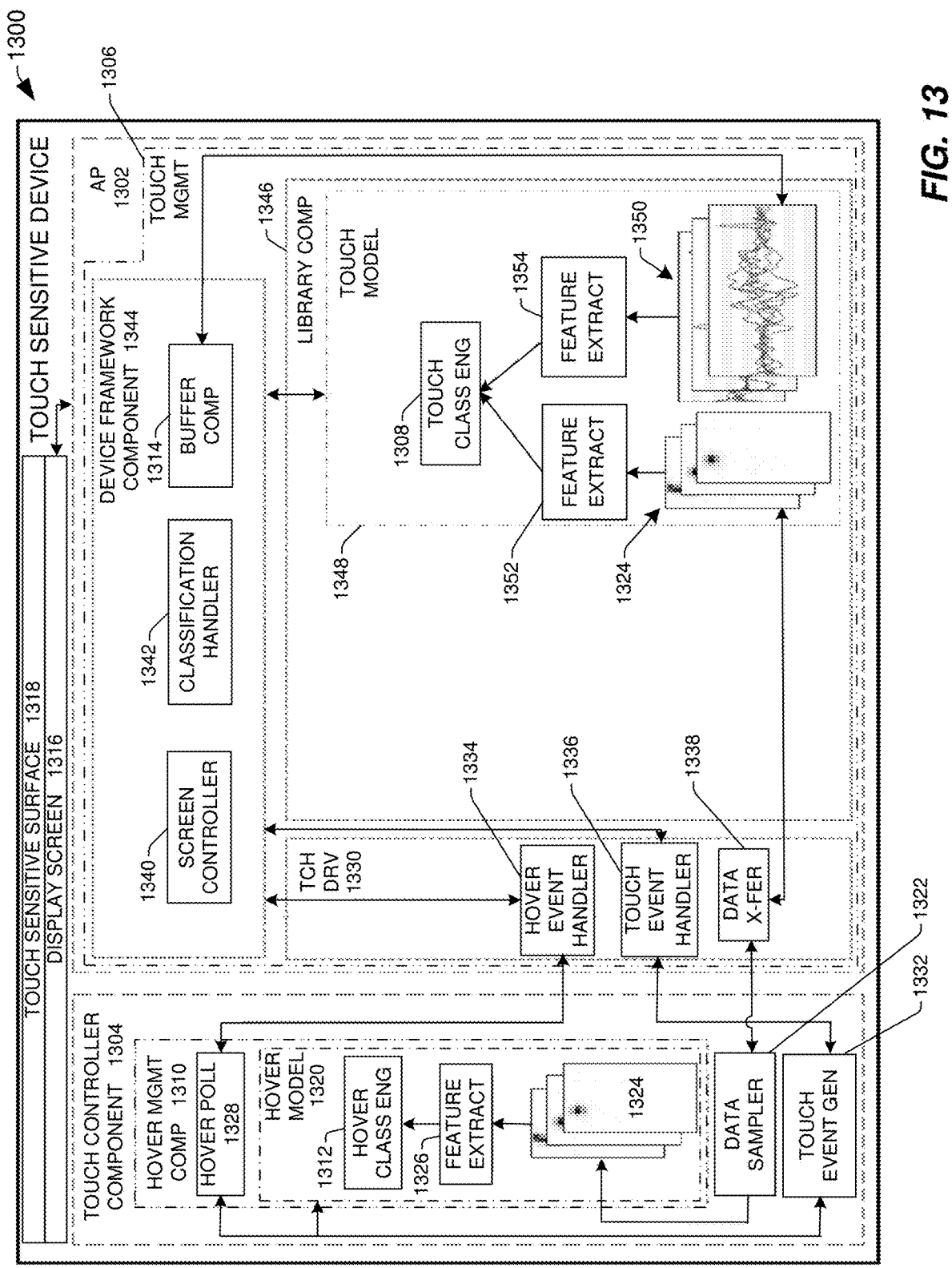
FIG. 13 depicts a block diagram of an example touch sensitive device that can manage the use of an application processor in connection with classifications of interactions of objects with a touch sensitive surface of the touch sensitive device, in accordance with various aspects and embodiments of the disclosed subject matter.

FIG. 13 depicts a block diagram of an example touch sensitive device 1300 that can manage the use of an application processor in connection with classifications of interactions of objects with a touch sensitive surface of the touch sensitive device, in accordance with various aspects and embodiments of the disclosed subject matter. The touch sensitive device 1300 can be or can comprise, for example, a mobile phone, an electronic tablet or notebook, a PDA, a web pad, an electronic gaming device, a computer, a display table, an electronic workstation, a television, an IPTV, a set-top box, a device (e.g., touch sensitive device) in or integrated with a vehicle, a touch pad, a track pad, or other type of device.

The touch sensitive device 1300 can comprise an application processor 1302 (AP) and a touch controller component 1304. The application processor 1302 can comprise a touch management component 1306 (TOUCH MGMT), which can include a touch classification engine 1308

(TOUCH CLASS ENG). The touch controller component 1304 can comprise a hover management component 1310 (HOVER MGMT COMP), which can include a hover classification engine 1312 HOVER CLASS ENG). The application processor 1302 further can comprise a buffer component 1314 (BUFFER COMP). The touch sensitive device 1300 also can comprise a display screen 1316 and a touch sensitive surface 1318 that can be associated with the display screen 1316. The touch sensitive device 1300 further can include a sensor component, which can comprise surface-related sensor and other sensors (e.g., accelerometer, or gyroscope, . . . ), a transceiver component, an interface, and other components, which, for reasons of brevity and clarity, are not shown in FIG. 13. The respective components each can be the same as, and/or can comprise the same or similar respective functionality as, respective components (e.g., respectively named components), such as more fully described herein.

The hover management component 1310 can employ a hover model 1320 that can utilize the hover classification engine 1312 to detect and classify hover or touch interactions of objects with the touch sensitive surface 1318 based at least in part on the results of analyzing sensor data (e.g., touch surface data, and/or motion data, . . . ), in accordance with the defined classification criteria. In some embodiments, the hover classification engine 1312 can access touch surface data and/or motion data, wherein the motion data can be stored in the buffer component 1314, if the application processor 1302 is in the active state. In other embodiments, the hover classification engine 1312 may not be able to access motion data in the buffer component 1314, if the application processor 1302 is in the inactive state. In still other embodiments, the hover classification engine 1312 does not access motion data from the buffer component 1314, regardless of whether the application processor 1302 is in the active state or the inactive state, wherein, in such instances, the hover classification engine 1312 can determine a classification of a hover or touch interaction of an object with the touch sensitive surface 1318 based at least in part on the results of analyzing the touch surface data.

For instance, the hover management component 1310 can comprise a data sampler component 1322 (DATA SAMPLER) that can sample the touch surface data (e.g., capacitive sensor data) at a desired rate (e.g., every $1/15^{th}$ of a second (every 67 milliseconds), $1/30^{th}$ of a second, every $1/60^{th}$ of a second, every $1/100^{th}$ of a second, or at another desired rate or periodicity) to generate data samples 1324 (e.g., samples of sensor data, such as touch surface data). The hover management component 1310, employing the hover model 1320, can analyze the data samples 1324 of the sensor data (and/or other sensor data, such as, e.g., motion data, if available for access by the hover management component 1310). Based at least in part on the results of the analysis of the data samples 1324, the hover management component 1310, employing the hover model 1320, can extract features 1326 (FEATURE EXTRACT 1326) from the data samples 1324. The hover classification engine 1312 can analyze the extracted features 1326 to identify or determine one or more objects, the respective relation of the one or more objects to the touch sensitive surface 1318, the respective relation of objects to each other (if there is more than one object detected), and/or other features or characteristics of the hover or touch interaction of the object(s) with the touch sensitive surface 1318. Based at least in part on the results of the analysis of the extracted features 1326, including the characteristics determined from the extracted features 1326, the hover classification engine 1312 can determine a classification for the hover or touch interaction of the object(s) with the touch sensitive surface 1318, wherein the classification can be an intentional touch interaction, unintentional touch interaction, or unintentional hover interaction, as more fully described herein.

The hover management component 1310 also can comprise a hover polling thread component 1328 (HOVER POLL) that can poll the hover model 1320 or associated hover classification engine 1312 to obtain the hover or touch classification from the hover model 1320 or associated hover classification engine 1312. In response, the hover model 1320 or associated hover classification engine 1312 can provide information (e.g., classification information) regarding the hover or touch interaction to the hover polling thread component 1328. The hover polling thread component 1328 can poll the hover model 1320 or associated hover classification engine 1312 at a desired rate or periodicity (e.g., every 67 milliseconds, or at another desired rate or periodicity) to obtain hover or touch classifications from the hover model 1320 or associated hover classification engine 1312.

In some embodiments, if the application processor 1302 is in an active state, in response to hover management component 1310 detecting and classifying an interaction of an object(s) with the touch sensitive surface 1318 as an unintentional hover interaction, the hover polling thread component 1328 can communicate classification information regarding an unintentional hover interaction to the touch management component 1306 (e.g., a touch driver component 1330 (TCH DRV) of the touch management component 1306 on the application processor 1302) to notify the touch management component 1306 that an interaction of a object(s) with the touch sensitive surface 1318 has been detected and has been classified as an unintentional hover interaction and/or can provide more specific classification information regarding the unintentional hover interaction (e.g., unintentional ear hover, unintentional cheek hover, or unintentional finger hover) to the touch management component 1306. The touch management component 1306 can utilize, process, and/or act upon such classification information regarding an unintentional hover interaction, as more fully described herein.

In other embodiments, if the application processor 1302 is in an inactive state, in response to hover management component 1310 detecting and classifying an interaction of an object(s) with the touch sensitive surface 1318 as an unintentional hover interaction, the hover polling thread component 1328 or other component of the hover management component 1310 can determine that it is not necessary to communicate the classification information regarding the unintentional hover interaction to the touch management component 1306 of the application processor 1302, since the application processor 1302 is in the inactive state and does not have to transition to the active state because the detected interaction was classified as an unintentional hover interaction. Alternatively, when the application processor 1302 is in the inactive state, the hover polling thread component 1328 or other component of the hover management component 1310 can communicate the classification information regarding the unintentional hover interaction to the touch management component 1306, wherein, since the application processor 1302 is in the inactive state and the classification information indicates that the detected interaction is classified as an unintentional hover interaction, the application processor 1302 can remain in the inactive state (e.g., the application processor 1302 will not transition to the active state), and such classification information will not be further processed or acted upon by the application processor 1302.

The hover management component 1310 also can include a touch event generator component 1332 (TOUCH EVENT GEN) that can be associated with (e.g., communicatively connected to) the hover polling thread component 1328. In response to classification of a touch interaction by the hover classification engine 1312 (as communicated to the touch event generator component 1332 by the hover polling thread component 1328), the touch event generator component 1332 can generate classification information, which can comprise a touch event signal, that can identify the classification of the touch interaction, including whether the touch interaction was intentional or unintentional, and/or the type of touch interaction (e.g., intentional finger touch interaction, unintentional ear touch interaction, unintentional face touch interaction, or unintentional finger touch interaction, . . . ). The touch event generator component 1332 can communicate such classification information to the touch management component 1306 (e.g., the touch driver component 1330 of the touch management component 1306) for further processing or action by the application processor 1302 (e.g., performing an operation based at least in part on the intentional touch interaction; or rejecting an unintentional touch interaction, preventing an operation from being performed, switching the display screen 1316 to the off state, and transitioning the application processor 1302 to the inactive state).

In some embodiments, when the application processor 1302 is in the inactive state, in response to an intentional touch interaction being identified by the hover classification engine 1312 (as communicated to the touch event generator component 1332 by the hover polling thread component 1328), the touch event generator component 1332 can generate classification information comprising a notification signal (e.g., an intentional touch event signal, or touch down event signal) that can indicate that an intentional touch interaction of an object(s) (e.g., finger(s)) with the touch sensitive surface 1318 has occurred and/or can include other classification information that can specify the type of intentional touch interaction (e.g., a single finger touch in or on a particular region or control of or associated with the touch sensitive surface 1318, a multiple finger touch on respective particular regions or controls of or associated with the touch sensitive surface 1318, or a gesture (e.g., swipe gesture) by a finger on the touch sensitive surface 1318, . . . ). The touch event generator component 1332 can communicate the classification information, comprising the notification signal, to the touch management component 1306 (e.g., the touch driver component 1330) for further processing or action by the application processor 1302, as more fully described herein.

The touch driver component 1330 of the touch management component 1306 can receive the classification information and/or notification signal from the touch controller component 1304 (e.g., from the touch event generator component 1332 or hover polling thread component 1328 of the hover management component 1310). The touch driver component 1330 can comprise a hover event handler component 1334 (HOVER EVENT HANDLER), a touch event handler component 1336 (TOUCH EVENT HANDLER), and sensor data transfer component 1338 (DATA X-FER). The touch management component 1306 also can comprise a screen controller component 1340 (SCREEN CONTROLLER) and a classification handler component 1342 (CLASSIFICATION HANDLER), which, along with the buffer component 1314, can be part of a device framework component 1344, wherein the device framework component 1344 can be associated with (e.g., communicatively connected to) the touch driver component 1330.

If the application processor 1302 is in the active state, in response to the received classification information indicating that an unintentional hover or touch interaction of an object(s) (e.g., unintentional ear and/or cheek hover or touch interaction) with the touch sensitive surface 1318 has occurred, the hover event handler component 1334, for an unintentional hover interaction, or the touch event handler component 1336, for an unintentional touch interaction, can analyze or process the classification information regarding the unintentional hover or touch interaction to detect that the interaction is classified as an unintentional hover or touch interaction, and, based at least in part on the analysis or processing, can determine an appropriate action for the application processor 1302 to take in response to the unintentional hover or touch interaction and/or can forward the classification information or a corresponding signal (e.g., signal indicating an unintentional hover or touch interaction was detected) to the appropriate component (e.g., classification handler component 1342 and/or screen controller component 1340) for appropriate action to be taken by such component in response to the unintentional hover or touch interaction. For instance, the hover event handler component 1334, for an unintentional hover interaction, or the touch event handler component 1336, for an unintentional touch interaction, can communicate the classification information or corresponding signal to the classification handler component 1342, wherein, in response, the classification handler component 1342 can prevent an operation being performed by the device 1300 based on the unintentional hover or touch interaction and can transition (e.g., switch) the application processor 1302 from the active state to the inactive state. Additionally or alternatively, the screen controller component 1340 can transition the display screen 1316 from the on state to the off state. In some embodiments, the classification handler component 1342 can instruct the screen controller component 1340 to transition the display screen 1316 from the on state to the off state, in response to such classification information or corresponding signal. In other embodiments, the hover event handler component 1334 can communicate such classification information or corresponding signal to the screen controller component 1340, wherein, in response, the screen controller component 1340 can transition the display screen 1316 from the on state to the off state.

If the application processor 1302 is in the inactive state, the application processor 1302 either will not receive classification information regarding the unintentional hover or touch interaction from the hover management component 1310, or, if the hover event handler component 1334 or the touch event handler component 1336 receive classification information regarding the unintentional hover or touch interaction from the hover management component 1310, the hover event handler component 1334, the touch event handler component 1336, or another component of the touch driver component 1330 (or application processor 1302) can determine that the application processor 1302 is to remain in the inactive state, and the application processor 1302 can remain in the inactive state.

With regard to an intentional interaction of an object(s) with the touch sensitive surface 1318, if the application processor 1302 is in the inactive state, in response to the received classification information indicating that an intentional touch interaction of an object(s) (e.g., intentional finger(s) touch interaction) with the touch sensitive surface 1318 has occurred, the touch event handler component 1336 can analyze or process the classification information regarding the intentional touch interaction to determine that the interaction is classified as an intentional touch interaction. In response to determining that the interaction has been classified as an intentional touch interaction, the touch driver component 1330 (e.g., touch event handler component 1336 of the touch driver component 1330) can transition the application processor 1302 from the inactive state to the active state, and the intentional touch interaction can be processed or confirmed by the application processor 1302 and/or an appropriate action can be performed by the application processor 1302 in response to the intentional touch interaction, as more fully described herein.

If the application processor 1302 was already in the active state, or after the application processor 1302 has been transitioned from the inactive state to the active state, in response to the received classification information indicating that an intentional touch interaction of an object(s) with the touch sensitive surface 1318 has occurred, the touch event handler component 1336 can analyze or process the classification information regarding the intentional touch interaction to determine that the interaction is classified as an intentional touch interaction, and, in some embodiments, based at least in part on the analysis or processing, the touch event handler component 1336 can determine an appropriate action for the application processor 1302 to take in response to the intentional touch interaction. Additionally or alternatively, in other embodiments, the touch event handler component 1336 can forward the classification information or a corresponding signal (e.g., signal indicating an intentional touch interaction was detected) to the appropriate component (e.g., classification handler component 1342 and/or screen controller component 1340) for appropriate action to be taken by such component in response to the intentional touch interaction. For instance, the touch event handler component 1336 can communicate the classification information regarding the intentional touch interaction (e.g., intentional touch event or touch down event) or corresponding signal to the classification handler component 1342, wherein, in response, the classification handler component 1342 can perform or facilitate performing (e.g., instruct a component(s) of the device 1300 to perform) an operation(s) (e.g., press or manipulate a button or control associated with the display screen 1316 of the device 1300) based at least in part on the intentional touch interaction. Additionally or alternatively, if the display screen 1316 was in the off state, the screen controller component 1340 can transition the display screen 1316 from the off state to the on state. In some embodiments, if the display screen 1316 was in the off state, the classification handler component 1342 can instruct the screen controller component 1340 to transition the display screen 1316 from the off state to the on state, in response to such classification information or corresponding signal. In other embodiments, if the display screen 1316 was in the off state, the touch event handler component 1336 can communicate such classification information or corresponding signal to the screen controller component 1340, wherein, in response, the screen controller component 1340 can transition the display screen 1316 from the off state to the on state.

Additionally or alternatively, in some embodiments, while the hover classification engine 1312 rendered a determination that the interaction is an intentional touch interaction, the touch management component 1306 can desire to perform an analysis on sensor data to confirm that the interaction is an intentional touch interaction, confirm the specific type of intentional touch interaction (e.g., single finger touch, multiple finger touch, swipe, or other touch or gesture; and/or specific button or control associated with such intentional touch interaction), determine (e.g., independently determine) a classification of such interaction of the object(s) with the touch sensitive surface 1318, and/or determine an appropriate action to take in response to the detected and classified interaction. The touch management component 1306 can comprise a library component 1346 (LIBRARY COMP) that can include a touch model 1348 that can perform classifications of interactions of objects with the touch sensitive surface 1318 based at least in part on touch surface data, motion data, and/or other types of sensor data or metadata, in accordance with the defined classification criteria. The touch model 1348 can comprise the touch classification engine 1308, which can perform classifications of interactions of objects with the touch sensitive surface 1318, as more fully described herein.

In certain embodiments, the sensor data transfer component 1338 of the touch driver component 1330 can receive (e.g., obtain) the data samples 1324 of the sensor data (e.g., touch surface data) relating to the intentional touch interaction (as determined by the hover classification engine 1312) from the data sampler component 1322, and the sensor data transfer component 1338 can communicate (e.g., forward) the data samples 1324 of the sensor data to the touch model 1348. The touch management component 1306, employing the touch model 1348, also can access motion data 1350 (e.g., samples of motion data) from the buffer component 1314.

The touch management component 1306, employing the touch model 1348, can analyze the data samples 1324 of the touch surface data, the motion data 1350 (and/or other sensor data or metadata). Based at least in part on the results of the analysis of the data samples 1324 of the touch surface data and the motion data 1350 (and/or other sensor data or metadata), the touch management component 1306, employing the touch model 1348, can extract features 1352 (FEATURE EXTRACT 1352) from the data samples 1324 of the touch surface data and can extract features 1354 (FEATURE EXTRACT 1354) from the motion data 1350. The touch classification engine 1308 can analyze the extracted features 1352 relating to the touch surface data and extracted features 1354 relating to the motion data 1350 (and/or can analyze other sensor data or metadata) to identify or determine one or more objects, the respective relation of the one or more objects to the touch sensitive surface 1318, the respective relation of objects to each other (if there is more than one object detected), and/or other features or characteristics of the interaction of the object(s) with the touch sensitive surface 1318. Based at least in part on the results of the analysis of the extracted features 1352 and the extracted features 1354 (and/or the other sensor data or metadata), including the characteristics determined from the extracted features 1352 and the extracted features 1354, the touch classification engine 1308 can determine a classification for the interaction of the object(s) with the touch sensitive surface 1318, wherein the classification can be an intentional touch interaction, unintentional touch interaction, or unintentional hover interaction, as more fully described herein.

In response to the touch classification engine 1308 confirming (confirming the classification by the hover classification engine 1312) or determining that the interaction is an intentional touch interaction, the touch classification engine 1308 can generate classification information, which can comprise a signal (e.g., intentional touch signal, which can indicate a specific type of the intentional touch event), and the touch management component 1306 can communicate the classification information to the classification handler component 1342 and/or the screen controller component 1340. In response to the classification information, the classification handler component 1342 can perform or facilitate performing (e.g., instruct a component(s) of the device 1300 to perform) an operation(s) (e.g., press or manipulate a button or control associated with the display screen 1316 of the device 1300) based at least in part on the intentional touch interaction. Additionally or alternatively, if the display screen 1316 was in the off state, the screen controller component 1340 can transition the display screen 1316 from the off state to the on state. In some embodiments, if the display screen 1316 was in the off state, the classification handler component 1342 can instruct the screen controller component 1340 to transition the display screen 1316 from the off state to the on state, in response to such classification information. In other embodiments, if the display screen 1316 was in the off state, the touch management component 1306 can communicate such classification information to the screen controller component 1340, wherein, in response, the screen controller component 1340 can transition the display screen 1316 from the off state to the on state.

Figure 14:
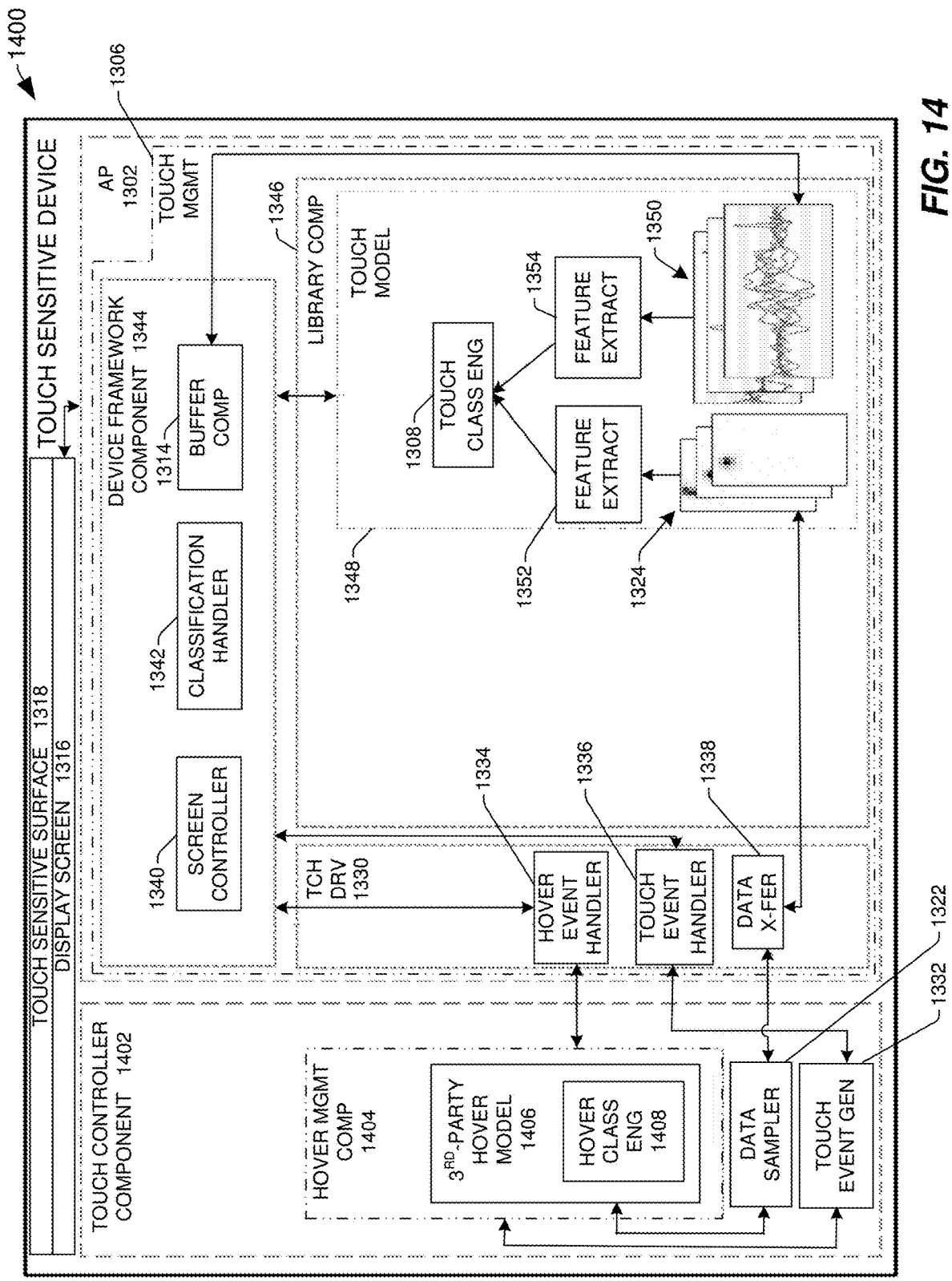
FIG. 14 illustrates a block diagram of an example touch sensitive device that can employ a third-party hover model for classifications and can manage the use of an application processor in connection with classifications of interactions of objects with a touch sensitive surface of the touch sensitive device, in accordance with various aspects and embodiments of the disclosed subject matter.

FIG. 14 illustrates a block diagram of an example touch sensitive device 1400 that can employ a third-party hover model for classifications and can manage the use of an application processor in connection with classifications of interactions of objects with a touch sensitive surface of the touch sensitive device, in accordance with various aspects and embodiments of the disclosed subject matter. The touch sensitive device 1400 can comprise the application processor 1302, touch management component 1306, touch classification engine 1308, buffer component 1314, display screen 1316, touch sensitive surface 1318, data sampler component 1322, touch driver component 1330, touch event generator component 1332, hover event handler component 1334, touch event handler component 1336, sensor data transfer component 1338, screen controller component 1340, classification handler component 1342, device framework component 1344, library component 1346, and touch model 1348. The respective components each can be the same as, and/or can comprise the same or similar respective functionality as, respective components (e.g., respectively named components), such as more fully described herein. For instance, the touch management component 1306, employing the touch model 1348, can determine and extract features 1352 and features 1354, based at least in part on the results of analyzing the data samples 1324 of the touch surface data and the motion data 1350, and the touch classification engine 1308 can determine a classification of an interaction of an object(s) with the touch sensitive surface 1318, based at least in part on the results of analyzing the extracted features 1352 and extracted features 1354, as more fully described herein.

The touch sensitive device 1400 of FIG. 14 can be substantially the same as the touch sensitive device 1300 of FIG. 13, except that the touch sensitive device 1400 can comprise a touch controller component 1402 that can include a hover management component 1404 that can employ a third-party hover model 1406. The third-party hover model 1406 can receive the data samples 1324 of the touch surface data from the data sampler component 1322. The third-party hover model 1406 can employ a classification engine 1408 (e.g., a hover classification engine), wherein the third-party hover model 1406 and/or the classification engine 1408 can analyze the data samples 1324 of the touch surface data, and the classification engine 1408 can determine a classification of an interaction of an object(s) with the touch sensitive surface 1318 based at least in part on the results of analyzing the data samples 1324 of the touch surface data. For instance, the classification engine 1408 can classify an interaction of an object(s) with the touch sensitive surface 1318 as an intentional touch interaction, an unintentional touch interaction, or an unintentional hover interaction. The hover management component 1404 can communicate classification information regarding the classification of the interaction to the touch driver component 1330 (e.g., hover event handler component 1334) of the application processor 1302, in response to classification of the interaction as an unintentional hover interaction, or to the touch event generator component 1332, in response to classification of the interaction as an intentional or unintentional touch interaction. The touch driver component 1330 or the touch event generator component 1332 can process, analyze, respond to, and/or take action with regard to the classification information, as more fully described herein.

Figure 15:
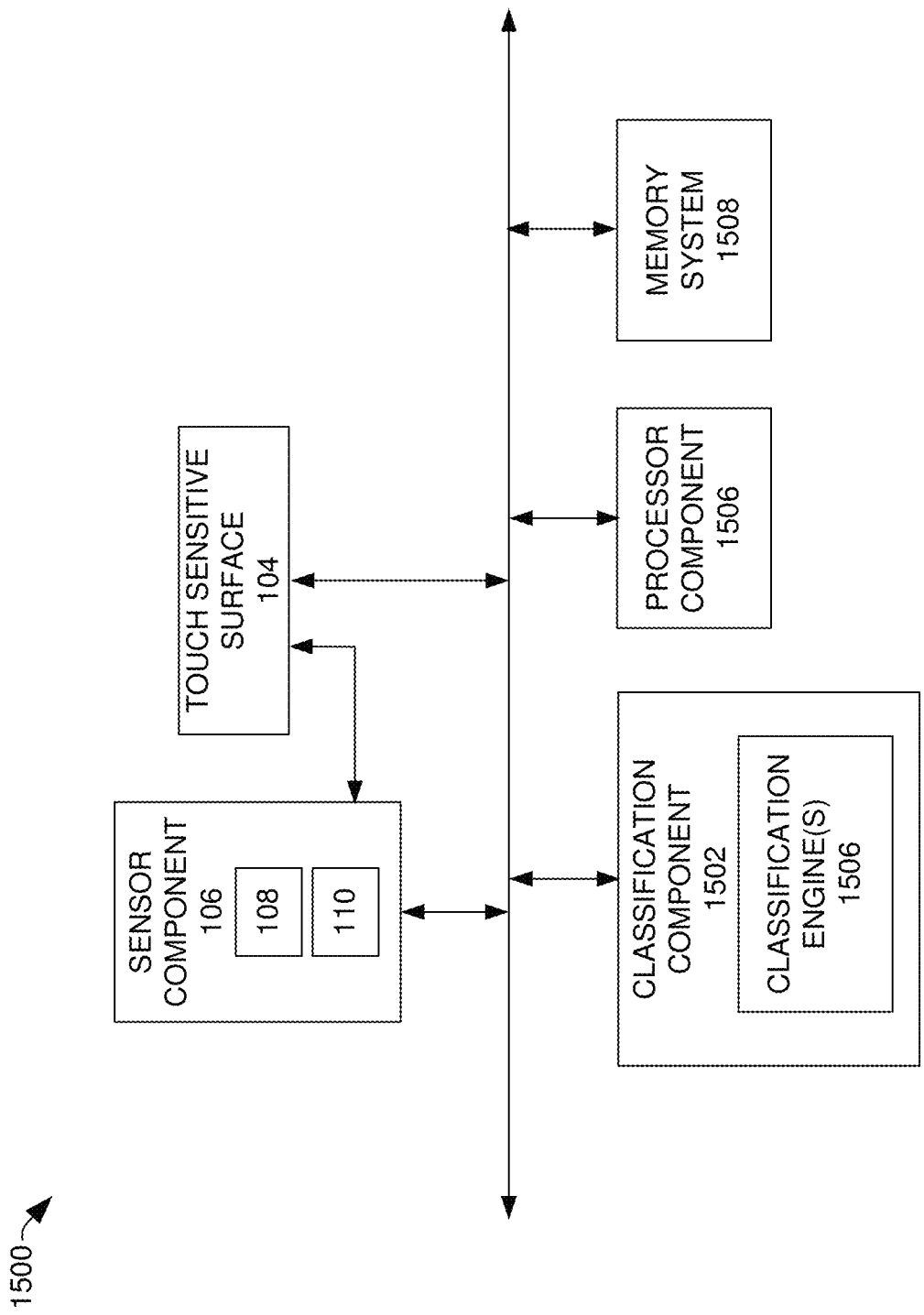
FIG. 15 illustrates a block diagram of a system that can employ a classification component comprising one or more classification engines that can classify interactions by objects with a touch sensitive surface of a touch sensitive device, in accordance with various aspects and embodiments of the disclosed subject matter.

FIG. 15 illustrates a block diagram of a system 1500 that can employ a classification component comprising one or more classification engines that can classify interactions by objects with a touch sensitive surface of a touch sensitive device, in accordance with various aspects and embodiments of the disclosed subject matter. The system 1500 can be part of the touch sensitive device.

The system 1500 can comprise a classification component 1502, which can be or can be part of or associated with a touch management component and/or a hover management component, which can comprise features and can function as more fully described herein. The classification component 1502 also can include one or more classification engines 1504 that can classify touch or hover interactions of objects with the touch sensitive surface 104 of the touch sensitive device, as more fully described herein. The one or more classification engines 1504 can comprise a touch classification engine, a hover classification engine, and/or another type(s) of classification engine.

The classification component 1502 can be associated with the sensor component 106, which can comprise various sensors, including the surface-related sensors 108 and the other sensors 110 (e.g., accelerometer, gyroscope, . . . ), as more fully described herein. The sensor component 106 can monitor the touch sensitive device, and in particular, the touch sensitive surface 104 to detect touch or hover interactions by objects with the touch sensitive surface 104.

The sensors of the sensor component 106 can take any of a variety of forms and can comprise generally any known device for sensing conditions inside or outside of the touch sensitive device. The sensors of the sensor component 106 can, without limitation, comprise or take the form of acoustic sensors, accelerometers, gyroscopes, light sensors, range finders, thermometers, Hall effect sensors, switches (e.g., 2-way, 4-way switch, 6-way switch, 8-way switch), mouse and trackball systems, a joystick system, a voice recognition system, a video-based gesture recognition system or other such systems, radio frequency identification (RFID) and near field communication sensors, bar code sensors, position sensors, and/or other sensors that can be used to detect conditions that can be useful in governing operation or performing functions of image or presence sensing, and can convert this sensed information into a form that can be used by the classification component 1502, and the processor component 1506 in controlling (e.g., governing) operation of the touch sensitive device. The sensors also can comprise biometric sensors that can be adapted to detect characteristics of a user or entity for security and affective imaging purposes.

Alternatively or additionally, sensors of the sensor component 106 can include one or more accelerometers (e.g., linear variable differential transformer (LVDT), potentiometric, variable reluctance, piezoelectric, piezoresistive, capacitive, servo (force balance), MEMS), vibration sensors, ultrasonic sensors, piezoelectric devices, and/or other sensing circuits or systems that can sense vibrations or sounds that can be indicative of contact between an object(s) and the touch sensitive surface 104 of the touch sensitive device.

Alternatively or additionally, sensors of the sensor component 106 can comprise one or more types of audio sensors or other types of sensors, wherein such audio sensors or other types of sensors can include, but are not limited to, for example: piezoelectric bender elements; piezoelectric film; displacement sensors; velocity sensors; gyroscopes; proximity sensors; electric microphones; hydrophones; condenser microphones; electret condenser microphones; dynamic microphones; ribbon microphones; carbon microphones; piezoelectric microphones; fiber optic microphones; laser microphones; liquid microphones; and/or MEMS microphones.

Many touchscreen computing devices can include microphones and accelerometers (e.g., for voice and input sensing). Such microphones and accelerometers can be utilized by the device (e.g., touch sensitive device) to sense conditions associated with the device without having to employ additional sensors or can work in concert with other sensors (e.g., specialized sensors performing particular or specified functions).

The sensors of the sensor component 106 also can comprise pressure sensors that can sense an amount of pressure applied by an object against the touch sensitive surface 104. In some embodiments, the touch sensitive surface 104 can be of a type that can sense not only which portion of the touch sensitive surface 104 has been contacted by an object, but also can sense an amount of pressure applied against the touch sensitive surface 104. One or more of various sensors and sensing technologies can be employed that can sense different levels of pressure against the touch sensitive surface 104.

In still other embodiments, the sensors of the sensor component 106 can include one or more sensors (e.g., a force sensor) that can optionally be incorporated in or on object (e.g., stylus) and that can sense conditions indicative of an amount of force applied between the object and the touch sensitive surface 104. In such embodiments, a force sensor can take the form of, for example and without limitation, a piezoelectric sensor, a stress sensor, a strain sensor, a compression sensor, a deflection sensor, or a resiliently biased sensing system that can sense force (e.g., sense an amount of force) based at least in part on an extent of deflection movement of a contact surface against the force of the resilient member and that can generate a signal (e.g., sensor data, such as force data) that can be indicative of the amount of force applied by or through an indicator against the touch sensitive surface 104. Such a force sensor can be directly connected to, for example, an interface component (not shown in FIG. 15) of the touch sensitive device by way of a wired connection or a wireless connection, such as by an optional wireless communication module (not shown in FIG. 15) that can be capable of communication with a communication system (not shown in FIG. 15) of the touch sensitive device.

In certain embodiments, force sensing can be achieved by providing an object, such as a stylus, that can have a rounded flexible tip such as a rubber or metallic mesh tip that can be arranged in a resilient manner to flatten when pressed against the touch sensitive surface thereby increasing the amount of surface area of the tip of the object in contact with the touch sensitive surface 104. In such embodiments, the size of the area of the tip of the object in contact with the touch sensitive surface 104 can be an effective proxy for the amount of force applied by a user against the touch sensitive surface, and, in this regard, a touch sensitive surface 104 that is capable of sensing area of the tip of the object that is in contact with the touch sensitive surface 104 can be used for this purpose by the disclosed subject matter. The disclosed subject matter (e.g., the touch sensitive surface of the touch sensitive device) can achieve similar results, with proper calibration, using a fingertip of the user or another object.

The processor component 1506 can comprise one or more processors, microprocessors, controllers, microcontrollers, programmable control devices, a preprogrammed or dedicated processing or control system, and/or any other type of processing device or system. The processor component 1506 can be associated with (e.g., connected to) the classification component 1502 and the sensor component 106. In accordance with various embodiments, the application processor and/or touch controller component (not shown in FIG. 15) each can comprise one or more of the processors, microprocessors, controllers, and/or microcontrollers, etc., of the processor component 1506.

The processor component 1506 can operate in conjunction with other components (e.g., classification component 1502, touch sensing system, touch sensitive surface, sensor component 106, . . . ) of the touch sensitive device to facilitate performing the various functions of the touch sensitive device. The processor component 1506, employing the one or more processors, microprocessors, controllers, and/or microcontrollers, etc., can process data, such as information relating to user data, applications, messages, message or data formatting, data conversions, touch surface data, motion data, impact or force data, vibro-acoustic data, orientation data, touch data, other types of data, classifications of touch or hover interactions, touch or hover states, events or responsive actions, resources, and/or other information, to facilitate operation of system 1500 and/or the touch sensitive device, as more fully disclosed herein, and control data flow between the system 1500 and other components or devices of or associated with the system 1500 and/or touch sensitive device.

The system 1500 also can comprise a memory system 1508. The memory system 1508 can store and provide programming and other forms of instructions to the processor component 1506 and/or other components (e.g., classification component 1502, sensor component 106, . . . ). The memory system 1508 can include nonvolatile memory, volatile memory, and/or other types of memory or computer readable media that can be permanently installed or separably mounted (e.g., connected or interfaced) to the touch sensitive device. Additionally, the touch sensitive device also can access a memory system 1508 that can be separate from the touch sensitive device by way of an optional communication system (not shown in FIG. 15). In certain embodiments, the memory system 1508 can comprise a buffer component (not shown in FIG. 15), as more fully described herein.

In some embodiments, the memory system 1508 can comprise one or more data stores that can store data structures (e.g., user data, metadata), code structure(s) (e.g., modules, objects, hashes, classes, procedures) or instructions, information relating to user data, applications, messages, message or data formatting, data conversions, touch surface data, motion data, impact or force data, vibro-acoustic data, orientation data, touch data, other types of data, classifications of touch or hover interactions, touch or hover states, events or responsive actions, resources, and/or other information, to facilitate controlling operations associated with the touch sensitive device. In some implementations, the processor component 1506 can be functionally coupled (e.g., through a memory bus) to the memory system 1508, including the one or more data stores, in order to store and retrieve information desired to operate and/or confer functionality, at least in part, to the classification component 1502, the sensor component 106, touch sensitive surface 104, and/or other components (e.g., touch sensing system, display screen, . . . ), and/or substantially any other operational aspects of the system 1500.

With further regard to the classification component 1502, the classification component 1502 can analyze touch surface data associated with the touch sensitive surface 104, other sensor data (e.g., motion data, and/or vibro-acoustic data, . . . ), and/or metadata, and can generate analysis results based at least in part on the analysis of such data. In some embodiments, as part of the analysis of the touch surface data (e.g., touch screen data), the other sensor data, and/or the metadata (e.g., raw sensor data and/or metadata), the classification component 1502 can extract characteristic information (e.g., information regarding or indicating characteristics, features, and/or structures relating to the touch or hover interaction(s)) from the touch surface data, the other sensor data, and/or the metadata. For instance, the classification component 1502 can utilize desired algorithms (e.g., learning algorithms relating to identifying characteristics or features relating to touch events with respect to the touch display screen) to facilitate identifying and extracting the characteristic information from the touch surface data, the other sensor data, and/or the metadata. The classification component 1502 can utilize the characteristic information to discriminate or distinguish between different types of contact or hovering (e.g., unintentional touch or hover interaction, or intentional touch interactions) of an object(s) (e.g., a finger(s), an ear, a cheek, a palm, or other body part of the user, a stylus, or another type of object) with the touch sensitive surface.

In certain embodiments, as part of the analysis of the sensor data, the classification component 1502 (e.g., classification engine(s) 1504 of the classification component 1502) can utilize pattern analysis, including pattern recognition analysis, techniques, tools, and algorithms, to identify or determine patterns relating to the touch or hover interaction(s) (e.g., patterns of contact or association (e.g., hovering) relating to the touch or hover interaction(s)) for an object(s) with respect to the touch sensitive surface 104, in accordance with the defined classification criteria, as more fully described herein. For instance, as part of the pattern analysis, the classification component 1502 can compare a pattern(s) relating to a touch or hover interaction(s) to known patterns for touch or hover interactions, such as known patterns for various types of intentional touch interactions and known patterns for various types of unintentional touch interactions or unintentional hover interactions, to facilitate determining, based at least in part on the results of such pattern analysis (e.g., comparing of patterns), whether a touch or hover interaction(s) is an intentional touch interaction, an unintentional touch event, an unintentional hover interaction, and/or the particular type of touch or hover interaction(s) (e.g., intentional finger touch, unintentional finger touch or hover, unintentional ear touch or hover, or unintentional palm touch or hover, . . . ).

In some embodiments, in addition to the manual training of the classification component 1502 (e.g., the classification engine(s) 1504 of the classification component 1502), during operation of the classification component 1502, the classification component 1502 can utilize the learning algorithms to continue to train (e.g., automatically or dynamically train) the one or more classification engines 1504 of the classification component 1502, including mining (e.g., automatically mining) desirable (e.g., useful) characteristics from the raw sensor data streams obtained from the various sensors and from analyzing the raw sensor data streams, as more fully described herein.

In some embodiments, the classification component 1502 can facilitate distinguishing between an intentional touch interaction and an unintentional touch interaction of an object(s) with the touch sensitive surface 104 based at least in part on an amount (e.g., level) of impact or force of the object on the touch sensitive surface 104, as determined by the classification component 1502 from an analysis of accelerometer data, touch surface data, and/or other sensor data. For instance, certain levels of impact or force of an object on the touch sensitive surface 104 can be indicative of an intentional touch interaction, whereas other levels of impact or force of an object on the touch sensitive surface 104 can be indicative of an unintentional touch interaction.

In certain embodiments, the classification component 1502 can compare the amount of impact or force of a touch event obtained from an analysis of accelerometer data (or other sensor data) to respective statistical distributions of impact or force levels that are respectively indicative of intentional touch interactions and unintentional touch interactions to facilitate determining whether the touch interaction is intentional or unintentional. For example, the classification component 1502 can compare the amount of impact or force of a touch interaction to a first statistical distribution of impact or force levels that is indicative of intentional touch interactions and a second statistical distribution of impact or force levels that is different from the first statistical distribution and is indicative of unintentional touch interactions. The classification component 1502 can determine whether the touch interaction is intentional or unintentional based at least in part on the results obtained from comparing the amount of impact or force of the touch interaction to the first and second statistical distributions of impact or force levels.

Based at least in part on the results of the analysis of the sensor data (e.g., touch surface data, accelerometer data, and/or other sensor data) and/or metadata, the classification component 1502 can determine whether there has been a touch or hover interaction detected, and, if a touch or hover interaction is detected, can determine whether the touch or hover interaction is an intentional touch interaction, an unintentional touch interaction, or an unintentional hover interaction, in accordance with the defined classification criteria. As part of determining whether an interaction is an intentional touch interaction, an unintentional touch interaction, or an unintentional hover interaction, the classification component 1502 also can determine the type of touching (e.g., contact) or hovering associated with the interaction, for example, determining that a particular touching or hovering is a finger of the user, multiple fingers of the user, an ear of the user, a cheek of the user, a palm of the user, a stylus, or other type of object. For example, based at least in part on the particular characteristics determined or identified from the analysis of the sensor data and/or the results obtained from a pattern analysis on the sensor data, the classification component 1502 (e.g., employing the classification engine(s) 1504) can determine whether the interaction is an intentional touch interaction, an unintentional touch interaction, or an unintentional hover interaction, and can determine or identify whether the particular touching or hovering of the interaction is a finger of the user, multiple fingers of the user, an ear of the user, a cheek of the user, a palm of the user, a stylus, or other type of object. For instance, the classification component 1502 can distinguish between an intentional finger touch on a button or control on the touch sensitive surface 104 (e.g., to press the button or control) and an unintentional touching or hovering of an ear or cheek of the user on or in proximity to the touch sensitive surface 104 due to the user putting the touch sensitive device close to the user's head during a phone call or an unintentional touching or hovering of a palm or finger of the user on or in proximity to the touch sensitive surface 104 due to the user gripping the device in the user's hand and inadvertently touching or hovering near the touch sensitive surface 104.

There can be instances where a user is holding the touch sensitive device in the user's hand (e.g., gripping the device in the user's hand), wherein more than one part of the user's hand (e.g., one or more fingers and/or palm) is in contact with respective portions of the touch sensitive surface 104 at the same time or substantially close to the same time, wherein the user did not intend to touch the touch sensitive surface 104 to activate or use the touch sensitive surface 104. There can be other instances where the user is holding the device in the user's hand (e.g., gripping the device in the user's hand), wherein one or more parts of the user's hand (e.g., one or more fingers and/or palm) is in contact with respective portions of the touch sensitive surface 104, and one or more parts of the user's other hand also is in contact with other respective portions of the touch sensitive surface 104, and wherein the user intended for certain touches (e.g., one or more finger touches of one hand) on the touch sensitive surface to activate or use the touch sensitive surface 104, but did not intend to for certain other touches (e.g., one or more finger touches and/or palm touch of the other hand) to activate or use the touch sensitive surface 104. For example, the user can be gripping the device in the user's left hand with part of the user's fingers or palm on the left hand touching (e.g., inadvertently touching) the touch sensitive surface 104, while at the same time the user intentionally pushes a button on the touch sensitive surface 104 with a finger on the user's right hand. There also can be other instances where the user is intentionally touching the touch sensitive surface 104 using multiple fingers (e.g., multiple finger touches or gestures) to utilize certain functions (e.g., multiple-gesture functions) of the device, with or without the user inadvertently touching the touch sensitive surface 104 with another finger(s) or palm of the user.

In some embodiments, the classification component 1502, employing the classification engine(s) 1504, can detect, identify, determine, and/or classify multiple touch interactions of objects with respect to (e.g., on or in proximity to) the touch sensitive surface 104, wherein the multiple touch interactions occur simultaneously or at least substantially simultaneously, and/or the respective time periods of the respective touch interactions can at least partially overlap each other. For instance, based at least in part on the results of sensor data, the classification component 1502 can identify two (or more) touch interactions of objects with respect to the touch sensitive surface 104, and, depending in part on the analysis results, can classify both (or all) touch events as intentional touch interactions, both (or all) touch events as unintentional touch or hover interactions, or one touch interaction as intentional and another touch or hover interaction as unintentional.

For example, a user can be holding (e.g., gripping) the touch sensitive device in the user's hand, wherein multiple parts of the user's hand (e.g., one or more fingers and/or palm) are inadvertently in contact with the touch sensitive surface 104 at the same or substantially the same time. The sensors (e.g., surface-related sensors 108 and/or other sensors 110) of the sensor component 106 can detect such contact by the user's hand and can generate sensor data relating (e.g., corresponding) thereto. The classification component 1502 can analyze the sensor data. Based at least in part on the results of the analysis of the sensor data, the classification component 1502 can determine that there are multiple touch interactions relating to multiple parts (e.g., finger(s) and/or palm) of the user's hand being in contact with the touch sensitive surface 104 at the same time or substantially the same time, and further can determine that each of the touch interactions of those multiple touch interactions are unintentional touch interactions, in accordance with the defined classification criteria.

As another example, a user can be holding the touch sensitive device in the user's left hand, wherein a part of the user's left hand (e.g., a thumb or a palm) is inadvertently in contact with the touch sensitive surface 104, while at the same or substantially the same time, the user is using a finger on the user's right hand to press a button on the touch sensitive surface 104. The sensors (e.g., 108 and/or 110) can detect the respective touch events (e.g., thumb or palm of left hand, and finger of right hand) by the user and can generate sensor data relating (e.g., corresponding) thereto. The classification component 1502 can analyze the sensor data. Based at least in part on the results of the analysis of the sensor data, the classification component 1502 can determine that there are multiple touch interactions (e.g., thumb or palm of left hand, and finger of right hand) by the user on the touch sensitive surface 104 that are occurring at the same time or substantially the same time, and further can determine that the touch interactions associated with the thumb or palm of the left hand is an unintentional touch interaction and the other touch interaction associated with the finger of the right hand is an intentional touch interaction, in accordance with the defined classification criteria.

As still another example, a user can be holding the device in the user's left hand without any part of the left hand being in contact with the touch sensitive surface 104, and can be using two fingers of the right hand at the same time or substantially the same time to touch the touch sensitive surface 104 to perform a multiple-gesture to perform a multiple-gesture function of the touch sensitive device. The sensors (e.g., 108 and/or 110) can detect such multiple touch interactions by the user's two fingers of the right hand and can generate sensor data relating (e.g., corresponding) thereto. The classification component 1502 can analyze such sensor data. Based at least in part on the results of the analysis of the sensor data, the classification component 1502 can determine that there are multiple touch interactions relating to two fingers of the user's hand being in contact with the touch sensitive surface 104 at the same time or substantially the same time, and further can determine that both of the touch interactions are intentional touch events, in accordance with the defined classification criteria.

As disclosed, the classification component 1502 can comprise one or more classification engines 1504 that can analyze sensor data and determine classifications of touch interactions, such as described herein. For example, the classification engine 1504 can comprise a touch classification engine and a hover classification engine, as more fully described herein. As another example, the classification component 1502 can comprise a first classification engine that can analyze one or more types of sensor data (e.g., touch surface data, accelerometer data, and/or other sensor data) relating to a touch or hover interaction and determine a first classification of the touch or hover interaction based at least in part on the results of analyzing such sensor data; a second classification engine that can analyze one or more other types of sensor data (e.g., gyroscope data, vibro-acoustic data, and/or other sensor data) relating to a touch or hover interaction and determine a second classification of the touch or hover interaction (or a classification of another touch or hover interaction) based at least in part on the results of analyzing such sensor data; and/or a third classification engine that can analyze one or more other types of sensor data (e.g., ultrasonic data and/or other sensor data) relating to the touch or hover interaction (or another touch or hover interaction) and determine a third classification of the touch or hover interaction (or a classification of the other touch or hover interaction) based at least in part on the results of analyzing such sensor data. One of the classification engines 1504 of the classification component 1502 can receive the respective classifications of a touch or hover interaction from respective classification engines, can analyze the respective classifications, and can determine the classification of the touch or hover interaction based at least in part on the result of the respective classifications, in accordance with the defined classification criteria. The use of multiple classification engines to classify touch or hover interactions can enhance (e.g., improve) the accuracy of classifying touch or hover interactions of objects in contact or association with the touch sensitive surface 104. In certain embodiments, the respective classification engines 1504 can operate in parallel (e.g., simultaneously) to process (e.g., analyze) respective types of sensor data to determine respective classifications of a touch or hover interaction.

It is to be appreciated and understood that, in accordance with various embodiments, the disclosed subject matter can deploy classification engines, as desired, to facilitate improving the accuracy of classifications of touch or hover interactions of objects with the touch sensitive surface 104 and/or to facilitate improving the speed of performing the classifications of touch or hover interactions of objects with the touch sensitive surface 104. In some embodiments, more than one classification engine 1504 can be utilized to analyze the same type of data (e.g., accelerometer data) from a same sensor (e.g., accelerometer). In other embodiments, a first number (e.g., five) types of sensor data from a first number of sensors can be processed by a second number (e.g., three) of classification engines 1504 to facilitate classifying touch or hover interactions of objects with the touch sensitive surface 104, wherein respective sensor data from the respective sensors can be distributed among respective classification engines 1504, as desired, for processing.

Further aspects relating to classifying touch or hover interactions of an object(s) with the touch sensitive surface 104 of the touch sensitive device, for example, based at least in part on frame information and frame images generated or derived from the results of analyzing sensor data from the sensors of the sensor component 106, will now be described.

In general, when the classification engine 1504 characterizes an object in relation to the touch sensitive surface 104, the classification engine 1504 can receive a signal having frame information in the form of x,y coordinate values with each of the x,y coordinate values representing which portions of the touch sensitive surface 104 are in contact with or sufficient proximity to the object. The touch sensitive surface (e.g., sensors of or associated with the touch sensitive surface 104) can obtain such x,y coordinate values by sampling the touch sensitive surface 104 at a specified (e.g., predetermined) rate, such as, for example, 100 times per second, 60 times per second, 30 times per second, or at another desired sampling or sensing rate. In some embodiments, the positions of the touch sensitive surface 104, if any, that are in contact with, or in proximity to, the object can be sensed (e.g., by respective sensors associated with the respective positions) at a desired sampling or sensing rate, and frame data can be generated (e.g., by the classification component 1502 (e.g., a hover management component or touch management component comprising the classification component 1502), respective sensors, and/or another component), wherein the frame data can represent an x-coordinate value and a y-coordinate map indicative of the positions of contact or hovering between the object and the touch sensitive surface 104. In some embodiments, the frame data also can comprise respective intensity values that can be determined (e.g., by the classification component 1502, respective sensors, and/or another component) for and assigned to respective x-y coordinate values.

The object can comprise any object that can come in contact with or be in proximity to the touch sensitive surface 104 and that can be detected by the touch sensitive surface 104 (e.g., sensors of or associated with the touch sensitive surface). Although sometimes stated herein in singular form as "object," it will be appreciated that for the purposes of this disclosure an "object" can comprise any combination of items that can be brought into contact with or in proximity to the touch sensitive surface 104 during a frame, wherein the items of the object can include, but are not limited to, one or more fingers of a user, combinations of different parts of the fingers, a palm of the user, indicators including styluses or pens (e.g., utilized by the user), different parts of a body of the user, such as a head, ear, cheek bone, mouth, face, skin, beard or hair, hats, headgear, and/or head wrappings, or combinations thereof.

In certain embodiments, an object can take the form of an electronic pen, stylus, or other tool with or without electric circuits therein, which may or may not belong to the touch sensitive device, except when an object is a body part of the user, such as the user's finger, palm, etc. An object can be made of various materials, such as, for example, metal, wood, plastic, rubber, and/or glass. An object also can comprise body parts of a user, such as fingers, hands, arms, head, ear, and/or neck of the user. When an object is the user's finger, each of the specific parts of the finger can be or become the object, in accordance with the disclosed subject matter, because fingers usually can be constituted by various parts such as finger tips, finger nails, knuckles, and finger joints.

The classification component 1502 can analyze and use the x,y coordinate data (e.g., frame data), which can represent respective portions of the touch sensitive surface 104 in contact with or proximity to an object and/or any intensity data from the frame data. Based at least in part on the results of analyzing the frame data (e.g., the x,y coordinate data and/or the intensity data), the classification component 1502, employing the classification engine(s) 1504, can classify the nature of the contact(s) or hovering sensed by the touch sensitive surface 104 (e.g., the classification component

1502 can determine the touch event classification and contact state with respect to the object and the touch sensitive surface 104).

In some embodiments, the classification engine 1504 can determine the classification of a touch interaction of an object with the touch sensitive surface 104 based at least in part on touch intensity of the contact (e.g., touch) of the object with the touch sensitive surface 104. The classification component 1502 (or another component of the touch sensitive device) can determine (e.g., compute) touch intensity of a contact of an object with the touch sensitive surface 104 in a variety of manners.

For example, the classification component 1502 (or another component of the touch sensitive device) can determine a touch intensity of a contact of an object with the touch sensitive surface 104 based at least in part on one or more defined threshold values relating to touch intensity. For instance, if the classification component 1502 determines that the touch intensity of the contact is above a defined threshold value, the classification component 1502 can determine that the touch (e.g., contact) has a high intensity. If, however, the classification component 1502 determines that the touch intensity of the contact is below the defined threshold value, the classification component 1502 can determine that the touch (e.g., contact) has a low intensity.

In some embodiments, the classification component 1502 can employ more than one defined threshold value, wherein, for example, the classification component 1502 can determine whether the touch intensity of a touching of an object with the touch sensitive surface 104 is above a first defined threshold value relating to a high touch intensity, is below a second defined threshold value relating to a low touch intensity, or is between (or at one of) the first defined threshold value and the second defined threshold value. The classification component 1502 can determine that a touch intensity above the first defined threshold value is a high intensity, a touch intensity below the second defined threshold value is a low intensity, and a touch intensity between (or at one of) the first defined threshold value and the second defined threshold value is a medium intensity.

Alternatively, the classification component 1502 can determine a touch intensity of a contact of an object with the touch sensitive surface 104 as a continuous numerical value, for example, between 0.0 and 100.0. In such case, the classification component 1502 can determine the number of types of the touch intensities of contact according to a number of criteria (e.g., defined classification criteria relating to touch intensity) to distinguish the magnitude of the amplitude intensity of a contact of an object with the touch sensitive surface 104.

Since the touch intensity potentially can change significantly (e.g., radically) depending on the object that has applied the touch to the touch sensitive surface 104, it can be advantageous for the classification component 1502 to determine, and the classification component 1502 can determine, an object type criteria in order to facilitate distinguishing the magnitude of the amplitude of the digital sound/vibration signal with respect to the individual types of objects and facilitate determining a classification of a touch interaction of an object with respect to the touch sensitive surface 104. The classification component 1502 can make such determination of the object type criteria in any of a variety of ways. For example, such discrimination can be performed (e.g., by the classification component 1502, employing the classification engine 1504) at least in part by using vibro-acoustic data. For instance, the classification engine 1504 can classify touch interactions with respect to a touch sensitive surface 104 configured to generate a touch interaction when an object (e.g., finger) touches the touch sensitive surface 104, wherein the touch interaction entails a mechanical vibration generated upon contact with the touch sensitive surface 104, a touch detector configured to detect the onset of a touch, and a touch interaction classifier (e.g., of the classification engine 1504) configured to classify the touch interaction to identify the object used for the touch interaction. The classification engine 1504 can employ such techniques to facilitate determining the object type criteria for an object and facilitate determining a classification of a touch interaction of an object with the touch sensitive surface 104.

Additionally, such a determination of the object type criteria also can be performed (e.g., by the classification component 1502) at least in part using certain techniques relating to vibro-acoustic data. For example, the classification component 1502 can employ certain techniques for interaction between a user and a touch sensitive surface 104 of a device, wherein, employing these techniques, a touch interaction trigger (e.g., touch event trigger) can be received that can indicate an occurrence of a physical touch interaction on the touch sensitive surface 104. Touch data produced by sensors of the sensor component 106 in connection with the touch interaction can be accessed and vibro-acoustic data for a vibro-acoustic signal produced by the physical touch interaction can be accessed for a time window that begins at a time that is prior to receipt of the touch interaction trigger, and a touch type for the touch interaction can be determined by the classification engine 1504 based at least in part on the touch data and the vibro-acoustic data. The classification engine 1504 can employ such techniques to facilitate determining the object type criteria for an object and facilitate determining a classification of a touch interaction for an object with the touch sensitive surface 104.

In some embodiments, such a determination of the object type criteria can be performed (e.g., by the classification engine 1504) at least in part using techniques involving sound/vibration signals associated with the touch sensitive device. For instance, the classification component 1502 can employ techniques for sensing touch inputs to digital equipment in which a sound/vibration signal that is generated by a touch of the touch sensitive surface 104 can be sensed, and the sensed sound/vibration signal can be digitally processed. Here, the classification component 1502 can determine the type of touch means as well as a touch intensity of such touch based at least in part on features derived from time and frequency domain representations of the processed sound/vibration signal. The classification component 1502 (e.g., employing the classification engine 1504) can utilize such techniques to facilitate determining the object type criteria for an object and facilitate determining a classification of a touch interaction of an object with the touch sensitive surface 104.

In certain embodiments, the classification component 1502 can determine touch intensity of contact of an object with the touch sensitive surface 104 based at least in part on vibro-acoustic differences between contact made by the object with the touch sensitive surface 104 when different parts of an input tool contact the touch sensitive surface 104. For example, the touch sensitive device can employ an input tool for interacting with a touch sensitive surface 104 (e.g., touch sensitive surface associated with the display screen), wherein the input tool can comprise: a body (e.g., a stylus body) that can have one or more vibro-acoustically distinct regions, wherein each vibro-acoustically region can produce a discrete vibro-acoustic signal when it touches the touch sensitive surface 104, and the vibro-acoustic signal can be used to detect what region of the input tool was used. Such vibro-acoustic signals also can be used (e.g., by the classification engine 1504) to discriminate between different types of finger contacts, such as contact of the knuckle, fingernail, and/or fingertip, with the touch sensitive surface 104.

Finger touch type determinations (e.g., by the classification engine 1504) with the touch sensitive surface 104 can, for example, result in execution (e.g., by a touch management component or hover management component, comprising the classification component 1502, and/or the processor component 1506) of a first action in response to a first finger touch type and/or a second action in response to a second finger touch type. For example, the classification engine 1504 can classify one particular finger touch interaction of the touch sensitive surface 104 as an intentional finger touch interaction (e.g., finger touch event). In response, the touch management component or hover management component, comprising the classification component 1502, and/or the processor component 1506 can control operation of the touch sensitive device to allow an operation relating to the finger touch to be processed, as more fully described herein. In another instance, the classification engine 1504 can classify another finger touch interaction of the touch sensitive surface 104 as an unintentional finger touch interaction. In response, the touch management component or hover management component, comprising the classification component 1502, and/or the processor component 1506 can control operation of the touch sensitive device to reject the unintentional finger touch and prevent processing of an operation relating to the unintentional finger touch, as more fully described herein.

The classification component 1502 also can perform touch intensity analysis with regard to an object in contact with or in proximity to the touch sensitive surface 104 based at least in part on capacitive data obtained from one or more sensors of or associated with the touch sensitive surface 104. For example, the classification component 1502 can utilize techniques for using capacitive images for classification of touch or hover interactions with the touch sensitive surface 104. The classification component 1502 can generate or access a capacitive image that can comprise capacitive image data that can correspond to respective capacitances at respective locations on the touch sensitive surface 104, wherein the respective capacitances can vary in response to a physical touch by an object on or physical proximity of the object to the touch sensitive surface 104. The classification component 1502, employing the classification engine 1504, can analyze or otherwise process the capacitive image data and can determine a touch or hover type (e.g., a touch or hover interaction classification) for the physical touch of the object with or proximity of the object to the touch sensitive surface 104 based at least in part on the analyzed or processed capacitive image data. In certain embodiments, the classification component 1502 can maintain heuristic data regarding such objects.

In some embodiments, sensors (e.g., surface-related sensors 108) of the sensor component 106 and/or the classification component 1502 can generate or determine touch or hover intensity data relating to the intensity of the touching or hovering interaction of an object with the touch sensitive surface 104 based at least in part the touch or hovering intensity between the object and the touch sensitive surface 104, which in turn can be determined, for example, based at least in part on the capacitance, resistance, or shear force measurements obtained (e.g. by the sensors of the sensor component 106) in connection with the contact of the object with or proximity of the object to the touch sensitive surface 104. Additionally or alternatively, sensors (e.g., surface-related sensors 108) of the sensor component 106 and/or the classification component 1502 can generate or determine touch intensity data based at least in part sensed variations in an amount of force applied against the touch sensitive surface 104, which can be sensed (e.g., by the sensors) in the various ways described herein and/or any other techniques for sensing force applied against a surface.

In some implementations, the classification component 1502 can transmit object characterization information (e.g., to the processor component 1506, or another component of the device), wherein the object characterization information can relate to characteristics of the object, including the relationship (e.g., contact or hovering) between the object and the touch sensitive surface 104. Furthermore, the classification component 1502 can transmit touch intensity data that can characterize an amount of force or other touch or hover intensity information that can characterize the intensity of a touch applied by or through an object during contact with the touch sensitive surface 104 or the intensity of a hover interaction of an object with the touch sensitive surface 104. In some embodiments, this can be done by providing touch or hover intensity data that can correspond to each element of touch or hover intensity data or by sampling, mathematically processing, or otherwise processing force or other measurement of intensity to characterize the amount of force or other measurement of intensity applied during the period in which frame data is obtained.

In certain embodiments, the analysis of frame data performed on a frame image, or portion thereof (e.g., in each subdivision of a frame image, as part of a subdivision analysis of the frame data), by the classification component 1502 in connection with determining a touch or hover classification for an object with the touch sensitive surface 104 can take a variety of forms including:

average (e.g., determining an average amount of force or other touch or hover intensity applied by an object to the touch sensitive surface 104 during the time period, based at least in part on the results of analyzing the frame data);

standard deviation (e.g., determining a standard deviation associated with the amounts of force or other touch or hover intensity applied by an object to the touch sensitive surface 104 during the time period, based at least in part on the results of analyzing the frame data);

standard deviation (normalized by overall amplitude) (e.g., determining a standard deviation that can be normalized by overall amplitude, based at least in part on the results of analyzing the frame data);

variance (e.g., determining a variance of the amounts of force or other touch or hover intensity applied by an object to the touch sensitive surface 104 during the time period, based at least in part on the results of analyzing the frame data);

skewness kurtosis sum (e.g., determining a skewness kurtosis sum relating to an amount of force or touch or hover intensity applied by an object to the touch sensitive surface 104 during the time period, based at least in part on the results of analyzing the frame data);

absolute sum (e.g., determining an absolute sum of an amount of force or touch or hover intensity applied by an object to the touch sensitive surface 104 during the time period, based at least in part on the results of analyzing the frame data);

root mean square (RMS) (e.g., determining an RMS value relating to an amount of force or touch or hover intensity applied by an object to the touch sensitive surface 104 during the time period, based at least in part on the results of analyzing the frame data);

crest factor (e.g., determining a crest factor with respect to an amount of force or touch or hover intensity applied by an object to the touch sensitive surface 104 during the time period, based at least in part on the results of analyzing the frame data);

dispersion entropy power sum (e.g., determining a dispersion entropy power sum with respect to an amount of force or touch or hover intensity applied by an object to the touch sensitive surface 104 during the time period, based at least in part on the results of analyzing the frame data);

centroid (center of mass) (e.g., determining a centroid with respect to an amount of force or touch or hover intensity applied by an object to the touch sensitive surface 104 during the time period, based at least in part on the results of analyzing the frame data);

coefficient of variation zero-crossings (e.g., determining a coefficient of variation zero-crossings with respect to an amount of force or touch or hover intensity applied by an object to the touch sensitive surface 104 during the time period, based at least in part on the results of analyzing the frame data); and/or template match scores for a set of known exemplar signals (e.g., determining template match scores for a set of known exemplar signals in connection with an amount of force or touch or hover intensity applied by an object to the touch sensitive surface 104 during the time period, based at least in part on the results of analyzing the frame data) using the following methods:

convolution, inverse filter matching technique, sum-squared difference (SSD), and/or elastic matching.

In some embodiments, the touch sensing system, alone or in combination with other components (e.g., sensors of the sensor component 106, classification component 1502, processor component 1506, . . . ) of the touch sensitive device of or associated with the system 1500, can generate additional data that can be of use in determining classifications of touch or hover interactions of objects with the touch sensitive surface 104, wherein such additional data can include but is not limited to:

a location of touch or hover interaction of the object with the touch sensitive surface 104 (two-dimensional (2D), or three-dimensional (3D) in the case of curved glass or other non-planar geometry), a size of touch or hover interaction of the object with the touch sensitive surface 104 (some touch or hover technologies of the disclosed subject matter can provide an ellipse of the touch or hover interaction with major and minor axes), a rotation of the touch or hover interaction of the object with the touch sensitive surface 104, a shape of touch or hover of the touch or hover interaction of the object with the touch sensitive surface 104 (some touch or hover technologies of the disclosed subject matter can provide the actual shape of the touch or hover interaction, and not just a circle or ellipse), a surface area (e.g., in squared mm or pixels) of the touch or hover interaction of the object with the touch sensitive surface 104, a pressure of the touch or hover of the object with the touch sensitive surface 104 (which can be available on and determined using the touch sensing system of the touch sensitive device), a shear of touch (which can be available on and determined using the touch sensing system) ("shear stress" (which also can be called "tangential force") can arise from a force vector perpendicular to the surface normal of a touchscreen (e.g., parallel to the touch sensitive surface 104); this can be similar to normal stress—what is commonly called pressure—which can arise from a force vector parallel to the surface normal."), a number of touch or hover interactions of the object with the touch sensitive surface 104, a capacitance of a touch or hover interaction of the object with the touch sensitive surface 104 (if using a capacitive touch sensitive surface), a swept frequency capacitance of touch or hover interaction of the object with the touch sensitive surface 104 (if using a swept frequency capacitive touch sensitive surface), and/or a swept frequency impedance of touch or hover interaction of the object with the touch sensitive surface 104 (if using a swept frequency capacitive touch sensitive surface).

In some embodiments, the classification component 1502 can determine or define a pattern of bounding areas in the frame data (e.g., as part of a subdivision analysis) by transforming the bounding areas into a frequency domain representation (e.g., using a Fast Fourier Transform (FFT) or a similar function). For example, with respect to frame data relating to contact or association (e.g., hovering) of an object with the touch sensitive surface 104, the classification component 1502 and/or another component (e.g., processor component 1506) can extract features, such as the following features, from the frequency domain representation of the bounding areas:

spectral centroid, spectral density, spherical harmonics, total average spectral energy, and/or log spectral band ratios.

To facilitate determining classification of touch events or contact states with respect to a touch or hover interaction of an object with the touch sensitive surface 104, the classification component 1502 can use any number of approaches, including, but not limited to, basic heuristics, decision trees, a Support Vector Machine, Random Forest, naïve Bayes, elastic matching, dynamic time warping, template matching, k-means clustering, K-nearest neighbors algorithm, neural networks, Multilayer perceptron, logistic regression (e.g., multinomial logistic regression), gaussian mixture models, and/or AdaBoost.

In some embodiments, the classification component 1502 can combine results obtained from performing several different classifying techniques through, for example, a voting scheme or through analysis of a pattern from which it can be determined what portions of the touch sensitive surface 104 were in contact with, or in proximity to, an object during a time period.

Once the classification engine 1504 has determined a classification for an object in contact with or in sufficient proximity to the touch sensitive surface 104 of the touch sensitive device, an event (e.g., touch event or hover event) may be determined (e.g., by the touch management component or hover management component) based at least in part on the classification (e.g., touch or hover event classification). In order to reduce the chance or risk of false positive mode changes (e.g., due to adjusting hand grip on the touch sensitive device, due to inconsistent intentional finger touching on the touch sensitive surface, . . . ), a number of strategies can be followed, with two exemplary strategies being described herein.

In such embodiments, the classification component 1502 (or touch management component or hover management component comprising the classification component 1502) can use frame data from more than one time period or instance to assist in the classification of a touch or hover event. For instance, a touch or hover event classification (e.g., a frame contact or hover classification) can be compared with previous touch or hover event classification determinations to determine a current touch or hover event classification and/or contact state for an object with respect to the touch sensitive surface 104. The classification component 1502 (or touch management component or hover management component comprising the classification component 1502) can compare a touch or hover event classification with previous touch or hover event classifications to determine a current touch or hover event classification and/or current contact state of the object with respect to the touch sensitive surface 104.

For example, the touch sensitive surface 104 (e.g., sensors of or associated with the touch sensitive surface 104) can capture the touch or hover image and/or frame data at a particular frame rate (e.g., 30 frames per second or another desired frame rate). The classification component 1502 (or touch management component or hover management component comprising the classification component 1502) can individually analyze the respective frame data captured during these respective frames and determine respective classifications (e.g., intentional finger touch, unintentional ear touch, unintentional ear hover, unintentional cheek hover, unintentional palm touch, or no contact) of the respective frames based at least in part on the respective frame data. Although any contact or association (e.g., hover) in any given frame data potentially may have a lower classification confidence level, a more robust (e.g., a more confident) classification result typically can be achieved by using a small voting window. For example, if the last 10 frames of the touch sensitive surface 104 had the following classification result—intentional finger touch, intentional finger touch, no contact, intentional finger touch, palm touch, intentional finger touch, intentional finger touch, palm touch, intentional finger touch, no contact"—the result can be given an "intentional finger touch" classification (e.g., 6 out of the last 10 classification results). It is to be appreciated and understood that, in accordance with the defined classification criteria, a different number of classifications of a set of classifications can be employed for the voting window, instead of a bare majority (e.g., 6) out of 10 classifications. For instance, more or less than 10 classifications can be utilized in the set of classifications used for the voting window, or a lower or higher percentage (e.g., lower than 60% (6 out of 10) or higher than 60%), as specified or indicated by the defined classification criteria.

There also can be predetermined patterns classification changes over time for a contact (e.g., touch event) that can be identified (e.g., by the classification component 1502, or the touch management component or hover management component comprising the classification component 1502) and used for touch or hover interaction classification purposes (e.g., by the classification component 1502, or the touch management component or hover management component comprising the classification component 1502). For example, it can be expected that there will be a certain rate of "no contact" determinations during an unintentional finger touch interaction on the touch sensitive surface 104 (e.g., a user can inadvertently touch (e.g., slightly touch) the touch sensitive surface 104 with a finger while gripping the device in the user's hand, change (e.g., slightly change) the grip while holding the device resulting in no contact with the touch sensitive surface 104, and again have the finger inadvertently touch the touch sensitive surface 104 when the grip is changed again (e.g., inadvertently without thinking about it)). For instance, if it is expected that a certain number (e.g., three, or four, or . . . ) out of ten classifications (e.g., ten most recent classifications) of contacts or associations (e.g., hover) during a period where there is an unintentional finger touch against the touch sensitive surface 104 (e.g., touch display screen) will show no contacts or if it is expected that at least one out of five frames will show no contact with the touch sensitive surface 104, the reliability of an unintentional finger touch classification in the above example can be enhanced by the presence of the "no contact" determinations.

The touch or hover interaction classification determination made by the classification component 1502 can be termed a current contact or hover state. Based at least in part on the current contact or hover state associated with the touch sensitive surface 104, the classification component 1502 (or the hover management component or touch management component comprising the classification component 1502) or the processor component 1506 can determine an event. For instance, the classification component 1502 (or the hover management component or touch management component comprising the classification component 1502) or the processor component 1506 can utilize the current contact or hover state relating to contact (or no contact) or association (e.g., hovering) of an object with the touch sensitive surface 104 (and/or associated display screen) to determine an event, based at least in part on the current contact or hover state associated with the touch sensitive surface 104, wherein the current contact or hover state can comprise an intentional touch event (e.g., intentional touch interaction), an unintentional touch event, an unintentional hover event, or a no touch event, for example. The event can be an action (e.g., a response action) that can be performed by the classification component 1502 (or the hover management component or touch management component comprising the classification component 1502), the processor component 1506, the touch sensitive surface 104, the touch sensing system, the display screen, or another component of the touch sensitive device, as appropriate, in accordance with the defined classification criteria. The event can comprise, for example, transitioning the application processor of the device from an active state to an inactive state, transitioning the application processor from the inactive state to the active state, enabling a touch function(s) of the touch sensitive surface 104 (or associated display screen), disabling a touch function(s) of the touch sensitive surface 104 (or associated display screen), turning the display screen, or a portion of the display screen, on (e.g., to an on state), or turning the display screen, or a portion of the display screen, off (e.g., to an off state), as more fully described herein.

In certain embodiments, the classification component 1502 (or the hover management component or touch management component comprising the classification component 1502) or the processor component 1506 can determine and produce a classification confidence in the touch or hover interaction classification. To yield more robust behavior, the mode(s) (e.g., activity state or mode of the application processor, function mode of touch functions of the touch sensitive surface 104, or display mode or power mode of the display screen) of the touch sensitive device can switch (e.g., will only switch) in response to the classification component 1502 (or the hover management component or touch management component comprising the classification component 1502) or the processor component 1506 determining that a touch or hover interaction classification(s) has a sufficiently high confidence level that satisfies a defined threshold confidence (e.g., high confidence threshold) level relating to confidence in the touch or hover interaction classification. If it is determined (e.g., by the classification component 1502, the hover management component, touch management component, or the processor component 1506) that the touch or hover interaction classification(s) being produced has a relatively low confidence level that does not satisfy (e.g., is below) the defined threshold (e.g., high confidence threshold) classification level and/or is below a specified low confidence threshold level, the hover management component, touch management component, or the processor component 1506 can maintain the touch sensitive device in its current mode (e.g., can maintain the application processor, the touch sensitive surface 104, or display screen in their respective current modes).

In certain embodiments, to facilitate avoiding "flickering" between two or more modes of the touch sensitive device associated with the system 1500 (e.g., rapidly and undesirably switching between activity states or modes of the application processor, operation modes of the touch sensitive surface 104, or operation modes of the display screen), the hover management component, touch management component, or the processor component 1506 can utilize a hysteresis function that can facilitate controlling switching between activity states or modes of the application processor, operation modes of the touch sensitive surface 104, or the display screen, in accordance with the defined classification criteria.

Figure 16:
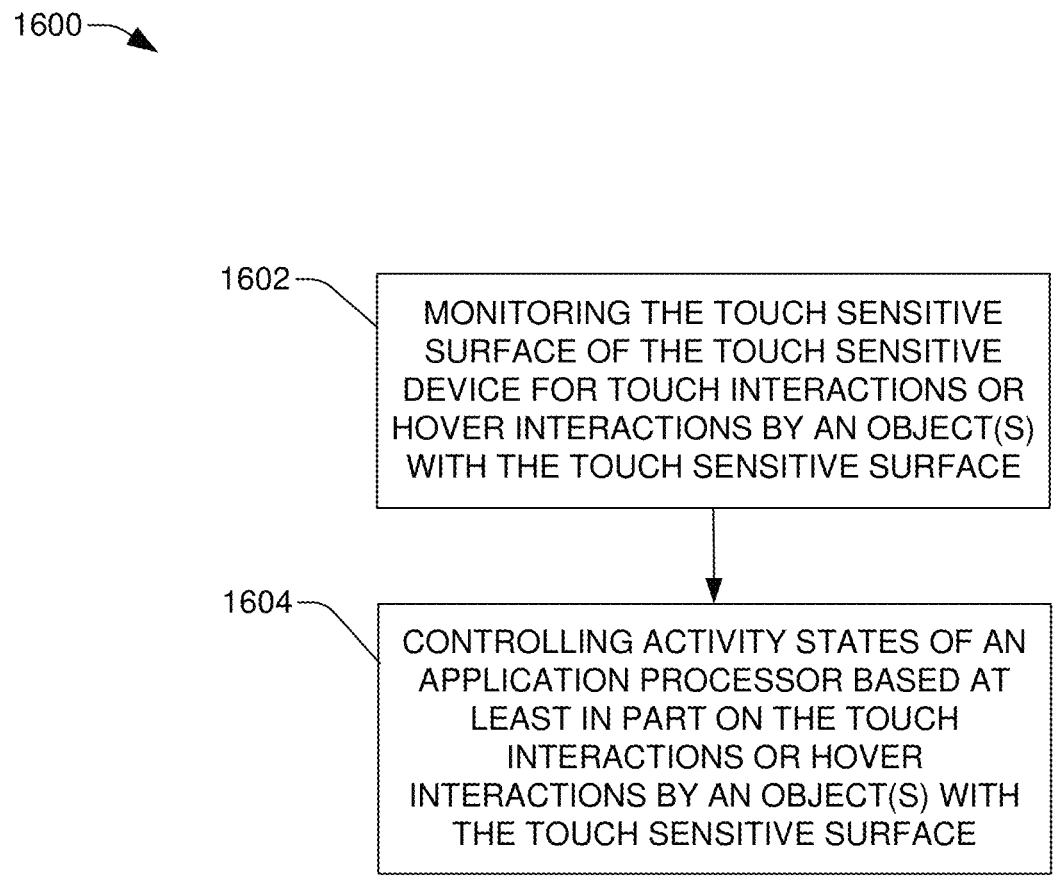
FIG. 16 illustrates a flow diagram of an example method that can manage the use of an application processor in connection with classifications of interactions of objects with a touch sensitive surface of the touch sensitive device, in accordance with various aspects and embodiments of the disclosed subject matter.

FIG. 16 illustrates a flow diagram of an example method 1600 that can manage the use of an application processor in connection with classifications of interactions of objects with a touch sensitive surface of the touch sensitive device, in accordance with various aspects and embodiments of the disclosed subject matter. The method 1600 can be performed, for example, by the application processor and/or the touch controller component of the touch sensitive device.

At reference numeral 1602, the touch sensitive surface of the touch sensitive device can be monitored for touch interactions or hover interactions by an object(s) with the touch sensitive surface. The application processor or the touch controller component can monitor the touch sensitive surface of the touch sensitive device for touch interactions or hover interactions by an object(s) (e.g., finger(s), ear, face, palm, or other body part of a user, a stylus, or other object) with the touch sensitive surface based at least in part on sensor data (e.g., touch surface data and/or motion data, . . . ) associated with the touch sensitive surface, or more generally, the touch sensitive device. For instance, if the application processor is in an active state (e.g., awake state), the application processor and/or the touch controller component can monitor the touch sensitive surface of the touch sensitive device for touch interactions or hover interactions by an object(s) with the touch sensitive surface. If the application processor is in an inactive state (e.g., sleep state), the touch controller component can monitor the touch sensitive surface of the touch sensitive device for touch interactions or hover interactions by an object(s) with the touch sensitive surface.

At reference numeral 1604, activity states of the application processor can be controlled based at least in part on the touch interactions or hover interactions by an object(s) with the touch sensitive surface. The application processor and the touch controller component can respectively operate, coordinate with each other, and communicate with each other to control (e.g., manage) the activity states of the application processor based at least in part on the touch interactions or hover interactions by an object(s) with the touch sensitive surface, wherein the activity states of the application processor can comprise at least an active state (e.g., awake state or mode) and an inactive state (e.g., sleep state or mode).

For instance, when the touch sensitive device is being used for a phone call or a non-data application, if the application processor is in an active state, the application processor, employing the touch classification engine, and the touch controller component, employing the hover classification engine, can respectively operate, coordinate with each other, and communicate with each other to classify touch interactions or hover interactions by an object(s) with the touch sensitive surface based at least in part on the touch interactions or hover interactions by an object(s) with the touch sensitive surface. If the application processor or the touch controller component detect a touch or hover interaction by an object(s) with the touch sensitive surface based at least in part on sensor data (e.g., touch surface data and/or motion data), the application processor or the touch controller component can determine a classification of the touch or hover interaction. If the application processor or the touch controller component determine that the interaction is an intentional touch interaction, the application processor can perform or facilitate performing an operation or function in response to (e.g., corresponding to) the intentional touch interaction (e.g., press or manipulate a button or control on the display screen associated with the touch sensitive surface).

If, however, the application processor or the touch controller component determine that the touch or hover interaction is an unintentional touch or hover interaction, the application processor or touch controller component can reject the unintentional touch or hover interaction to prevent the performance of an operation or function in response to the unintentional touch or hover interaction. Also, in response to a determination that the touch or hover interaction is an unintentional touch or hover action, the application processor can transition from the active state to an inactive (e.g., sleep) state, and/or, prior to the application processor transitioning to the inactive state, the application processor can turn the display screen off (e.g., transition the display screen to an off state).

At this point (with the application processor in the inactive state), the touch controller component can continue to monitor (at reference numeral 1602) the touch sensitive surface for hover interactions or touch interactions by an object(s) with the touch sensitive surface. If the touch controller component detects a touch interaction by an object(s) with the touch sensitive surface that it determines to be an intentional touch interaction, the touch controller component can generate a notification signal (e.g., a control signal, such as an AP control signal) that can indicate that an intentional touch interaction by an object(s) with the touch sensitive surface has been detected, and which can further indicate that the application processor is to transition from the inactive state to the active state to process or implement the intentional touch interaction to perform an operation or function based at least in part on the intentional touch interaction. The touch controller component can communicate the notification signal to the application processor. In response to receiving the notification signal, the application processor can transition from the inactive state to the active state, and the application processor can process or implement the intentional touch interaction to perform the operation or function based at least in part on (e.g., corresponding to) the intentional touch interaction. The application processor also can switch the display screen to an on state.

If no hover or touch interaction is detected by the touch controller component, or if a detected hover or touch interaction is determined to be an unintentional hover or touch interaction by the touch controller component, the touch controller component can continue to monitor (at reference numeral 1602) the touch sensitive surface for hover interactions or touch interactions by an object(s) with the touch sensitive surface, and the application processor can remain in the inactive state and/or the display screen can remain in an off state.

Figure 17:
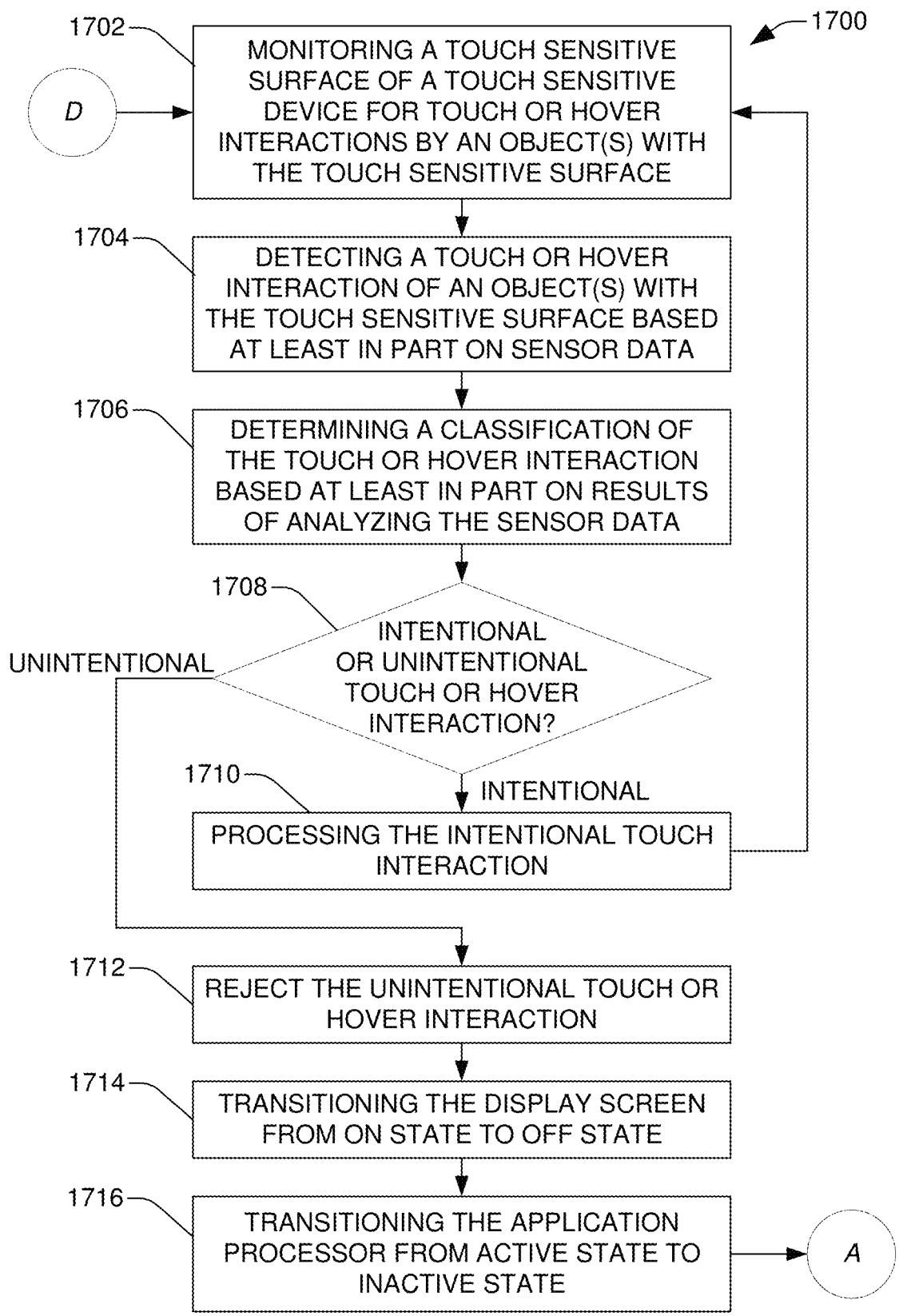
FIG. 17 depicts a flow diagram of another example method that can manage the use of an application processor in connection with classifications of interactions of objects with a touch sensitive surface of the touch sensitive device, in accordance with various aspects and embodiments of the disclosed subject matter.

FIG. 17 depicts a flow diagram of another example method 1700 that can manage the use of an application processor in connection with classifications of interactions of objects with a touch sensitive surface of the touch sensitive device, in accordance with various aspects and embodiments of the disclosed subject matter. The method 1700 can be performed, for example, by the application processor and/or the touch controller component of the touch sensitive device. The method 1700 can begin in a situation where the application processor is in an active state.

At reference numeral 1702, the touch sensitive surface of the touch sensitive device can be monitored for touch interactions or hover interactions by an object(s) with the touch sensitive surface. During a phone call or use of a non-data application on the touch sensitive device, the application processor, which can be in an active state, or the touch controller component can monitor the touch sensitive surface of the touch sensitive device for touch interactions or hover interactions by an object(s) (e.g., finger(s), ear, face, palm, or other body part of a user, a stylus, or other object) with the touch sensitive surface based at least in part on sensor data (e.g., touch surface data and/or motion data, . . . ) associated with the touch sensitive surface, or more generally, the touch sensitive device (e.g., motion data associated with motion of the touch sensitive device).

At reference numeral 1704, a touch or hover interaction of an object(s) with the touch sensitive surface can be detected based at least in part on the sensor data. The application processor and/or touch controller component can analyze the sensor data, wherein the sensor data can indicate that a touch or hover interaction of an object(s) with the touch sensitive surface has occurred. Based at least in part on the results of the analysis of the sensor data, the application processor and/or touch controller component can detect that there is a touch or hover interaction of an object(s) with the touch sensitive surface.

At reference numeral 1706, a classification of the touch or hover interaction can be determined based at least in part on the results of analyzing the sensor data. The application processor, employing a touch classification engine, and/or the touch controller component, employing a hover classification engine, can analyze the sensor data to facilitate determining a classification for the touch or hover interaction, and, based at least in part on the analysis results, can determine the classification (e.g., intentional touch interaction, or unintentional hover or touch interaction) for the touch or hover interaction.

At reference numeral 1708, a determination can be made regarding whether the touch or hover interaction is intentional or unintentional. The application processor and/or the touch controller component can determine whether the touch or hover interaction is an intentional touch interaction or an unintentional touch or hover interaction.

In response to determining that the interaction is an intentional touch interaction, at reference numeral 1710, the intentional touch interaction can be processed (e.g., accepted and processed). In response to determining that the interaction is an intentional touch interaction with the touch sensitive surface, the application processor can accept (e.g., approve) and process the intentional touch interaction to facilitate performing an operation or function based at least in part on (e.g., corresponding or responsive to) the intentional touch interaction. At this point, the method 1700 can return back to reference numeral 1702, wherein the touch sensitive surface of the touch sensitive device can be monitored for touch or hover interactions by an object(s) with the touch sensitive surface.

If, at reference numeral 1708, it is determined that the touch or hover interaction is an unintentional touch or hover interaction (e.g., unintentional ear or face (of the user) touch or hover interaction), at reference numeral 1712, the unintentional touch or hover interaction can be rejected. In response to determining that the touch or hover interaction is an unintentional touch or hover interaction, the application processor or touch controller component can reject the touch or hover interaction and can prevent the touch or hover interaction from being processed (e.g., can prevent an undesired (e.g., unwanted) operation from being performed by the touch sensitive device based on the unintentional touch or hover interaction of the object(s) with the touch sensitive surface).

At reference numeral 1714, the display screen of the touch sensitive device can be transitioned from an on state to an off state. In response to determining that the touch or hover interaction is an unintentional touch or hover interaction, the application processor can transition (e.g., switch) the display screen from the on state to the off state. This can reduce the amount of power used by, and enhance the efficiency of, the touch sensitive device.

At reference numeral 1716, the application processor can be transitioned from the active state to an inactive state. In response to determining that the touch or hover interaction is an unintentional touch or hover interaction, the application processor can transition from the active state to an inactive state (or other desired reduced power state).

At this point, the method 1700 can proceed to reference point A, wherein, in some embodiments, method 1800 can proceed from reference point A.

Figure 18A:
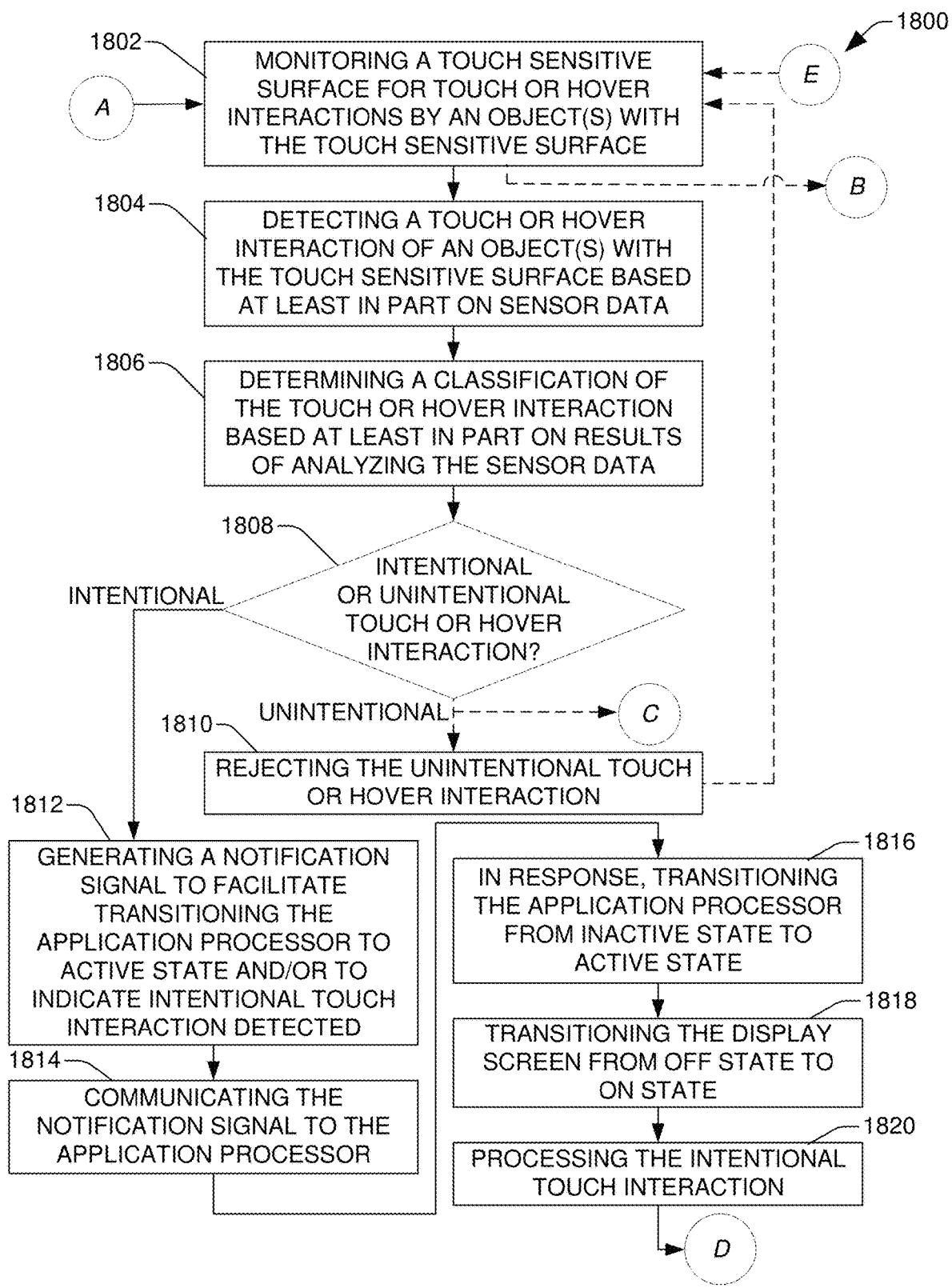
FIGS. 18A and 18B depict a flow diagram of another example method that can manage the use of an application processor in connection with classifications of interactions of objects with a touch sensitive surface of the touch sensitive device, in accordance with various aspects and embodiments of the disclosed subject matter.
Figure 18B:
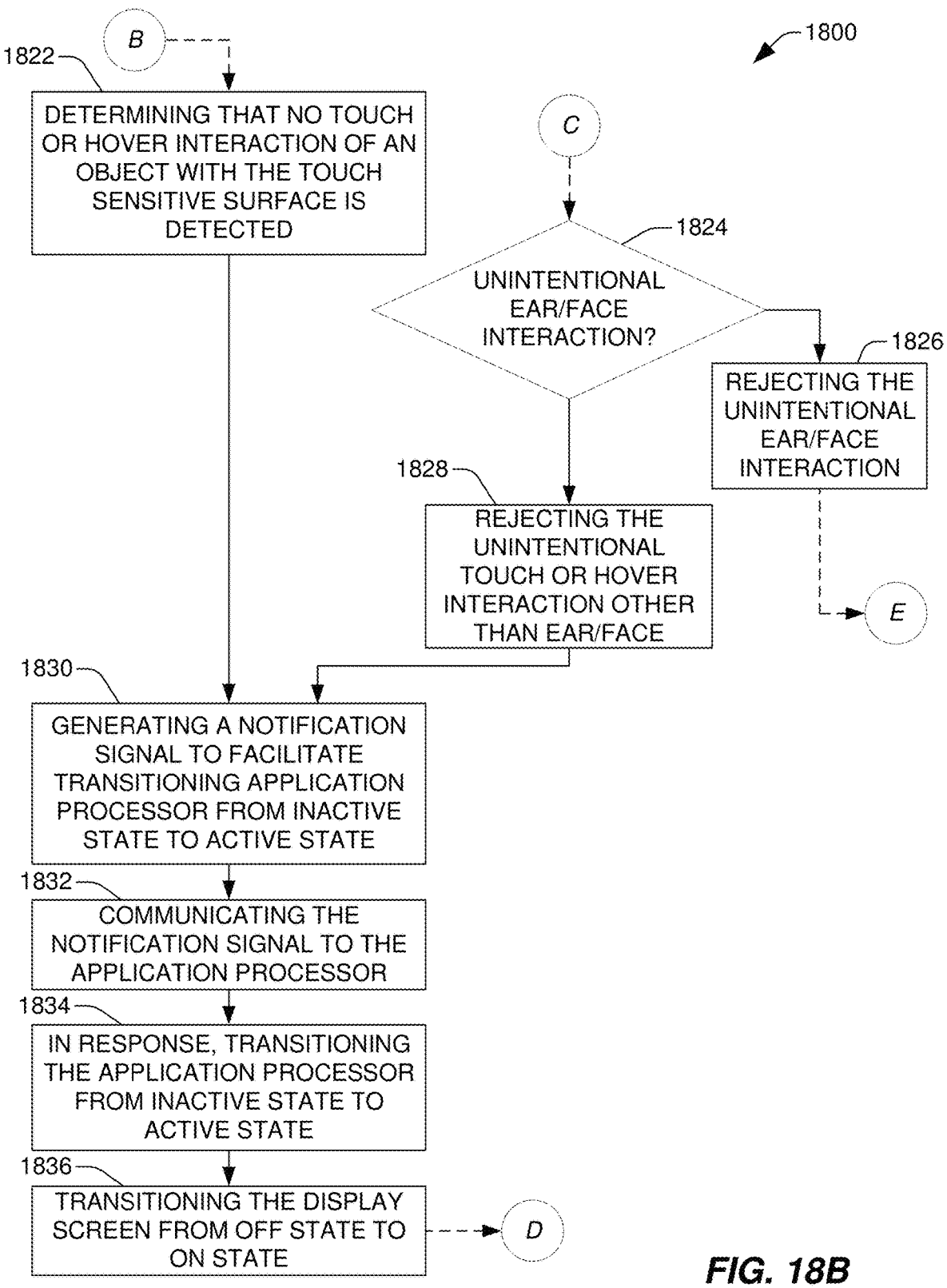

FIGS. 18A and 18B depict a flow diagram of another example method 1800 that can manage the use of an application processor in connection with classifications of interactions of objects with a touch sensitive surface of the touch sensitive device, in accordance with various aspects and embodiments of the disclosed subject matter. The method 1800 can be performed, for example, by the application processor and/or the touch controller component of the touch sensitive device. The method 1800 can begin in a situation where the application processor is in an inactive state (e.g., sleep state or mode). In some embodiments, the method 1800 can proceed from reference point A of the method 1700.

With regard to FIG. 18A, at reference numeral 1802, the touch sensitive surface of the touch sensitive device can be monitored for touch interactions or hover interactions by an object(s) with the touch sensitive surface. During a phone call or use of a non-data application on the touch sensitive device, the touch controller component can monitor the touch sensitive surface of the touch sensitive device for touch interactions or hover interactions by an object(s) (e.g., finger(s), ear, face, palm, or other body part of a user, a stylus, or other object) with the touch sensitive surface based at least in part on sensor data (e.g., touch surface data) associated with the touch sensitive surface.

In some embodiments, the method 1800 alternatively or additionally can proceed to reference point B, wherein, as depicted in FIG. 18B, the method 1800 can proceed from reference point B with regard to when, based at least in part on the monitoring of the touch sensitive surface, it is determined that no touch or hover interaction of an object with the touch sensitive surface is detected, as more fully described below with regard to FIG. 18B.

With further regard to FIG. 18A, at reference numeral 1804, a touch or hover interaction of an object(s) with the touch sensitive surface can be detected based at least in part on the sensor data. The touch controller component can analyze the sensor data, wherein the sensor data can indicate that a touch or hover interaction of an object(s) with the touch sensitive surface has occurred. Based at least in part on the results of the analysis of the sensor data, the touch controller component can detect that there is a touch or hover interaction of an object(s) with the touch sensitive surface.

At reference numeral 1806, a classification of the touch or hover interaction can be determined based at least in part on the results of analyzing the sensor data. The touch controller component, employing a hover classification engine, can analyze the sensor data to facilitate determining a classification for the touch or hover interaction, and, based at least in part on the analysis results, can determine the classification (e.g., intentional touch interaction, or unintentional hover or touch interaction) for the touch or hover interaction.

At reference numeral 1808, a determination can be made regarding whether the touch or hover interaction with the touch sensitive surface is intentional or unintentional. The touch controller component (e.g., the hover management component or hover classification engine of the touch controller component) can determine whether the touch or hover interaction is an intentional touch interaction or an unintentional touch or hover interaction.

In some embodiments, in response to determining that the touch or hover interaction is an unintentional touch or hover interaction with the touch sensitive surface, at reference numeral 1810, the unintentional touch or hover interaction can be rejected. In response to determining that the touch or hover interaction is unintentional, the touch controller component (e.g., the hover management component of the touch controller component) can reject the touch or hover interaction and can prevent the unintentional touch or hover interaction from being processed (e.g., can prevent an undesired operation or function from being performed by the touch sensitive device based on the unintentional touch or hover interaction). The application processor can remain in the inactive state, and/or the display screen can remain in the off state. At this point, the method 1800 can return to reference numeral 1802, wherein the touch sensitive surface of the touch sensitive device can be monitored for touch or hover interactions by an object(s) with the touch sensitive surface.

In other embodiments, alternatively or additionally, the method can proceed to reference point C, wherein, as depicted in FIG. 18B, the method 1800 can proceed from reference point C of FIG. 18B to perform a determination regarding the particular type of classification of the unintentional touch or hover interaction, and method 1800 can proceed from that point, as more fully described herein with regard to FIG. 18B.

With further regard to FIG. 18A, if, at reference numeral 1808, it is determined that the interaction is an intentional touch interaction, at reference numeral 1812, a notification signal can be generated to facilitate transitioning the application processor from an inactive state to an active state and/or to indicate that an intentional touch interaction by an object(s) with the touch sensitive surface has been detected. In response to determining that the interaction is an intentional touch interaction with the touch sensitive surface, the touch controller component can generate the notification signal (e.g., a control signal, such as an AP control signal).

At reference numeral 1814, the notification signal can be communicated to the application processor. The touch controller component can communicate the notification signal to the application processor (e.g., touch driver component of the application processor) to facilitate transitioning the application processor from an inactive state to an active state and/or notifying the application processor that an intentional touch interaction has been detected.

At reference numeral 1816, in response to the notification signal, the application processor can transition from the inactive state to an active state. In response to receiving the notification signal, the application processor (e.g., touch driver component of the application processor) can determine that the application processor is to transition from the inactive state to the active state to process the intentional touch interaction, and the application processor can transition from the inactive state to the active state.

At reference numeral 1818, the display screen can be transitioned from the off state to the on state. The application processor can transition the display screen from the off state to the on state.

At reference numeral 1820, the intentional touch interaction can be processed. The application processor can accept and process the intentional touch interaction with the touch sensitive surface, and can perform a function or operation based at least in part on (e.g., corresponding or responsive to) the intentional touch interaction with the touch sensitive surface.

At this point, the method 1800 can proceed to reference point D, wherein, in some embodiments, the method 1700 can proceed from reference point D, for example, to reference numeral 1702 of the method 1700, wherein the touch sensitive surface of the touch sensitive device can be monitored for touch interactions or hover interactions by an object(s) with the touch sensitive surface.

With further regard to FIG. 18B, the method 1800 alternatively or additionally can proceed from reference point B, wherein, at reference numeral 1822, based at least in part on the monitoring of the touch sensitive surface, a determination can be made that no touch or hover interaction of an object with the touch sensitive surface is detected based at least in part on the analysis of the sensor data indicating that no touch or hover interaction has been detected. For instance, subsequent to the application processor transitioning to the inactive state, the touch controller component can monitor the touch sensitive surface of the touch sensitive device to determine whether or not a touch or hover interaction by an object(s) with the touch sensitive surface is occurring based at least in part on the sensor data associated with the touch sensitive surface. The touch controller component can analyze the sensor data, wherein the sensor data can indicate that no touch or hover interaction of an object(s) with the touch sensitive surface is detected. Based at least in part on the results of the analysis of the sensor data, the touch controller component can determine that there is no touch or hover interaction of an object(s) with the touch sensitive surface is detected. At this point, the method 1800 can proceed to reference numeral 1830, more fully described below, and the method 1800 can proceed from that point.

With further regard to reference point C of FIG. 18B, the method 1800 alternatively or additionally can proceed from reference point C, wherein, at reference numeral 1824, as part of the classification that the touch or hover interaction is determined to be unintentional (as determined at reference numeral 1808), a determination can be made regarding whether the interaction is an unintentional ear/face interaction with the touch sensitive surface. The touch controller component (e.g., the hover classification engine of the touch controller component) can determine whether the touch or hover interaction is an unintentional ear/face interaction with the touch sensitive surface. It is to be appreciated and understood that, while the operation of the reference numeral 1808 and the operation of reference numeral 1824 are depicted as separate operations, in some embodiments, the classification of the touch or hover interaction described with regard to reference numerals 1808 and 1824 can be a single classification operation that can determine whether the touch or hover interaction is an unintentional ear/face interaction, another type of unintentional touch or hover interaction, or an intentional touch interaction.

If, at reference numeral 1824, it is determined that the touch or hover interaction is an unintentional ear/face interaction, at 1826, the unintentional ear/face interaction can be rejected, and the method 1800 can proceed to reference point E. In response to determining that the touch or hover interaction is an unintentional ear/face interaction, the touch controller component (e.g., the hover management component of the touch controller component) can reject the unintentional ear/face interaction and can prevent the unintentional ear/face interaction from being processed (e.g., can prevent an undesired operation or function from being performed by the touch sensitive device based on the unintentional ear/face interaction). The application processor can remain in the inactive state, and/or the display screen can remain in the off state. At this point, as depicted in FIG. 18A, the method 1800 can proceed from reference point E back to reference numeral 1802, wherein the touch sensitive surface of the touch sensitive device can be monitored for touch or hover interactions by an object(s) with the touch sensitive surface.

With further regard to FIG. 18B, if, at reference numeral 1824, it is determined that the touch or hover interaction is not an unintentional ear/face interaction, but rather is an unintentional touch or hover interaction (e.g., unintentional finger(s) or palm touch or hover interaction) that does not involve the ear or face of the user, the method 1800 can proceed to reference numeral 1828, and the method 1800 can proceed from that point.

At reference numeral 1828, in response to determining that a detected unintentional touch or hover interaction is not an unintentional ear/face interaction, but rather is an unintentional touch or hover interaction (e.g., unintentional finger(s) or palm touch or hover interaction) that does not involve the ear or face of the user (at reference numeral 1824), the unintentional touch or hover interaction can be rejected. In response to determining that the unintentional touch or hover interaction is not an unintentional ear/face interaction, but rather is an unintentional touch or hover interaction that does not involve the ear or face of the user, the touch controller component (e.g., the hover management component of the touch controller component) can reject such unintentional touch or hover interaction and can prevent the unintentional touch or hover interaction from being processed (e.g., can prevent an undesired operation or function from being performed by the touch sensitive device based on the unintentional touch or hover interaction).

At reference numeral 1830, in response to determining that no touch or hover interaction of an object(s) with the touch sensitive surface is detected (at reference numeral 1822), or in response to rejecting an unintentional touch or hover interaction that does not involve the ear or face of the user (at reference numeral 1828), a notification signal can be generated to facilitate transitioning the application processor from the inactive state to the active state. In response to determining that no touch or hover interaction of an object(s) with the touch sensitive surface is detected, or in response to rejecting an unintentional touch or hover interaction that does not involve the ear or face of the user, the touch controller component (e.g., the hover management component of the touch controller component) can generate the notification signal (e.g., a control signal, such as an AP control signal). The notification signal can indicate that the application processor can transition from the inactive state to the active state, and/or, with regard to no touch or hover interaction being detected, the notification signal can indicate that no touch or hover interaction of an object(s) with the touch sensitive surface is detected, or, with regard to the unintentional touch or hover interaction that does not involve the ear or face of the user, the notification signal can indicate that there was an unintentional touch or hover interaction, but it was an unintentional touch or hover interaction that does not involve the ear or face of the user and/or can indicate that the unintentional touch or hover interaction was rejected by the touch controller component.

At reference numeral 1832, the notification signal can be communicated to the application processor. The touch controller component (e.g., the hover management component of the touch controller component) can communicate the notification signal to the application processor (e.g., the touch driver component of the application processor) to facilitate transitioning the application processor from the inactive state to the active state and/or notifying the application processor that no touch or hover interaction of an object(s) with the touch sensitive surface is detected or an unintentional touch or hover interaction that does not involve the ear or face of the user was detected and rejected.

At reference numeral 1834, in response to the notification signal, the application processor can transition from the inactive state to an active state. In response to receiving the notification signal, the application processor (e.g., touch driver component of the application processor) can determine that the application processor is to transition from the inactive state to the active state, and the application processor can transition from the inactive state to the active state.

At reference numeral 1836, the display screen can be transitioned from the off state to the on state. The application processor can transition the display screen from the off state to the on state, in response to the application processor being transitioned from the inactive state to an active state.

At this point, with the application processor in the active state, the method 1800 can proceed to reference point D, wherein, in some embodiments, the method 1700 can proceed from reference point D, for example, to reference numeral 1702 of the method 1700, wherein the touch sensitive surface of the touch sensitive device can be monitored for touch interactions or hover interactions by an object(s) with the touch sensitive surface.

It is to be appreciated and understood from this disclosed subject matter that using the techniques described herein, touch sensitive devices can be provided with improved ability to interpret patterns of contact (e.g., touching) or association (e.g., hovering) of an object(s) with respect to a touch sensitive surface of a touch sensitive device. It also is to be appreciated and understood that the ordering of and the number of method acts or operations can be changed within the spirit and scope of the disclosed subject matter.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

With regard to the methods and/or flow diagrams described herein, for simplicity of explanation, the methods have been depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed herein and throughout this specification are capable of being stored on an article of manufacture to facilitate transporting and transferring such methods to computers. The term article of manufacture, as used herein, is intended to encompass a computer program accessible from any computer-readable device or storage media.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the disclosed methods may be practiced with other computer system configurations, including single-processor or multiprocessor computer systems, mini-computing devices, mainframe computers, as well as personal computers, hand-held computing devices (e.g., phone, PDA, electronic tablet, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," "unit," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
monitoring, by a system comprising a processor, sensor data from a touch sensitive surface of a display screen of a device for a touch interaction or a hover interaction by an object with the touch sensitive surface;
determining, by the system, a classification of the touch interaction or the hover interaction based at least in part on results of analyzing the sensor data, wherein the classification is selected from an intentional touch interaction, an unintentional touch interaction, and an unintentional hover interaction, of the object with the touch sensitive surface, wherein the touch interaction is determined to be an unintentional touch interaction if a portion of a user's head touches the touch sensitive surface, multiple fingers grip the device and touch the touch sensitive surface, or a palm touches the touch sensitive surface; and
controlling, by the system, activity states of an application processor and the display screen of the device to reduce power usage by the application processor and the touch sensitive surface based at least in part on the determined classification of the touch interaction or the hover interaction by the object with the touch sensitive surface, wherein the activity states of the application processor comprise an active state and an inactive state and the activity states of the display screen comprise an off state and an on state.

2. The method of claim 1, further comprising:
detecting, by the system, the touch interaction or the hover interaction based at least in part on the sensor data, wherein at least a portion of the sensor data is associated with the touch sensitive surface, and wherein the sensor data indicates that the touch interaction or the hover interaction of the object with the touch sensitive surface has occurred.

3. The method of claim 2, further comprising:
in response to determining that the touch interaction is the intentional touch interaction of the object with the touch sensitive surface, processing, by the system, the touch interaction to perform an operation based at least in part on the touch interaction.

4. The method of claim 2, wherein the application processor is in the active state, and wherein the method further comprises:
in response to determining that the touch interaction or the hover interaction is the unintentional touch interaction or the unintentional hover interaction of the object with the touch sensitive surface, rejecting, by the system, the unintentional touch interaction or the unintentional hover interaction and transitioning, by the system, the application processor to the inactive state.

5. The method of claim 4, further comprising:
in response to determining that the touch interaction or the hover interaction is the unintentional touch interaction or the unintentional hover interaction of the object with the touch sensitive surface, transitioning, by the system, a display screen of the device from the on state to the off state.

6. The method of claim 4, further comprising:
determining, by the system, that the device is using a phone application for a phone call or using a non-data application that does not utilize the application processor, wherein determining that the touch interaction or the hover interaction is the unintentional touch interaction or the unintentional hover interaction of the object with the touch sensitive surface is further based on whether it is determined that the device is using a phone application for a phone call or using a non-data application that does not utilize the application processor.

7. The method of claim 2, wherein the application processor is in the inactive state, and wherein the method further comprises:
in response to determining that the touch interaction is the intentional touch interaction of the object with the touch sensitive surface, generating, by the system, a notification signal regarding the intentional touch interaction; and
transmitting, by the system, the notification signal from a touch controller of the device to the application processor.

8. The method of claim 7, further comprising:
in response to the notification signal, transitioning, by the system, the application processor from the inactive state to the active state;
transitioning, by the system, the display screen of the device from the off state to the on state; and
processing, by the system, the touch interaction to perform an operation based at least in part on the touch interaction, wherein the application processor facilitates the processing of the touch interaction to perform the operation.

9. The method of claim 2, wherein the application processor is in the inactive state, and wherein the method further comprises:
in response to determining that the touch interaction or the hover interaction is the unintentional touch interaction or the unintentional hover interaction of the object with the touch sensitive surface, rejecting, by the system, the unintentional touch interaction or the unintentional hover interaction, wherein no notification signal is transmitted by a touch controller of the device to the application processor to transition the application processor to the active state, and wherein the application processor remains in the inactive state.

10. The method of claim 1, wherein the object is a finger of a user of the device, an ear of the user, a portion of a face of the user, a palm of the user, or a stylus;
wherein the touch interaction is determined to be an unintentional touch interaction if an unintentional finger touch of the finger of the user, an unintentional touch of the ear of the user, an unintentional touch of the portion of the face of the user, an unintentional touch of the palm of the, or an unintentional touch of the stylus, touches on the touch sensitive surface;
wherein the touch interaction is determined to be an unintentional hover interaction if an unintentional hover of the finger of the user, an unintentional hover of the ear of the user, an unintentional hover of the portion of the face of the user, an unintentional hover of the palm of the user, or an unintentional hover of the stylus, hovers in proximity to the touch sensitive surface; and
wherein the touch interaction is determined to be an intentional touch interaction if an intentional finger touch of the finger of the user touches on the touch sensitive surface or an intentional touch of the stylus touches on the touch sensitive surface.

11. A system, comprising:
an application processor for monitoring sensor data from a touch sensitive surface of a display screen of a device for a touch interaction by an object with the touch sensitive surface; and
a touch controller component that is configured for:
monitoring the sensor data from the touch sensitive surface for a hover interaction by the object with the touch sensitive surface,
determining a classification of the touch interaction or the hover interaction based at least in part on results of analyzing the sensor data, wherein the classification is selected from an intentional touch interaction, an unintentional touch interaction, and an unintentional hover interaction, of the object with the touch sensitive surface, wherein the touch interaction is determined to be an unintentional touch interaction if a portion of a user's head touches the touch sensitive surface, multiple fingers grip the device and touch the touch sensitive surface, or a palm touches the touch sensitive surface, and
controlling activity states of the application processor and the display screen to reduce power usage by the application processor and the touch sensitive surface based at least in part on the determined classification of the touch interaction or the hover interaction by the object with the touch sensitive surface, wherein the activity states of the application processor comprise an active state and an inactive state and the activity states of the display screen comprise an off state and an on state.

12. The system of claim 11, wherein the application processor is in the active state, wherein the application processor or the touch controller component is further configured for detecting the touch interaction or the hover interaction based at least in part on sensor information, wherein at least a portion of the sensor information is associated with the touch sensitive surface, and wherein the sensor information indicates that the touch interaction or the hover interaction of the object with the touch sensitive surface has occurred.

13. The system of claim 12, wherein, in response to determining that the touch interaction is the intentional touch interaction of the object with the touch sensitive surface, the application processor is further configured for processing the touch interaction to perform an operation based at least in part on the touch interaction.

14. The system of claim 12, wherein, in response to determining that the touch interaction or the hover interaction is the unintentional touch interaction or the unintentional hover interaction of the object with the touch sensitive surface, the application processor is further configured for rejecting the unintentional touch interaction or the unintentional hover interaction and switching the application processor to the inactive state.

15. The system of claim 14, wherein, prior to the application processor switching to the inactive state, the application processor is further configured for switching a display screen component of the device from an on state to an off state.

16. The system of claim 14, wherein, prior to the application processor switching to the inactive state, the application processor is further configured for determining that the device is using a phone application for a phone call or using a non-data application that does not utilize the application processor, wherein determining that the touch interaction or the hover interaction is the unintentional touch interaction or the unintentional hover interaction of the object with the touch sensitive surface is further based on whether it is determined that the device is using a phone application for a phone call or using a non-data application that does not utilize the application processor.

17. The system of claim 11, wherein the application processor is in the inactive state;
wherein the touch controller component is configured for detecting the touch interaction or the hover interaction based at least in part on sensor information, wherein at least a portion of the sensor information is associated with the touch sensitive surface, and wherein the sensor information indicates that the touch interaction or the hover interaction of the object with the touch sensitive surface has occurred; and
wherein the touch controller component is configured for determining the classification of the touch interaction or the hover interaction based at least in part on results of analyzing the sensor information.

18. The system of claim 17, wherein, in response to determining that the touch interaction is the intentional touch interaction of the object with the touch sensitive surface, the touch controller is configured for generating a notification signal regarding the intentional touch interaction and communicating the notification signal to the application processor.

19. The system of claim 18, wherein, in response to receiving the notification signal, the application processor is configured for switching from the inactive state to the active state, switching a display screen component of the device from an off state to an on state, and processing the touch interaction to perform an operation based at least in part on the touch interaction.

20. The system of claim 17, wherein, in response to determining that the touch interaction or the hover interaction is the unintentional touch interaction or the unintentional hover interaction of the object with the touch sensitive surface, the touch controller component is configured for rejecting the unintentional touch interaction or the unintentional hover interaction, wherein no notification signal is communicated by the touch controller component to the application processor to switch the application processor to the active state, and wherein the application processor is configured for remaining in the inactive state.

21. The system of claim 11, wherein the object is a finger of a user of the device, an ear of the user, a portion of a face of the user, a palm of the user, or a stylus;
wherein the touch interaction is determined to be an unintentional touch interaction if an unintentional finger touch of the finger of the user, an unintentional touch of the ear of the user, an unintentional touch of the portion of the face of the user, an unintentional touch of the palm of the user, or an unintentional touch of the stylus, touches on the touch sensitive surface;
wherein the touch interaction is determined to be an unintentional hover interaction if an unintentional hover of the finger of the user, an unintentional hover of the ear of the user, an unintentional hover of the portion of the face of the user, an unintentional hover of the palm of the user, or an unintentional hover of the stylus, hovers in proximity to the touch sensitive surface; and
wherein the touch interaction is determined to be an intentional touch interaction if comprises an intentional finger touch of the finger of the user touches on the touch sensitive surface or an intentional touch of the stylus touches on the touch sensitive surface.

22. The system of claim 11, wherein the application processor comprises a touch classification engine, wherein the touch controller component comprises a hover classification engine, wherein the touch classification engine or the hover classification engine is configured for analyzing sensor information associated with the touch sensitive surface or the device, and wherein the touch classification engine or the hover classification engine is configured for determining a classification of the touch interaction or the hover interaction as one of an intentional touch interaction, an unintentional touch interaction, or an unintentional hover interaction, of the object with the touch sensitive surface, based at least in part on results of the analysis of the sensor information.

23. The system of claim 22, wherein the sensor information comprises touch surface information associated with the touch sensitive surface and at least one of accelerometer information associated with the device, gyroscope information associated with the device, ultrasonic information associated with the device, vibro-acoustic information associated with the device, inertial measurement unit information associated with the device, acceleration information indicating an acceleration of the device, velocity information indicating a velocity of the device, angular rate information indicating an angular rate of the device, position information indicating a position or a change in position of the device, or orientation information indicating an orientation or a change in orientation of the device.

24. The system of claim 22, wherein the application processor or the touch controller component is configured for receiving the sensor information from at least two sensors of a set of sensors associated with the touch sensitive surface, an accelerometer, a gyroscope, an ultrasonic sensor, or an inertial measurement unit.

25. The system of claim 22, wherein the touch classification engine or the hover classification engine is configured for comparing first characteristics of the sensor information to second characteristics relating to unintentional touch interactions associated with the touch sensitive surface and third characteristics relating to intentional touch interactions associated with the touch sensitive surface, and determining the classification of the touch interaction or the hover interaction based at least in part on a result of the comparison of the first characteristics to the second characteristics and the third characteristics.

26. The system of claim 11, further comprising a buffer component that stores at least a portion of at least one of motion-related information associated with the device or touch surface information associated with the touch sensitive surface, to facilitate analysis of at least the portion of the motion-related information or the touch surface information by at least one of the application processor or the touch controller component.

27. A computer-readable medium, comprising executable instructions that, when executed by a processor, facilitate performance of operations, comprising:

in connection with an electronic device being used with a phone application for a phone call or a non-data application that does not utilize an application processor of the electronic device, determining whether there is sensor data for a touch interaction or a hover interaction by an object with a touch sensitive surface of a display screen of the electronic device;

determining, by the system, a classification of the touch interaction or the hover interaction based at least in part on results of analyzing the sensor data, wherein the classification is selected from an intentional touch interaction, an unintentional touch interaction, and an unintentional hover interaction, of the object with the touch sensitive surface, wherein the touch interaction is determined to be an unintentional touch interaction if a portion of a user's head touches the touch sensitive surface, multiple fingers grip the device and touch the touch sensitive surface, or a palm touches the touch sensitive surface; and managing activity modes of the application processor and the display screen to reduce power usage by the application processor and the touch sensitive surface based at least in part on the determined classification of the touch interaction or the hover interaction by the object with the touch sensitive surface, wherein the activity modes comprise at least an awake mode and a sleep mode.

28. A computer-readable medium of claim 27, wherein the operations further comprise:

at least one of:

with the application processor in the awake state, in response to determining that the touch interaction or the hover interaction is an unintentional touch interaction or an unintentional hover interaction of the object with the touch sensitive surface, rejecting the unintentional touch interaction or the unintentional hover interaction, and transitioning the application processor from the awake state to the sleep state; or with the application processor in the sleep state, in response to determining that the touch interaction is an intentional touch interaction of the object with the touch sensitive surface, or in response to determining there is no touch or hover interaction of the object with the touch sensitive surface, or in response to determining there is no touch or hover interaction of the object, when the object comprises an ear or a face of a user of the electronic device, with the touch sensitive surface, generating a notification signal regarding the intentional touch interaction, and transmitting the notification signal from a touch controller of the electronic device to the application processor to facilitate transitioning the application processor from the sleep state to the awake state.

* * * * *